US009953036B2

(12) United States Patent
Mackenzie et al.

(10) Patent No.: US 9,953,036 B2
(45) Date of Patent: Apr. 24, 2018

(54) FILE SYSTEM MONITORING IN A SYSTEM WHICH INCREMENTALLY UPDATES CLIENTS WITH EVENTS THAT OCCURRED IN A CLOUD-BASED COLLABORATION PLATFORM

(71) Applicant: Box, Inc., Redwood City, CA (US)

(72) Inventors: David Mackenzie, Dale City, CA (US); Benjamin Campbell Smith, Mountain View, CA (US); Anthony Bishopric, San Francisco Bay, CA (US)

(73) Assignee: Box, Inc., Redwood City, CA (US)

( * ) Notice: Subject to any disclaimer, the term of this patent is extended or adjusted under 35 U.S.C. 154(b) by 470 days.

(21) Appl. No.: 14/149,586

(22) Filed: Jan. 7, 2014

(65) Prior Publication Data

US 2014/0195485 A1    Jul. 10, 2014

Related U.S. Application Data

(60) Provisional application No. 61/750,474, filed on Jan. 9, 2013.

(51) Int. Cl.
| | | |
|---|---|---|
| G06F 7/00 | (2006.01) | |
| G06F 17/00 | (2006.01) | |
| G06F 17/30 | (2006.01) | |

(52) U.S. Cl.
CPC .. *G06F 17/30174* (2013.01); *G06F 17/30144* (2013.01)

(58) Field of Classification Search
None
See application file for complete search history.

(56) References Cited

U.S. PATENT DOCUMENTS

| | | | |
|---|---|---|---|
| 858,619 | A | 7/1907 | O'Farrell |
| 5,043,876 | A | 8/1991 | Terry |
| 5,742,905 | A | 4/1998 | Pepe et al. |
| 5,748,735 | A | 5/1998 | Ganesan |

(Continued)

FOREIGN PATENT DOCUMENTS

| | | |
|---|---|---|
| CA | 2724521 | 11/2009 |
| CN | 101997924 A | 3/2011 |

(Continued)

OTHER PUBLICATIONS

Exam Report for GB1317393.5 Applicant: Box, Inc. dated Nov. 7, 2014, 6 pages.

(Continued)

*Primary Examiner* — David T Brooks
(74) *Attorney, Agent, or Firm* — Perkins Coie LLP

(57) ABSTRACT

Techniques are disclosed for file system monitoring in a system which incrementally updates clients with what occurred in a cloud-enabled platform. In one embodiment, a method comprises, in response to an event which represents that a modification to an item has taken place on the cloud-based platform, identifying whether execution of the event is to violate any local file system rule. The method further comprises, if the execution of the event is to violate any local file system rule, buffering the event until a subsequent event arrives. The method further comprises identifying whether execution of an aggregate of the events is to violate any local file system rule.

23 Claims, 14 Drawing Sheets

(56) References Cited

U.S. PATENT DOCUMENTS

| | | | |
|---|---|---|---|
| 5,774,717 A | 6/1998 | Porcaro |
| 5,787,175 A | 7/1998 | Carter |
| 5,799,320 A | 8/1998 | Klug |
| 5,848,415 A | 12/1998 | Guck |
| 5,864,870 A | 1/1999 | Guck |
| 5,926,816 A | 7/1999 | Bauer et al. |
| 5,999,908 A | 12/1999 | Abelow |
| 6,016,467 A | 1/2000 | Newsted et al. |
| 6,034,621 A | 3/2000 | Kaufman |
| 6,055,543 A | 4/2000 | Christensen et al. |
| 6,073,161 A | 6/2000 | DeBoskey et al. |
| 6,098,078 A | 8/2000 | Gehani et al. |
| 6,226,618 B1 | 5/2001 | Downs et al. |
| 6,233,600 B1 | 5/2001 | Salas et al. |
| 6,260,040 B1 | 7/2001 | Kauffman et al. |
| 6,279,109 B1 | 8/2001 | Brundridge |
| 6,289,345 B1 | 9/2001 | Yasue |
| 6,292,803 B1 | 9/2001 | Richardson et al. |
| 6,336,124 B1 | 1/2002 | Alam et al. |
| 6,342,906 B1 | 1/2002 | Kumar et al. |
| 6,345,386 B1 | 2/2002 | Delo et al. |
| 6,370,543 B2 | 4/2002 | Hoffert et al. |
| 6,374,260 B1 | 4/2002 | Hoffert et al. |
| 6,385,606 B2 | 5/2002 | Inohara et al. |
| 6,396,593 B1 | 5/2002 | Laverty et al. |
| 6,441,641 B1 | 8/2002 | Pang et al. |
| 6,446,091 B1 | 9/2002 | Noren et al. |
| 6,449,622 B1 * | 9/2002 | LaRue ............. G06F 17/30575 |
| 6,515,681 B1 | 2/2003 | Knight |
| 6,539,381 B1 | 3/2003 | Prasad et al. |
| 6,584,466 B1 | 6/2003 | Serbinis et al. |
| 6,636,872 B1 | 10/2003 | Heath et al. |
| 6,636,897 B1 | 10/2003 | Sherman et al. |
| 6,654,737 B1 | 11/2003 | Nunez |
| 6,662,186 B1 | 12/2003 | Esquibel et al. |
| 6,687,878 B1 | 2/2004 | Eintracht et al. |
| 6,714,968 B1 | 3/2004 | Prust |
| 6,735,623 B1 | 5/2004 | Prust |
| 6,742,181 B1 | 5/2004 | Koike et al. |
| 6,760,721 B1 | 7/2004 | Chasen et al. |
| 6,947,162 B2 | 9/2005 | Rosenberg et al. |
| 6,952,724 B2 | 10/2005 | Prust |
| 6,996,768 B1 | 2/2006 | Elo et al. |
| 7,003,667 B1 | 2/2006 | Slick et al. |
| 7,010,752 B2 | 3/2006 | Ly |
| 7,020,697 B1 | 3/2006 | Goodman et al. |
| 7,039,806 B1 | 5/2006 | Friedman et al. |
| 7,069,393 B2 | 6/2006 | Miyata et al. |
| 7,080,104 B2 | 7/2006 | Ring et al. |
| 7,130,831 B2 | 10/2006 | Howard et al. |
| 7,133,834 B1 | 11/2006 | Abelow |
| 7,143,136 B1 | 11/2006 | Drenan et al. |
| 7,149,787 B1 | 12/2006 | Mutalik et al. |
| 7,152,182 B2 | 12/2006 | Ji et al. |
| 7,155,483 B1 | 12/2006 | Friend et al. |
| 7,165,107 B2 | 1/2007 | Pouyoul et al. |
| 7,171,468 B2 | 1/2007 | Yeung et al. |
| 7,178,021 B1 | 2/2007 | Hanna et al. |
| 7,222,078 B2 | 5/2007 | Abelow |
| 7,233,997 B1 | 6/2007 | Leveridge et al. |
| 7,275,244 B1 | 9/2007 | Charles Bell et al. |
| 7,296,025 B2 | 11/2007 | Kung et al. |
| 7,310,684 B2 | 12/2007 | Patrick et al. |
| 7,337,193 B1 * | 2/2008 | Mills ................. G06F 17/30578 |
| 7,346,778 B1 | 3/2008 | Guiter et al. |
| 7,353,252 B1 | 4/2008 | Yang et al. |
| 7,362,868 B2 | 4/2008 | Madoukh et al. |
| 7,363,330 B1 | 4/2008 | Ellman et al. |
| 7,370,269 B1 | 5/2008 | Prabhu et al. |
| 7,380,120 B1 | 5/2008 | Garcia |
| 7,386,535 B1 | 6/2008 | Kalucha et al. |
| 7,401,117 B2 | 7/2008 | Dan et al. |
| 7,543,000 B2 | 6/2009 | Castro et al. |
| 7,581,221 B2 | 8/2009 | Lai et al. |
| 7,620,565 B2 | 11/2009 | Abelow |
| 7,647,559 B2 | 1/2010 | Yozell-Epstein et al. |
| 7,650,367 B2 | 1/2010 | Arruza |
| 7,653,668 B1 | 1/2010 | Shelat et al. |
| 7,661,088 B2 | 2/2010 | Burke |
| 7,665,093 B2 | 2/2010 | Maybee et al. |
| 7,676,542 B2 | 3/2010 | Moser et al. |
| 7,698,363 B2 | 4/2010 | Dan et al. |
| 7,734,600 B1 | 6/2010 | Wise et al. |
| 7,735,144 B2 | 6/2010 | Pravetz et al. |
| 7,739,411 B2 | 6/2010 | Messer et al. |
| 7,756,843 B1 | 7/2010 | Palmer |
| 7,774,412 B1 | 8/2010 | Schnepel |
| 7,814,426 B2 | 10/2010 | Huesken et al. |
| 7,886,295 B2 | 2/2011 | Burger et al. |
| 7,890,964 B2 | 2/2011 | Vogler-Ivashchanka et al. |
| 7,937,663 B2 | 5/2011 | Parker et al. |
| 7,958,353 B2 | 6/2011 | Matsuzaki et al. |
| 7,958,453 B1 | 6/2011 | Taing |
| 7,979,296 B2 | 7/2011 | Kruse et al. |
| 7,996,374 B1 | 8/2011 | Jones et al. |
| 8,027,976 B1 | 9/2011 | Ding et al. |
| RE42,904 E | 11/2011 | Stephens, Jr. |
| 8,065,739 B1 | 11/2011 | Bruening et al. |
| 8,090,361 B2 | 1/2012 | Hagan |
| 8,103,662 B2 | 1/2012 | Eagan et al. |
| 8,117,261 B2 | 2/2012 | Briere et al. |
| 8,126,848 B2 | 2/2012 | Wagner |
| 8,140,513 B2 | 3/2012 | Ghods et al. |
| 8,151,183 B2 | 4/2012 | Chen et al. |
| 8,185,830 B2 | 5/2012 | Saha et al. |
| 8,200,582 B1 | 6/2012 | Zhu |
| 8,201,230 B2 | 6/2012 | Day et al. |
| 8,214,747 B1 | 7/2012 | Yankovich et al. |
| 8,230,348 B2 | 7/2012 | Peters et al. |
| 8,239,918 B1 | 8/2012 | Cohen |
| 8,326,814 B2 | 12/2012 | Ghods et al. |
| 8,347,276 B2 | 1/2013 | Schadow |
| 8,358,701 B2 | 1/2013 | Chou et al. |
| 8,370,803 B1 | 2/2013 | Holler et al. |
| 8,429,540 B1 | 4/2013 | Yankovich et al. |
| 8,447,820 B1 * | 5/2013 | Gay ....................... G06Q 10/10 709/206 |
| 8,458,128 B2 | 6/2013 | Khosravy et al. |
| 8,464,161 B2 | 6/2013 | Giles et al. |
| 8,464,167 B2 | 6/2013 | Saund et al. |
| 8,473,775 B1 | 6/2013 | Helmick et al. |
| 8,515,902 B2 | 8/2013 | Savage |
| 8,527,549 B2 | 9/2013 | Cidon |
| 8,528,087 B2 | 9/2013 | Hsu et al. |
| 8,549,066 B1 | 10/2013 | Donahue et al. |
| 8,549,511 B2 | 10/2013 | Seki et al. |
| 8,572,022 B2 | 10/2013 | Hagan et al. |
| 8,582,777 B2 | 11/2013 | Urivskiy et al. |
| 8,583,619 B2 | 11/2013 | Ghods et al. |
| 8,650,498 B1 | 2/2014 | Mihovilovic |
| 8,719,445 B2 | 5/2014 | Ko |
| 8,719,810 B2 | 5/2014 | Oh |
| 8,745,267 B2 | 6/2014 | Luecke et al. |
| 8,782,637 B2 | 7/2014 | Khalid |
| 8,819,068 B1 | 8/2014 | Knote et al. |
| 8,825,597 B1 | 9/2014 | Houston et al. |
| 8,849,955 B2 | 9/2014 | Prahlad et al. |
| 8,868,574 B2 | 10/2014 | Kiang et al. |
| 8,869,235 B2 | 10/2014 | Qureshi et al. |
| 8,886,925 B2 | 11/2014 | Qureshi et al. |
| 8,892,679 B1 | 11/2014 | Destagnol et al. |
| 8,914,856 B1 | 12/2014 | Velummylum et al. |
| 8,914,900 B2 | 12/2014 | Smith et al. |
| 8,918,387 B1 | 12/2014 | Sokolov |
| 8,949,179 B2 | 2/2015 | Besen et al. |
| 8,949,939 B2 | 2/2015 | Peddada |
| 8,955,103 B2 | 2/2015 | Kline, III et al. |
| 8,956,103 B2 | 2/2015 | Gehring |
| 8,959,579 B2 | 2/2015 | Barton et al. |
| 8,966,062 B1 | 2/2015 | Giese et al. |
| 8,990,307 B2 | 3/2015 | Barreto et al. |
| 8,990,955 B2 | 3/2015 | Hymel et al. |
| 9,015,248 B2 | 4/2015 | Barreto et al. |
| 9,054,919 B2 | 6/2015 | Kiang et al. |

(56) References Cited

U.S. PATENT DOCUMENTS

| | | |
|---|---|---|
| 9,239,846 B2 | 1/2016 | Besen et al. |
| 9,244,934 B2 | 1/2016 | Besen et al. |
| 9,268,655 B2 | 2/2016 | Chan et al. |
| 9,396,216 B2 | 7/2016 | Barreto et al. |
| 9,396,245 B2 | 7/2016 | Mackenzie et al. |
| 9,407,664 B1 | 8/2016 | Banerjee |
| 9,495,434 B1 | 11/2016 | Walton et al. |
| 9,507,795 B2 | 11/2016 | Dorman et al. |
| 9,535,924 B2 | 1/2017 | Mackenzie et al. |
| 9,547,658 B2 | 1/2017 | Fan et al. |
| 9,553,758 B2 | 1/2017 | Rexer |
| 9,558,202 B2 | 1/2017 | Lockhart et al. |
| 9,563,517 B1 | 2/2017 | Natanzon et al. |
| 9,575,981 B2 | 2/2017 | Dorman et al. |
| 2001/0027492 A1 | 10/2001 | Gupta |
| 2002/0029218 A1 | 3/2002 | Bentley et al. |
| 2002/0091738 A1 | 7/2002 | Rohrabaugh et al. |
| 2002/0099772 A1 | 7/2002 | Deshpande et al. |
| 2002/0116544 A1 | 8/2002 | Barnard et al. |
| 2002/0133509 A1 | 9/2002 | Johnston et al. |
| 2002/0147770 A1 | 10/2002 | Tang |
| 2002/0194177 A1 | 12/2002 | Sherman et al. |
| 2003/0041095 A1 | 2/2003 | Konda et al. |
| 2003/0073448 A1 | 4/2003 | Ozeki et al. |
| 2003/0084306 A1 | 5/2003 | Abburi et al. |
| 2003/0093404 A1 | 5/2003 | Bader et al. |
| 2003/0097374 A1 | 5/2003 | Himeno |
| 2003/0108052 A1 | 6/2003 | Inoue et al. |
| 2003/0110264 A1 | 6/2003 | Whidby et al. |
| 2003/0115326 A1 | 6/2003 | Verma et al. |
| 2003/0135536 A1 | 7/2003 | Lyons |
| 2003/0135565 A1 | 7/2003 | Estrada |
| 2003/0154306 A1 | 8/2003 | Perry |
| 2003/0204490 A1 | 10/2003 | Kasriel |
| 2003/0217171 A1 | 11/2003 | Von Stuermer et al. |
| 2003/0228015 A1 | 12/2003 | Futa et al. |
| 2004/0003104 A1 | 1/2004 | Boskovic et al. |
| 2004/0021686 A1 | 2/2004 | Barberis |
| 2004/0076187 A1 | 4/2004 | Peled |
| 2004/0088647 A1 | 5/2004 | Miller et al. |
| 2004/0098361 A1 | 5/2004 | Peng |
| 2004/0103147 A1 | 5/2004 | Flesher et al. |
| 2004/0111415 A1 | 6/2004 | Scardino et al. |
| 2004/0117438 A1 | 6/2004 | Considine et al. |
| 2004/0122949 A1 | 6/2004 | Zmudzinski et al. |
| 2004/0128359 A1 | 7/2004 | Horvitz et al. |
| 2004/0162836 A1 | 8/2004 | Aronoff et al. |
| 2004/0177138 A1 | 9/2004 | Salle et al. |
| 2004/0181579 A1 | 9/2004 | Huck et al. |
| 2004/0196307 A1 | 10/2004 | Zak et al. |
| 2004/0201604 A1 | 10/2004 | Kraenzel et al. |
| 2004/0218214 A1 | 11/2004 | Kihara et al. |
| 2004/0230624 A1 | 11/2004 | Frolund et al. |
| 2004/0230652 A1* | 11/2004 | Estrada ............ H04L 65/403 709/204 |
| 2004/0246532 A1 | 12/2004 | Inada |
| 2004/0260977 A1 | 12/2004 | Ji et al. |
| 2004/0267825 A1* | 12/2004 | Novak .............. G06F 17/30578 |
| 2004/0267836 A1 | 12/2004 | Armangau et al. |
| 2005/0005276 A1 | 1/2005 | Morgan |
| 2005/0010860 A1 | 1/2005 | Weiss et al. |
| 2005/0022175 A1 | 1/2005 | Sliger et al. |
| 2005/0022229 A1 | 1/2005 | Gabriel et al. |
| 2005/0028006 A1 | 2/2005 | Leser et al. |
| 2005/0033777 A1 | 2/2005 | Moraes et al. |
| 2005/0038831 A1 | 2/2005 | Souder et al. |
| 2005/0038997 A1 | 2/2005 | Kojima et al. |
| 2005/0050228 A1 | 3/2005 | Perham et al. |
| 2005/0055306 A1 | 3/2005 | Miller et al. |
| 2005/0063083 A1 | 3/2005 | Dart et al. |
| 2005/0097061 A1 | 5/2005 | Shapiro et al. |
| 2005/0097225 A1 | 5/2005 | Glatt et al. |
| 2005/0097434 A1 | 5/2005 | Storisteanu |
| 2005/0102328 A1 | 5/2005 | Ring et al. |
| 2005/0108406 A1 | 5/2005 | Lee et al. |
| 2005/0114305 A1 | 5/2005 | Haynes et al. |
| 2005/0114378 A1 | 5/2005 | Elien et al. |
| 2005/0138118 A1 | 6/2005 | Banatwala et al. |
| 2005/0172284 A1 | 8/2005 | Dandekar et al. |
| 2005/0182966 A1 | 8/2005 | Pham et al. |
| 2005/0198299 A1 | 9/2005 | Beck et al. |
| 2005/0198452 A1 | 9/2005 | Watanabe |
| 2005/0234864 A1 | 10/2005 | Shapiro |
| 2005/0234943 A1 | 10/2005 | Clarke |
| 2005/0261933 A1 | 11/2005 | Magnuson |
| 2006/0005163 A1 | 1/2006 | Huesken et al. |
| 2006/0026502 A1 | 2/2006 | Dutta |
| 2006/0026535 A1 | 2/2006 | Hotelling et al. |
| 2006/0036568 A1 | 2/2006 | Moore et al. |
| 2006/0041603 A1 | 2/2006 | Paterson et al. |
| 2006/0041752 A1 | 2/2006 | Tuvell et al. |
| 2006/0047804 A1 | 3/2006 | Fredricksen et al. |
| 2006/0053088 A1 | 3/2006 | Ali et al. |
| 2006/0053380 A1 | 3/2006 | Spataro et al. |
| 2006/0070083 A1 | 3/2006 | Brunswig et al. |
| 2006/0075071 A1 | 4/2006 | Gillette |
| 2006/0117247 A1 | 6/2006 | Fite et al. |
| 2006/0123062 A1 | 6/2006 | Bobbitt et al. |
| 2006/0133340 A1 | 6/2006 | Rybak et al. |
| 2006/0168550 A1 | 7/2006 | Muller et al. |
| 2006/0173952 A1 | 8/2006 | Coyle |
| 2006/0174051 A1 | 8/2006 | Lordi et al. |
| 2006/0174054 A1 | 8/2006 | Matsuki |
| 2006/0179070 A1 | 8/2006 | George et al. |
| 2006/0179309 A1 | 8/2006 | Cross et al. |
| 2006/0242204 A1 | 10/2006 | Karas et al. |
| 2006/0242206 A1 | 10/2006 | Brezak et al. |
| 2006/0259524 A1 | 11/2006 | Horton |
| 2006/0265719 A1 | 11/2006 | Astl et al. |
| 2006/0271510 A1 | 11/2006 | Harward et al. |
| 2006/0288043 A1 | 12/2006 | Novak et al. |
| 2007/0011469 A1 | 1/2007 | Allison et al. |
| 2007/0016680 A1 | 1/2007 | Burd et al. |
| 2007/0028291 A1 | 2/2007 | Brennan et al. |
| 2007/0038934 A1 | 2/2007 | Fellman |
| 2007/0067349 A1 | 3/2007 | Jhaveri et al. |
| 2007/0079242 A1 | 4/2007 | Jolley et al. |
| 2007/0100830 A1 | 5/2007 | Beedubail et al. |
| 2007/0115845 A1 | 5/2007 | Hochwarth et al. |
| 2007/0118598 A1 | 5/2007 | Bedi et al. |
| 2007/0124460 A1 | 5/2007 | McMullen et al. |
| 2007/0124737 A1 | 5/2007 | Wensley et al. |
| 2007/0124781 A1 | 5/2007 | Casey et al. |
| 2007/0126635 A1 | 6/2007 | Houri |
| 2007/0130143 A1 | 6/2007 | Zhang et al. |
| 2007/0130163 A1 | 6/2007 | Perez et al. |
| 2007/0142039 A1 | 6/2007 | Bushnell et al. |
| 2007/0157203 A1 | 7/2007 | Lim |
| 2007/0162610 A1 | 7/2007 | Un et al. |
| 2007/0179993 A1 | 8/2007 | Arruza |
| 2007/0185885 A1 | 8/2007 | Tamura |
| 2007/0195779 A1 | 8/2007 | Judge et al. |
| 2007/0198609 A1 | 8/2007 | Black et al. |
| 2007/0208878 A1 | 9/2007 | Barnes-Leon et al. |
| 2007/0214180 A1 | 9/2007 | Crawford |
| 2007/0220016 A1 | 9/2007 | Estrada et al. |
| 2007/0220590 A1 | 9/2007 | Rasmussen et al. |
| 2007/0240057 A1 | 10/2007 | Satterfield et al. |
| 2007/0250762 A1 | 10/2007 | Mansfield |
| 2007/0256065 A1 | 11/2007 | Heishi et al. |
| 2007/0266304 A1 | 11/2007 | Fletcher et al. |
| 2007/0282848 A1 | 12/2007 | Kiilerich et al. |
| 2007/0283443 A1 | 12/2007 | McPherson et al. |
| 2007/0288290 A1 | 12/2007 | Motoyama et al. |
| 2008/0005135 A1 | 1/2008 | Muthukrishnan et al. |
| 2008/0005195 A1 | 1/2008 | Li |
| 2008/0016146 A1 | 1/2008 | Gan et al. |
| 2008/0021959 A1 | 1/2008 | Naghi et al. |
| 2008/0028323 A1 | 1/2008 | Rosen et al. |
| 2008/0040173 A1 | 2/2008 | Aleong et al. |
| 2008/0040503 A1 | 2/2008 | Kleks et al. |
| 2008/0040560 A1 | 2/2008 | Hall et al. |
| 2008/0046828 A1 | 2/2008 | Bibliowicz et al. |
| 2008/0059474 A1 | 3/2008 | Lim |

(56) References Cited

U.S. PATENT DOCUMENTS

| | | |
|---|---|---|
| 2008/0059656 A1 | 3/2008 | Saliba et al. |
| 2008/0060080 A1 | 3/2008 | Lim |
| 2008/0063210 A1 | 3/2008 | Goodman et al. |
| 2008/0065881 A1 | 3/2008 | Dawson et al. |
| 2008/0077631 A1 | 3/2008 | Petri |
| 2008/0091763 A1 | 4/2008 | Devonshire et al. |
| 2008/0091790 A1 | 4/2008 | Beck |
| 2008/0104277 A1 | 5/2008 | Tian |
| 2008/0114720 A1 | 5/2008 | Smith et al. |
| 2008/0133674 A1 | 6/2008 | Knauerhase et al. |
| 2008/0140732 A1 | 6/2008 | Wilson et al. |
| 2008/0147790 A1 | 6/2008 | Malaney et al. |
| 2008/0151817 A1 | 6/2008 | Fitchett et al. |
| 2008/0154873 A1 | 6/2008 | Redlich et al. |
| 2008/0182628 A1 | 7/2008 | Lee et al. |
| 2008/0183467 A1 | 7/2008 | Yuan et al. |
| 2008/0184130 A1 | 7/2008 | Tien et al. |
| 2008/0194239 A1 | 8/2008 | Hagan |
| 2008/0195673 A1 | 8/2008 | Hamel et al. |
| 2008/0215883 A1 | 9/2008 | Fok et al. |
| 2008/0222654 A1 | 9/2008 | Xu et al. |
| 2008/0243846 A1 | 10/2008 | Rasmussen |
| 2008/0243855 A1 | 10/2008 | Prahlad et al. |
| 2008/0250333 A1 | 10/2008 | Reeves et al. |
| 2008/0250348 A1 | 10/2008 | Alimpich et al. |
| 2008/0263099 A1 | 10/2008 | Brady-Kalnay et al. |
| 2008/0271095 A1 | 10/2008 | Shafton |
| 2008/0276158 A1 | 11/2008 | Lim et al. |
| 2008/0281972 A1 | 11/2008 | Gupta et al. |
| 2008/0294899 A1 | 11/2008 | Gazzetta et al. |
| 2008/0306900 A1 | 12/2008 | Tamura |
| 2009/0015864 A1 | 1/2009 | Hasegawa |
| 2009/0019093 A1 | 1/2009 | Brodersen et al. |
| 2009/0019426 A1 | 1/2009 | Baeumer et al. |
| 2009/0030710 A1 | 1/2009 | Levine |
| 2009/0043848 A1 | 2/2009 | Kordun |
| 2009/0044128 A1 | 2/2009 | Baumgarten et al. |
| 2009/0049131 A1 | 2/2009 | Lyle et al. |
| 2009/0097374 A1 | 4/2009 | Shoji et al. |
| 2009/0119322 A1 | 5/2009 | Mills et al. |
| 2009/0125469 A1 | 5/2009 | McDonald et al. |
| 2009/0132651 A1 | 5/2009 | Roger et al. |
| 2009/0138808 A1* | 5/2009 | Moromisato ........... G06Q 10/10 715/758 |
| 2009/0150417 A1 | 6/2009 | Ghods et al. |
| 2009/0150627 A1 | 6/2009 | Benhase et al. |
| 2009/0158142 A1 | 6/2009 | Arthursson et al. |
| 2009/0164438 A1 | 6/2009 | Delacruz |
| 2009/0171983 A1 | 7/2009 | Samji et al. |
| 2009/0172201 A1* | 7/2009 | Carmel ................. H04L 67/104 709/248 |
| 2009/0177754 A1 | 7/2009 | Brezina et al. |
| 2009/0193107 A1 | 7/2009 | Srinivasan et al. |
| 2009/0193345 A1 | 7/2009 | Wensley et al. |
| 2009/0198772 A1 | 8/2009 | Kim et al. |
| 2009/0210459 A1* | 8/2009 | Nair ..................... G06F 17/2288 |
| 2009/0214115 A1 | 8/2009 | Kimura et al. |
| 2009/0235167 A1 | 9/2009 | Boyer et al. |
| 2009/0235181 A1 | 9/2009 | Saliba et al. |
| 2009/0235189 A1 | 9/2009 | Aybes et al. |
| 2009/0249224 A1 | 10/2009 | Davis et al. |
| 2009/0254589 A1 | 10/2009 | Nair et al. |
| 2009/0260060 A1 | 10/2009 | Smith et al. |
| 2009/0265430 A1 | 10/2009 | Bechtel et al. |
| 2009/0271708 A1 | 10/2009 | Peters et al. |
| 2009/0276771 A1 | 11/2009 | Nickolov et al. |
| 2009/0282212 A1 | 11/2009 | Peterson |
| 2009/0282483 A1 | 11/2009 | Bennett |
| 2009/0300356 A1 | 12/2009 | Crandell |
| 2009/0300527 A1 | 12/2009 | Malcolm et al. |
| 2009/0327358 A1 | 12/2009 | Lukiyanov et al. |
| 2009/0327405 A1 | 12/2009 | FitzGerald et al. |
| 2009/0327961 A1 | 12/2009 | De Vorchik et al. |
| 2010/0011292 A1 | 1/2010 | Marinkovich et al. |
| 2010/0011447 A1 | 1/2010 | Jothimani |
| 2010/0017262 A1 | 1/2010 | Iyer et al. |
| 2010/0017619 A1 | 1/2010 | Errico |
| 2010/0036929 A1 | 2/2010 | Scherpa et al. |
| 2010/0042720 A1 | 2/2010 | Stienhans et al. |
| 2010/0057560 A1 | 3/2010 | Skudlark et al. |
| 2010/0057785 A1 | 3/2010 | Khosravy et al. |
| 2010/0076946 A1 | 3/2010 | Barker et al. |
| 2010/0082396 A1 | 4/2010 | Caldwell et al. |
| 2010/0082534 A1* | 4/2010 | Sagar ................ G06F 17/30174 707/610 |
| 2010/0082634 A1 | 4/2010 | Leban |
| 2010/0083136 A1 | 4/2010 | Komine et al. |
| 2010/0088150 A1 | 4/2010 | Mazhar et al. |
| 2010/0092126 A1 | 4/2010 | Kaliszek et al. |
| 2010/0093310 A1 | 4/2010 | Gbadegesin et al. |
| 2010/0107225 A1 | 4/2010 | Spencer et al. |
| 2010/0122184 A1 | 5/2010 | Vonog et al. |
| 2010/0131868 A1 | 5/2010 | Chawla et al. |
| 2010/0151431 A1 | 6/2010 | Miller |
| 2010/0153835 A1 | 6/2010 | Xiong et al. |
| 2010/0154025 A1 | 6/2010 | Esteve Balducci et al. |
| 2010/0162365 A1 | 6/2010 | Del Real |
| 2010/0162374 A1 | 6/2010 | Nair |
| 2010/0179940 A1 | 7/2010 | Gilder et al. |
| 2010/0185463 A1 | 7/2010 | Noland et al. |
| 2010/0185932 A1 | 7/2010 | Coffman et al. |
| 2010/0191689 A1 | 7/2010 | Cortes et al. |
| 2010/0198783 A1 | 8/2010 | Wang et al. |
| 2010/0198871 A1 | 8/2010 | Stiegler et al. |
| 2010/0198944 A1 | 8/2010 | Ho et al. |
| 2010/0205392 A1 | 8/2010 | Schnapp et al. |
| 2010/0205537 A1 | 8/2010 | Knighton et al. |
| 2010/0212010 A1 | 8/2010 | Stringer et al. |
| 2010/0218237 A1 | 8/2010 | Ferris et al. |
| 2010/0223378 A1 | 9/2010 | Wei |
| 2010/0229085 A1 | 9/2010 | Nelson et al. |
| 2010/0235526 A1 | 9/2010 | Carter et al. |
| 2010/0235539 A1 | 9/2010 | Carter et al. |
| 2010/0241611 A1 | 9/2010 | Zuber |
| 2010/0241972 A1 | 9/2010 | Spataro et al. |
| 2010/0242028 A1 | 9/2010 | Weigert |
| 2010/0250120 A1 | 9/2010 | Waupotitsch et al. |
| 2010/0251340 A1 | 9/2010 | Martin et al. |
| 2010/0257457 A1 | 10/2010 | De Goes |
| 2010/0262582 A1 | 10/2010 | Garcia-Ascanio et al. |
| 2010/0262953 A1 | 10/2010 | Barboni et al. |
| 2010/0267588 A1 | 10/2010 | Nelson et al. |
| 2010/0269164 A1 | 10/2010 | Sosnosky et al. |
| 2010/0274765 A1 | 10/2010 | Murphy et al. |
| 2010/0274772 A1 | 10/2010 | Samuels |
| 2010/0281118 A1 | 11/2010 | Donahue et al. |
| 2010/0290623 A1 | 11/2010 | Banks et al. |
| 2010/0306379 A1 | 12/2010 | Ferris |
| 2010/0312615 A1 | 12/2010 | Murphy et al. |
| 2010/0318893 A1 | 12/2010 | Matthews et al. |
| 2010/0322252 A1 | 12/2010 | Suganthi et al. |
| 2010/0325155 A1 | 12/2010 | Skinner et al. |
| 2010/0325527 A1 | 12/2010 | Estrada et al. |
| 2010/0325559 A1 | 12/2010 | Westerinen et al. |
| 2010/0325655 A1 | 12/2010 | Perez |
| 2010/0332401 A1 | 12/2010 | Prahlad et al. |
| 2010/0332818 A1 | 12/2010 | Prahlad et al. |
| 2010/0332962 A1 | 12/2010 | Hammer et al. |
| 2010/0333116 A1 | 12/2010 | Prahlad et al. |
| 2011/0001763 A1 | 1/2011 | Murakami |
| 2011/0016409 A1 | 1/2011 | Grosz et al. |
| 2011/0022559 A1 | 1/2011 | Andersen et al. |
| 2011/0022812 A1 | 1/2011 | van der Linden et al. |
| 2011/0029883 A1 | 2/2011 | Lussier et al. |
| 2011/0040812 A1 | 2/2011 | Phillips |
| 2011/0041083 A1 | 2/2011 | Gabai et al. |
| 2011/0047413 A1 | 2/2011 | McGill et al. |
| 2011/0047484 A1 | 2/2011 | Mount et al. |
| 2011/0052155 A1 | 3/2011 | Desmarais et al. |
| 2011/0054968 A1 | 3/2011 | Galaviz |
| 2011/0055299 A1 | 3/2011 | Phillips |
| 2011/0055721 A1 | 3/2011 | Jain et al. |
| 2011/0061045 A1 | 3/2011 | Phillips |
| 2011/0061046 A1 | 3/2011 | Phillips |

(56) References Cited

U.S. PATENT DOCUMENTS

| | | |
|---|---|---|
| 2011/0065082 A1 | 3/2011 | Gal et al. |
| 2011/0066951 A1 | 3/2011 | Ward-Karet et al. |
| 2011/0078243 A1 | 3/2011 | Carpenter et al. |
| 2011/0083167 A1 | 4/2011 | Carpenter et al. |
| 2011/0093567 A1 | 4/2011 | Jeon et al. |
| 2011/0099006 A1 | 4/2011 | Sundararaman et al. |
| 2011/0107088 A1 | 5/2011 | Eng et al. |
| 2011/0107205 A1 | 5/2011 | Chow et al. |
| 2011/0113320 A1 | 5/2011 | Neff et al. |
| 2011/0119313 A1 | 5/2011 | Sung et al. |
| 2011/0125847 A1 | 5/2011 | Cocheu et al. |
| 2011/0131299 A1 | 6/2011 | Sardary |
| 2011/0137991 A1 | 6/2011 | Russell |
| 2011/0138479 A1 | 6/2011 | Jain et al. |
| 2011/0142410 A1 | 6/2011 | Ishii |
| 2011/0145187 A1 | 6/2011 | Himmelsbach et al. |
| 2011/0145282 A1 | 6/2011 | Moore et al. |
| 2011/0145589 A1 | 6/2011 | Camenisch et al. |
| 2011/0145744 A1 | 6/2011 | Haynes et al. |
| 2011/0154180 A1 | 6/2011 | Evanitsky et al. |
| 2011/0161289 A1 | 6/2011 | Pei et al. |
| 2011/0167125 A1 | 7/2011 | Achlioptas |
| 2011/0167353 A1 | 7/2011 | Grosz et al. |
| 2011/0167435 A1 | 7/2011 | Fang |
| 2011/0185292 A1 | 7/2011 | Chawla et al. |
| 2011/0202424 A1 | 8/2011 | Chun et al. |
| 2011/0202599 A1 | 8/2011 | Yuan et al. |
| 2011/0208958 A1 | 8/2011 | Stuedi et al. |
| 2011/0209064 A1 | 8/2011 | Jorgensen et al. |
| 2011/0213765 A1 | 9/2011 | Cui et al. |
| 2011/0218964 A1 | 9/2011 | Hagan et al. |
| 2011/0219419 A1 | 9/2011 | Reisman |
| 2011/0225417 A1 | 9/2011 | Maharajh et al. |
| 2011/0238458 A1 | 9/2011 | Purcell et al. |
| 2011/0238621 A1 | 9/2011 | Agrawal |
| 2011/0238759 A1 | 9/2011 | Spataro et al. |
| 2011/0239135 A1 | 9/2011 | Spataro et al. |
| 2011/0246294 A1 | 10/2011 | Robb et al. |
| 2011/0246950 A1 | 10/2011 | Luna et al. |
| 2011/0252071 A1 | 10/2011 | Cidon |
| 2011/0252312 A1 | 10/2011 | Lemonik et al. |
| 2011/0252320 A1 | 10/2011 | Arrasvuori et al. |
| 2011/0252339 A1 | 10/2011 | Lemonik et al. |
| 2011/0258461 A1 | 10/2011 | Bates |
| 2011/0258561 A1 | 10/2011 | Ladouceur et al. |
| 2011/0264621 A1* | 10/2011 | Burjoski ........... H04L 29/12132 707/610 |
| 2011/0276683 A1 | 11/2011 | Goldschlag et al. |
| 2011/0277027 A1 | 11/2011 | Hayton et al. |
| 2011/0282710 A1 | 11/2011 | Akkiraju et al. |
| 2011/0289433 A1 | 11/2011 | Whalin et al. |
| 2011/0295798 A1 | 12/2011 | Shain |
| 2011/0296022 A1 | 12/2011 | Ferris et al. |
| 2011/0313803 A1 | 12/2011 | Friend et al. |
| 2011/0314145 A1 | 12/2011 | Raleigh et al. |
| 2011/0320197 A1 | 12/2011 | Conejero et al. |
| 2011/0320936 A1* | 12/2011 | Mohan ................ G06F 9/542 715/255 |
| 2012/0030187 A1 | 2/2012 | Marano et al. |
| 2012/0036370 A1 | 2/2012 | Lim et al. |
| 2012/0057696 A1 | 3/2012 | Chew |
| 2012/0064879 A1 | 3/2012 | Panei |
| 2012/0072436 A1 | 3/2012 | Pierre et al. |
| 2012/0079095 A1 | 3/2012 | Evans et al. |
| 2012/0089610 A1 | 4/2012 | Agrawal et al. |
| 2012/0089659 A1 | 4/2012 | Halevi et al. |
| 2012/0089710 A1* | 4/2012 | Rakowski ........... H04L 41/0803 709/220 |
| 2012/0096521 A1 | 4/2012 | Peddada |
| 2012/0101995 A1 | 4/2012 | Agetsuma et al. |
| 2012/0108200 A1 | 5/2012 | Rubin et al. |
| 2012/0110005 A1 | 5/2012 | Kuo et al. |
| 2012/0110436 A1 | 5/2012 | Adler, III et al. |
| 2012/0110443 A1 | 5/2012 | Lemonik et al. |
| 2012/0117626 A1 | 5/2012 | Yates et al. |
| 2012/0124306 A1 | 5/2012 | Abercrombie et al. |
| 2012/0124547 A1 | 5/2012 | Halbedel |
| 2012/0130900 A1 | 5/2012 | Tang et al. |
| 2012/0134491 A1 | 5/2012 | Liu |
| 2012/0136936 A1 | 5/2012 | Quintuna |
| 2012/0143825 A1 | 6/2012 | Boehm et al. |
| 2012/0144283 A1 | 6/2012 | Hill et al. |
| 2012/0150888 A1 | 6/2012 | Hyatt et al. |
| 2012/0151265 A1 | 6/2012 | Bender et al. |
| 2012/0151551 A1 | 6/2012 | Readshaw et al. |
| 2012/0158908 A1 | 6/2012 | Luna et al. |
| 2012/0159178 A1 | 6/2012 | Lin et al. |
| 2012/0159310 A1 | 6/2012 | Chang et al. |
| 2012/0166516 A1 | 6/2012 | Simmons et al. |
| 2012/0173612 A1 | 7/2012 | Vegesna-Venkata et al. |
| 2012/0173625 A1 | 7/2012 | Berger |
| 2012/0179802 A1 | 7/2012 | Narasimhan et al. |
| 2012/0179981 A1 | 7/2012 | Whalin et al. |
| 2012/0185355 A1 | 7/2012 | Kilroy |
| 2012/0185913 A1 | 7/2012 | Martinez et al. |
| 2012/0192055 A1 | 7/2012 | Antebi et al. |
| 2012/0192086 A1 | 7/2012 | Ghods et al. |
| 2012/0203670 A1 | 8/2012 | Piersol |
| 2012/0203908 A1 | 8/2012 | Beaty et al. |
| 2012/0204032 A1 | 8/2012 | Wilkins et al. |
| 2012/0206653 A1 | 8/2012 | Graves et al. |
| 2012/0207449 A1 | 8/2012 | Angquist et al. |
| 2012/0209815 A1 | 8/2012 | Carson et al. |
| 2012/0209889 A1 | 8/2012 | Agnoli et al. |
| 2012/0214444 A1 | 8/2012 | McBride et al. |
| 2012/0218885 A1 | 8/2012 | Abel et al. |
| 2012/0221789 A1 | 8/2012 | Felter |
| 2012/0224691 A1 | 9/2012 | Purohit |
| 2012/0226767 A1 | 9/2012 | Luna et al. |
| 2012/0233155 A1 | 9/2012 | Gallmeier et al. |
| 2012/0233205 A1 | 9/2012 | McDermott |
| 2012/0233543 A1 | 9/2012 | Vagell et al. |
| 2012/0240061 A1 | 9/2012 | Hillenius et al. |
| 2012/0240183 A1 | 9/2012 | Sinha |
| 2012/0257249 A1 | 10/2012 | Natarajan |
| 2012/0259964 A1 | 10/2012 | Lin et al. |
| 2012/0263166 A1 | 10/2012 | Cho et al. |
| 2012/0266203 A1 | 10/2012 | Elhadad et al. |
| 2012/0284290 A1 | 11/2012 | Keebler et al. |
| 2012/0284638 A1 | 11/2012 | Cutler et al. |
| 2012/0284664 A1 | 11/2012 | Zhao |
| 2012/0291011 A1 | 11/2012 | Quine |
| 2012/0296790 A1 | 11/2012 | Robb |
| 2012/0309540 A1 | 12/2012 | Holme et al. |
| 2012/0311157 A1 | 12/2012 | Erickson et al. |
| 2012/0311499 A1 | 12/2012 | Dellinger et al. |
| 2012/0317239 A1 | 12/2012 | Mulder et al. |
| 2012/0317487 A1 | 12/2012 | Lieb et al. |
| 2012/0328259 A1 | 12/2012 | Seibert, Jr. et al. |
| 2012/0331177 A1 | 12/2012 | Jensen |
| 2012/0331441 A1 | 12/2012 | Adamson |
| 2013/0007245 A1 | 1/2013 | Malik et al. |
| 2013/0007471 A1 | 1/2013 | Grab et al. |
| 2013/0007894 A1 | 1/2013 | Dang et al. |
| 2013/0013560 A1 | 1/2013 | Goldberg et al. |
| 2013/0014023 A1 | 1/2013 | Lee et al. |
| 2013/0042106 A1 | 2/2013 | Persaud et al. |
| 2013/0054634 A1 | 2/2013 | Chakraborty et al. |
| 2013/0055127 A1 | 2/2013 | Saito et al. |
| 2013/0067232 A1 | 3/2013 | Cheung et al. |
| 2013/0073403 A1 | 3/2013 | Tuchman et al. |
| 2013/0073621 A1 | 3/2013 | Waddoups et al. |
| 2013/0080765 A1 | 3/2013 | Mohanty et al. |
| 2013/0080919 A1 | 3/2013 | Kiang et al. |
| 2013/0110565 A1 | 5/2013 | Means, Jr. et al. |
| 2013/0110961 A1 | 5/2013 | Jadhav |
| 2013/0117226 A1 | 5/2013 | Jain et al. |
| 2013/0117337 A1 | 5/2013 | Dunham |
| 2013/0117376 A1 | 5/2013 | Filman et al. |
| 2013/0124458 A1 | 5/2013 | Barreto et al. |
| 2013/0124638 A1 | 5/2013 | Barreto et al. |
| 2013/0124984 A1 | 5/2013 | Kuspa |
| 2013/0138608 A1 | 5/2013 | Smith |
| 2013/0138615 A1 | 5/2013 | Gupta et al. |

(56) References Cited

U.S. PATENT DOCUMENTS

| | | |
|---|---|---|
| 2013/0151690 A1 | 6/2013 | Shah et al. |
| 2013/0159411 A1 | 6/2013 | Bowen |
| 2013/0163289 A1 | 6/2013 | Kim et al. |
| 2013/0167253 A1 | 6/2013 | Seleznev et al. |
| 2013/0179947 A1 | 7/2013 | Kline, III et al. |
| 2013/0185347 A1 | 7/2013 | Romano |
| 2013/0185452 A1 | 7/2013 | Burckart et al. |
| 2013/0185558 A1 | 7/2013 | Seibert et al. |
| 2013/0191339 A1* | 7/2013 | Haden ............... G06F 17/3007 707/638 |
| 2013/0198600 A1 | 8/2013 | Lockhart et al. |
| 2013/0212067 A1 | 8/2013 | Piasecki et al. |
| 2013/0212486 A1 | 8/2013 | Joshi et al. |
| 2013/0218978 A1 | 8/2013 | Weinstein et al. |
| 2013/0219176 A1 | 8/2013 | Akella et al. |
| 2013/0226876 A1 | 8/2013 | Gati et al. |
| 2013/0227522 A1 | 8/2013 | Lerum et al. |
| 2013/0239049 A1 | 9/2013 | Perrodin et al. |
| 2013/0246901 A1 | 9/2013 | Massand |
| 2013/0246932 A1 | 9/2013 | Zaveri et al. |
| 2013/0254699 A1 | 9/2013 | Bashir et al. |
| 2013/0262210 A1 | 10/2013 | Savage et al. |
| 2013/0262862 A1 | 10/2013 | Hartley |
| 2013/0268480 A1 | 10/2013 | Dorman |
| 2013/0268491 A1 | 10/2013 | Chung et al. |
| 2013/0268999 A1 | 10/2013 | Kiang et al. |
| 2013/0275398 A1 | 10/2013 | Dorman et al. |
| 2013/0275429 A1 | 10/2013 | York et al. |
| 2013/0275509 A1 | 10/2013 | Micucci et al. |
| 2013/0282658 A1 | 10/2013 | Besen et al. |
| 2013/0282830 A1 | 10/2013 | Besen et al. |
| 2013/0283106 A1 | 10/2013 | King et al. |
| 2013/0304679 A1 | 11/2013 | Fleming et al. |
| 2013/0304694 A1 | 11/2013 | Barreto et al. |
| 2013/0304697 A1 | 11/2013 | Movida |
| 2013/0305039 A1 | 11/2013 | Gauda |
| 2013/0325803 A1 | 12/2013 | Akirav et al. |
| 2013/0326344 A1 | 12/2013 | Masselle et al. |
| 2014/0006357 A1 | 1/2014 | Davis et al. |
| 2014/0006465 A1 | 1/2014 | Davis et al. |
| 2014/0007205 A1 | 1/2014 | Oikonomou |
| 2014/0013112 A1 | 1/2014 | Cidon et al. |
| 2014/0019497 A1 | 1/2014 | Cidon et al. |
| 2014/0019498 A1 | 1/2014 | Cidon et al. |
| 2014/0032489 A1 | 1/2014 | Hebbar et al. |
| 2014/0032616 A1 | 1/2014 | Nack |
| 2014/0033277 A1 | 1/2014 | Xiao et al. |
| 2014/0033291 A1 | 1/2014 | Liu |
| 2014/0033324 A1 | 1/2014 | Kiang et al. |
| 2014/0040182 A1 | 2/2014 | Gilder et al. |
| 2014/0040206 A1 | 2/2014 | Ramakrishnan et al. |
| 2014/0047509 A1 | 2/2014 | Bhogal et al. |
| 2014/0052939 A1 | 2/2014 | Tseng et al. |
| 2014/0059002 A1 | 2/2014 | Lockhart et al. |
| 2014/0059217 A1 | 2/2014 | Pizurica |
| 2014/0068589 A1 | 3/2014 | Barak |
| 2014/0074629 A1 | 3/2014 | Rathod |
| 2014/0082071 A1 | 3/2014 | Rexer |
| 2014/0149461 A1 | 5/2014 | Wijayaratne et al. |
| 2014/0150023 A1 | 5/2014 | Gudorf et al. |
| 2014/0156373 A1 | 6/2014 | Roberts et al. |
| 2014/0172595 A1 | 6/2014 | Beddow et al. |
| 2014/0172783 A1 | 6/2014 | Suzuki et al. |
| 2014/0172799 A1 | 6/2014 | Dorman |
| 2014/0188798 A1 | 7/2014 | Mackenzie et al. |
| 2014/0201138 A1 | 7/2014 | Dorman et al. |
| 2014/0201145 A1 | 7/2014 | Dorman et al. |
| 2014/0215303 A1 | 7/2014 | Grigorovitch et al. |
| 2014/0230011 A1 | 8/2014 | Drewry et al. |
| 2014/0244600 A1 | 8/2014 | Schmidt et al. |
| 2014/0258350 A1 | 9/2014 | Duval et al. |
| 2014/0280605 A1 | 9/2014 | Zhang |
| 2014/0337291 A1 | 11/2014 | Dorman et al. |
| 2014/0337482 A1* | 11/2014 | Houston ............... H04L 67/06 709/219 |
| 2014/0337491 A1 | 11/2014 | Barreto et al. |
| 2014/0344456 A1 | 11/2014 | Buzbee et al. |
| 2014/0359085 A1 | 12/2014 | Chen |
| 2014/0359286 A1 | 12/2014 | Wen et al. |
| 2014/0372376 A1 | 12/2014 | Smith et al. |
| 2014/0379647 A1 | 12/2014 | Smith et al. |
| 2014/0379760 A1 | 12/2014 | Martin et al. |
| 2015/0019723 A1 | 1/2015 | Kweon et al. |
| 2015/0039556 A1 | 2/2015 | Mackenzie et al. |
| 2015/0154156 A1 | 6/2015 | Meyers, Jr. et al. |
| 2015/0186668 A1 | 7/2015 | Whaley et al. |
| 2015/0237406 A1 | 8/2015 | Ochoa et al. |
| 2015/0339113 A1 | 11/2015 | Dorman et al. |
| 2016/0065672 A1 | 3/2016 | Savage et al. |
| 2016/0350326 A1 | 12/2016 | Simonetti |

FOREIGN PATENT DOCUMENTS

| | | |
|---|---|---|
| CN | 102264063 A | 11/2011 |
| EP | 0348614 A2 | 1/1990 |
| EP | 0921661 A2 | 6/1999 |
| EP | 1349088 | 10/2003 |
| EP | 1528746 A2 | 5/2005 |
| EP | 1933242 A1 | 6/2008 |
| EP | 2372574 A1 | 10/2011 |
| EP | 2610776 A2 | 7/2013 |
| GB | 2453924 A | 4/2009 |
| GB | 2471282 A | 12/2010 |
| JP | 09-101937 | 4/1997 |
| JP | 11-025059 | 1/1999 |
| JP | 2003273912 A | 9/2003 |
| JP | 2004310272 A | 11/2004 |
| JP | 09-269925 | 10/2007 |
| JP | 2008250944 A | 10/2008 |
| KR | 20020017444 A | 3/2002 |
| KR | 20040028036 A | 4/2004 |
| KR | 20050017674 A | 2/2005 |
| KR | 20060070306 A | 6/2006 |
| KR | 20060114871 A | 11/2006 |
| KR | 20070043353 A | 4/2007 |
| KR | 20070100477 A | 10/2007 |
| KR | 20100118836 A | 11/2010 |
| KR | 20110074096 A | 6/2011 |
| KR | 20110076831 A | 7/2011 |
| WO | WO-0007104 A1 | 2/2000 |
| WO | WO-2002019128 A1 | 3/2002 |
| WO | WO-2004097681 A1 | 11/2004 |
| WO | WO-2006028850 A2 | 3/2006 |
| WO | WO-2007024438 A1 | 3/2007 |
| WO | WO-2007035637 A2 | 3/2007 |
| WO | WO-2007113573 A2 | 10/2007 |
| WO | WO-2008011142 A2 | 1/2008 |
| WO | WO-2008076520 A2 | 6/2008 |
| WO | WO-2011109416 A2 | 9/2011 |
| WO | WO-2012167272 A1 | 12/2012 |
| WO | WO-2013009328 A2 | 1/2013 |
| WO | WO-2013013217 A1 | 1/2013 |
| WO | WO-2013041763 A1 | 3/2013 |
| WO | WO-2013166520 A1 | 11/2013 |

OTHER PUBLICATIONS

Exam Report for GB1311417.8 Applicant: Box, Inc. dated Nov. 7, 2014, 2 pages.
Exam Report for GB1311421.0 Applicant: Box, Inc. dated Nov. 7, 2014, 4 pages.
Exam Report for GB1316682.2 Applicant: Box, Inc. dated Nov. 19, 2014, 6 pages.
Exam Report for GB1312095.1 Applicant: Box, Inc. dated Nov. 19, 2014, 5 pages.
Exam Report for GB1313559.5 Applicant: Box, Inc. dated Nov. 4, 2014, 2 pages.
User's Guide for SMART Board Software for Windows, published Dec. 2004, 90 pages.
Zambonini et al., "Automated Measuring of Interaction with User Interfaces," Published as WO2007113573 Oct. 2007, 19 pages.
Exam Report for GB1311459.0 Applicant: Box, Inc. dated Aug. 19, 2013, 6 pages.

(56) References Cited

OTHER PUBLICATIONS

"Dropbox: Sync only specific folders," posted on Feb. 9, 2012, available online at http://www.tech-recipes.com/rx/20865/dropbox-sync-only-specific-folders/, 4 pages.
Exam Report for GB1220644.7 Applicant: Box, Inc. dated May 1, 2015, 4 pages.
Invens, "Using and Troubleshooting Offline Files," Jun. 23, 2002, Windows IT Pro, pp. 1-5.
Invens, "Using and Troubleshooting Offline Files," Jun. 23, 2002, Windows IT Pro, Figures 1 and 2, 2 pages.
"How-to Geek, How to Sync Specific Folders With Dropbox," originally written on Jun. 20, 2010 and archived version retrieved from WaybackMachine as published online on Jun. 4, 2010 at http://www.howtogeek.com/howto/18285/sync-specific-folders-with-dropbox, 7 pages.
"Conceptboard", One-Step Solution for Online Collaboration, retrieved from websites http://conceptboard.com and https://www.youtube.com/user/ConceptboardApp?feature=watch, printed on Jun. 13, 2013, 9 pages.
"How-to Geek, How to Sync Specific Folders With Dropbox," downloaded from the internet http://www.howtogeek.com, Apr. 23, 2013, 5 pages.
"Microsoft Office SharePoint 2007 User Guide," Feb. 16, 2010, pp. 1-48.
"PaperPort Professional 14," PC Mag. Com review, published Feb. 2012, Ziff Davis, Inc., 8 pages.
"PaperPort," Wikipedia article (old revision), published May 19, 2012, Wikipedia Foundation, 2 pages.
"Quickoffice Enhances Android Mobile office Application for Improved Productivity on latest Smartphone and Table Devices," QuickOffice Press Release, Nov. 21, 2011, QuickOffice Inc., 2 pages.
"QuickOffice," Wikipedia Article (old revision), published May 9, 2012, Wikipedia Foundation, 2 pages.
"Understanding Metadata," National Information Standards Organization, NISO Press, 2004, 20 pages.
Cisco, "FTP Load Balancing on ACE in Routed Mode Configuration Example," DocWiki, Jun. 2011, 7 pages.
Conner, "Google Apps: The Missing Manual," published by O'Reilly Media, May 27, 2008, 24 pages.
Exam Report for EP13158415.3, Applicant: Box, Inc. dated Jun. 4, 2013, 8 pages.
Exam Report for EP13168784.0, Applicant: Box, Inc. dated Nov. 21, 2013, 7 pages.
Exam Report for GB1300188.8, Applicant: Box, Inc. dated May 31, 2013, 8 pages.
Exam Report for GB1306011.6, Applicant: Box, Inc. dated Apr. 18, 2013, 8 pages.
Exam Report for GB1309209.3, Applicant: Box, Inc. dated Oct. 30, 2013, 11 pages.
Exam Report for GB1310666.1, Applicant: Box, Inc. dated Aug. 30, 2013, 10 pages.
Exam Report for GB1311417.8, Applicant: Box, Inc. dated Dec. 20, 2013, 5 pages.
Exam Report for GB1312095.1, Applicant: Box, Inc. dated Dec. 12, 2013, 7 pages.
Exam Report for GB1312874.9, Applicant: Box, Inc. dated Dec. 20, 2013, 11 pages.
Exam Report for GB1313559.5, Applicant: Box, Inc., dated Aug. 22, 2013, 19 pages.
Exam Report for GB1316532.9, Applicant: Box, Inc. dated Oct. 31, 2013, 10 pages.
Exam Report for GB1316533.7, Applicant: Box, Inc. dated Oct. 8, 2013, 9 pages.
Exam Report for GB1316971.9, Applicant: Box, Inc. dated Nov. 26, 2013, 10 pages.
Exam Report for GB1317600.3, Applicant: Box, Inc. dated Nov. 21, 2013, 8 pages.
Exam Report for GB1318373.6, Applicant: Box, Inc. dated Dec. 17, 2013, 4 pages.
Exam Report for GB1320902.8, Applicant: Box, Inc. dated Dec. 20, 2013, 4 pages.
Gedymin, "Cloud computing with an emphasis on Google App Engine," Master Final Project, Sep. 2011, 146 pages.
Google Docs, http://web.Archive.org/web/20100413105758/http://en.wikipedia.org/wiki/Google_docs, Apr. 13, 2010, 6 pages.
International Search Report and Written Opinion for PCT/US2008/012973 dated Apr. 30, 2009, pp. 1-11.
International Search Report and Written Opinion for PCT/US2011/039126 dated Oct. 6, 2011, pp. 1-13.
International Search Report and Written Opinion for PCT/US2011/041308 dated Jul. 2, 2012, pp. 1-16.
International Search Report and Written Opinion for PCT/US2011/056472 dated Jun. 22, 2012, pp. 1-12.
International Search Report and Written Opinion for PCT/US2011/057938, Applicant: Box, Inc., dated Mar. 29, 2013, 10 pages.
International Search Report and Written Opinion for PCT/US2011/060875 dated Oct. 30, 2012, pp. 1-10.
International Search Report and Written Opinion for PCT/US2012/056955, Applicant: Box, Inc., dated Mar. 27, 2013, pp. 1-11.
International Search Report and Written Opinion for PCT/US2012/063041, Applicant: Box, Inc., dated Mar. 29, 2013, 12 pages.
International Search Report and Written Opinion for PCT/US2012/065617, Applicant: Box, Inc., dated Mar. 29, 2013, 9 pages.
International Search Report and Written Opinion for PCT/US2012/067126, Applicant: Box, Inc., dated Mar. 29, 2013, 10 pages.
International Search Report and Written Opinion for PCT/US2012/070366, Applicant: Box, Inc., dated Apr. 24, 2013, 10 pages.
International Search Report and Written Opinion for PCT/US2013/020267, Applicant: Box, Inc., dated May 7, 2013, 10 pages.
International Search Report and Written Opinion for PCT/US2013/023889, Applicant: Box, Inc., dated Jun. 24, 2013, 13 pages.
International Search Report and Written Opinion for PCT/US2013/029520, Applicant: Box, Inc., dated Jun. 26, 2013, 10 pages.
International Search Report and Written Opinion for PCT/US2013/034662, Applicant: Box, Inc., dated May 31, 2013, 10 pages.
International Search Report and Written Opinion for PCT/US2013/035404, Applicant: Box, Inc., dated Jun. 26, 2013, 13 pages.
International Search Report and Written Opinion for PCT/US2013/039782, Applicant: Box, Inc., dated Aug. 28, 2013, 15 pages.
Internet Forums, http://web.archive.org/web/20100528195550/http://en.wikipedia.org/wiki/Internet_forums, Wikipedia, May 30, 2010, pp. 1-20.
Langfeld L. et al., "Microsoft SharePoint 2003 Unleashed," Chapters 11 and 15, Jun. 2004, pp. 403-404, 557-561, 578-581.
Lars, "35 Very Useful Online Tools for Improving your project Management and Team Collaboration," Apr. 31, 2010, tripwiremagazine.com, pp. 1-32.
Palmer, "Load Balancing FTP Servers," BlogNav, Oct. 2008, 2 pages.
Parr, "Google Docs Improves Commenting, Adds E-mail Notifications," Apr. 16, 2011, mashable.com, pp. 1-6.
Partial International Search Report for PCT/US2011/041308 dated Feb. 27, 2012, pp. 1-2.
Patent Court Document of Approved Judgment for GB0602349.3 and GB0623571.7; Mar. 3, 2009, 17 pages.
Supplementary European Search Report European Application No. EP 08 85 8563 dated Jun. 20, 2011 pp. 1-5.
Wayback, "Wayback machine," Wayback, Jun. 1, 2011, 1 page.
Wiki, http://web.archive.org/web/20100213004936/http://en.wikipedia.org/wiki/Wiki, Feb. 13, 2010, pp. 1-16.
Yahoo! Groups, http://web.archive.org/web/20090320101529/http://en.wikipedia.org/wiki/Yahoo!_Groups, Wikipedia, Mar. 20, 2009, pp. 1-6.
Ivens, "Using and Troubleshooting Offline Files," Jun. 23, 2002, Windows IT Pro, Figure 1.
Ivens, "Configuring Offline Files," Apr. 21, 2002, Windows IT Pro, pp. 1-5.
U.S. Appl. No. 60/992,656, filed Dec. 5, 2007 Methods and Systems for Open Source Collaboration in an Application Service Provider Environment.
U.S. Appl. No. 61/055,901, filed May 23, 2008 Methods and Systems for Open Source Integration.

(56) References Cited

OTHER PUBLICATIONS

U.S. Appl. No. 12/260,533 (U.S. Pat. No. 8,326,814) filed Oct. 29, 2008 (Dec. 4, 2012) Methods and Systems for Open Source Integration.
U.S. Appl. No. 13/030,090 (U.S. Pat. No. 8,140,513) filed Feb. 17, 2011 (Mar. 20, 2012) Methods and Systems for Open Source Collaboration in an Application Service Provider Environment.
U.S. Appl. No. 13/412,549 (U.S. Pat. No. 8,583,619) filed Mar. 5, 2012 (Nov. 12, 2013) Methods and Systems for Open Source Collaboration in an Application Service Provider Environment.
U.S. Appl. No. 13/646,339, filed Oct. 5, 2012 File Management System and Collaboration Service and Integration Capabilities With Third Party Applications.
U.S. Appl. No. 14/073,502, filed Nov. 6, 2013 Methods and Systems for Open Source Collaboration in an Application Service Provider Environment.
U.S. Appl. No. 61/434,810, filed Jan. 20, 2011 Real Time Notifications of Activity and Real-Time Collaboration in a Cloud-Based Environment With Applications in Enterprise Settings.
U.S. Appl. No. 13/152,982, filed Jun. 3, 2011 Real Time Notification of Activities that Occur in a Web-Based Collaboration Environment.
U.S. Appl. No. 13/166,733, filed Jun. 22, 2011 Multimedia Content Preview Rendering in a Cloud Content Management System.
U.S. Appl. No. 61/551,894, filed Oct. 26, 2011 Enhanced Multimedia Content Preview Rendering in a Cloud Content Management System.
U.S. Appl. No. 13/590,012, filed Aug. 20, 2012 Preview Pre-Generation Based on Heuristics and Algorithmic Prediction/Assessment of Predicted User Behavior for Enhancement of User Experience.
U.S. Appl. No. 13/297,230, filed Nov. 15, 2011 Enhanced Multimedia Content Preview Rendering in a Cloud Content Management.
U.S. Appl. No. 61/592,567, filed Jan. 30, 2012 Preview Pre-Generation Based on Heuristics and Algorithmic Prediction/Assessment of Predicted User Behavior for Enhancement of User Experience.
U.S. Appl. No. 61/506,013, filed Jul. 8, 2011 Collaboration Sessions in a Workspace on a Cloud-Based Content Management System.
U.S. Appl. No. 13/208,615, filed Aug. 12, 2011 Collaboration Sessions in a Workspace on a Cloud-Based Content Management System.
U.S. Appl. No. 61/592,394, filed Jan. 30, 2012 Extended Applications of Multimedia Content Previews in the Cloud-Based Content Management System.
U.S. Appl. No. 13/588,356, filed Aug. 17, 2012 Extended Applications of Multimedia Content Previews in the Cloud-Based Content Management System.
U.S. Appl. No. 13/274,268 (U.S. Pat. No. 8,515,902) filed Oct. 14, 2011 (Aug. 20, 2013) Automatic and Semi-Automatic Tagging Features of Work Items in a Shared Workspace for Metadata Tracking in a Cloud-Based Content Management System With Selective or Optional User Contribution.
U.S. Appl. No. 13/968,357, filed Aug. 15, 2013 Automatic and Semi-Automatic Tagging Features of Work Items in a Shared Workspace for Metadata Tracking in a Cloud-Based Content Management System With Selective or Optional User Contribution.
U.S. Appl. No. 61/538,782, filed Sep. 23, 2011 Central Management and Control of User-Contributed Content in a Web-Based Collaboration Environment and Management Console Thereof.
U.S. Appl. No. 13/547,264, filed Jul. 12, 2012 Central Management and Control of User-Contributed Content in a Web-Based Collaboration Environment and Management Console Thereof.
U.S. Appl. No. 13/165,725, filed Jun. 21, 2011 Batch Uploading of Content to a Web-Based Collaboration Environment.
U.S. Appl. No. 61/505,999, filed Jul. 11, 2011 Desktop Application for Access and Interaction With Workspaces in a Cloud-Based Content Management System and Synchronization Mechanisms Thereof.
U.S. Appl. No. 13/282,427, filed Oct. 26, 2011 Desktop Application for Access and Interaction with Workspaces in a Cloud-Based Content Management System and Synchronization Mechanisms Thereof.
U.S. Appl. No. 61/554,450, filed Nov. 1, 2011 Platform and Application Independent Method for Document Editing and Version Tracking Via a Web Browser.
U.S. Appl. No. 13/332,319, filed Dec. 20, 2011 Platform and Application Independent System and Method for Networked File Access and Editing.
U.S. Appl. No. 13/414,480, filed Mar. 7, 2012 Universal File Type Preview for Mobile Devices.
U.S. Appl. No. 61/564,425, filed Nov. 29, 2011 Mobile Platform Folder Synchronization and Offline Synchronization.
U.S. Appl. No. 61/568,430, filed Dec. 8, 2011 Mobile Platform File and Folder Selection Functionalities for Offline Access and Synchronization.
U.S. Appl. No. 13/689,544, filed Nov. 29, 2012 Mobile Platform File and Folder Selection Functionalities for Offline Access and Synchronization.
U.S. Appl. No. 13/345,502, filed Jan. 6, 2012 System and Method for Actionable Event Generation for Task Delegation and Management Via a Discussion Forum in a Web-Based Collaboration Environment.
U.S. Appl. No. 13/619,439, filed Sep. 14, 2012 Batching Notifications of Activities That Occur in a Web-Based Collaboration Environment.
U.S. Appl. No. 61/560,685, filed Nov. 16, 2011 Temporal and Spatial Processing for Asynchronous Delivery in an Ordered Fashion.
U.S. Appl. No. 13/524,501, filed Jun. 15, 2012 Resource Effective Incremental Updating of a Remote Client With Events Which Occurred Via a Cloud-Enabled Platform.
U.S. Appl. No. 13/526,437, filed Jun. 18, 2012 Managing Updates at Clients Used by a User to Access a Cloud-Based Collaboration Service.
U.S. Appl. No. 61/579,551, filed Dec. 22, 2011 System Status Monitoring and Data Health Checking in a Collaborative Environment.
U.S. Appl. No. 13/464,813, filed Apr. 4, 2012 Health Check Services for Web-Based Collaboration Environments.
U.S. Appl. No. 13/405,164, filed Feb. 24, 2012 System and Method for Promoting Enterprise Adoption of a Web-Based Collaboration Environment.
U.S. Appl. No. 13/431,645, filed Mar. 27, 2012 Cloud Service or Storage Use Promotion Via Partnership Driven Automatic Account Upgrades.
U.S. Appl. No. 61/620,554, filed Apr. 5, 2012 Device Pinning Capability for Enterprise Cloud Service and Storage Accounts.
U.S. Appl. No. 13/493,922, filed Jun. 11, 2012 Device Pinning Capability for Enterprise Cloud Service and Storage Accounts.
U.S. Appl. No. 61/649,869, filed Mar. 21, 2012 Selective Application Access Control Via a Cloud-Based Service for Security Enhancement.
U.S. Appl. No. 13/493,783, filed Jun. 11, 2012 Security Enhancement Through Application Access Control.
U.S. Appl. No. 61/702,948, filed Sep. 19, 2012 Cloud-Based Platform Enabled With Media Content Indexed for Text-Based Searches and/or Metadata Extraction.
U.S. Appl. No. 13/829,663, filed Mar. 14, 2013 Cloud-Based Platform Enabled With Media Content Indexed for Text-Based Searches and/or Metadata Extraction.
U.S. Appl. No. 61/702,662, filed Sep. 18, 2012 Sandboxing Individual Applications to Specific User Folders in a Cloud-Based Service.
U.S. Appl. No. 13/830,016, filed Mar. 14, 2013 Sandboxing Individual Applications to Specific User Folders in a Cloud-Based Service.
U.S. Appl. No. 61/620,568, filed Apr. 5, 2012 Synchronization Client Selective Subfolder Syncing in a Cloud-Based Environment.
U.S. Appl. No. 13/856,607, filed Apr. 4, 2013 Method and Apparatus for Selective Subfolder Synchronization in a Cloud-Based Environment.

(56) References Cited

OTHER PUBLICATIONS

U.S. Appl. No. 61/622,868, filed Apr. 11, 2012 Web and Desktop Client Synchronization of Mac Packages With a Cloud-Based Platform.
U.S. Appl. No. 13/618,993, filed Sep. 14, 2012 Cloud Service Enabled to Handle a Set of Files Depicted to a User as a Single File in a Native Operating System.
U.S. Appl. No. 61/643,116, filed May 4, 2012 Hbase Redundancy Implementation for Action Log Framework.
U.S. Appl. No. 13/890,172, filed May 8, 2013 Repository Redundancy Implementation of a System Which Incrementally Updates Clients With Events That Occurred Via a Cloud-Enabled Platform.
U.S. Appl. No. 13/888,308, filed May 6, 2013 Repository Redundancy Implementation of a System Which Incrementally Updates Clients With Events That Occurred Via a Cloud-Enabled Platform.
U.S. Appl. No. 61/693,521, filed Aug. 27, 2012 Backend Implementation of Synchronization Client Selective Subfolder Syncing in a Cloud-Based Environment.
U.S. Appl. No. 14/010,851, filed Aug. 27, 2013 Server Side Techniques for Reducing Database Workload in Implementing Selective Subfolder Synchronization in a Cloud-Based Environment.
U.S. Appl. No. 61/641,824, filed May 2, 2012 Platform and Application Agnostic Method for Seamless File Access in a Mobile Environment.
U.S. Appl. No. 61/650,840, filed May 23, 2012 Platform and Application Agnostic Method for Seamless File Access in a Mobile Environment.
U.S. Appl. No. 61/653,876, filed May 31, 2012 Platform and Application Agnostic Method for Seamless File Access in a Mobile Environment.
U.S. Appl. No. 13/886,147, filed May 2, 2013 System and Method for a Third-Party Application to Access Content Within a Cloud-Based Platform.
U.S. Appl. No. 13/897,421, filed May 19, 2013 Methods, Architectures and Security Mechanisms for a Third-Party Application to Access Content in a Cloud-Based Platform.
U.S. Appl. No. 13/898,200, filed May 20, 2013 Metadata Enabled Third-Party Application Access of Content at a Cloud-Based Platform Via a Native Client to the Cloud-Based Platform.
U.S. Appl. No. 13/898,242, filed May 20, 2013 Identification Verification Mechanisms for a Third-Party Application to Access Content in a Cloud-Based Platform.
U.S. Appl. No. 61/677,909, filed Jul. 3, 2012 Highly Available Ftp Servers for a Cloud-Based Service.
U.S. Appl. No. 13/565,136, filed Aug. 2, 2012 Load Balancing Secure Ftp Connections Among Multiple Ftp Servers.
U.S. Appl. No. 13/649,784 (U.S. Pat. No. 8,179,445) filed Oct. 11, 2012 (May 6, 2014) Highly Available Ftp Servers for a Cloud-Based Service.
U.S. Appl. No. 61/668,626, filed Jul. 6, 2012 Online Shard Migration.
U.S. Appl. No. 13/937,060, filed Jul. 8, 2013 System and Method for Performing Shard Migration to Support Functions of a Cloud-Based Service.
U.S. Appl. No. 61/668,698, filed Jul. 6, 2012 Identification of People as Search Results From Key-Word Based Searches of Content.
U.S. Appl. No. 13/937,101, filed Jul. 8, 2013 Identification of People as Search Results From Key-Word Based Searches of Content in a Cloud-Based Environment.
U.S. Appl. No. 61/668,791, filed Jul. 6, 2012 Systems and Methods for Specifying User and Item Identifiers Within an Email Address for Securely Submitting Comments Via Email.
U.S. Appl. No. 13/937,124, filed Jul. 8, 2013 Systems and Methods for Securely Submitting Comments Among Users Via External Messaging Applications in a Cloud-Based Platform.
U.S. Appl. No. 61/673,671, filed Jul. 19, 2012 Data Loss Prevention Methods and Architectures in a Cloud Service.
U.S. Appl. No. 13/944,184, filed Jul. 17, 2013 Data Loss Prevention (Dlp) Methods and Architectures by a Cloud Service.
U.S. Appl. No. 13/944,241, filed Jul. 17, 2013 Data Loss Prevention (Dlp) Methods by a Cloud Service Including Third Party Integration Architectures.
U.S. Appl. No. 61/694,492, filed Aug. 29, 2012 Method of Streaming File Encryption and Decryption to/From a Collaborative Cloud.
U.S. Appl. No. 13/975,827, filed Aug. 26, 2013 Method of Streaming File Encryption and Decryption to/From a Collaborative Cloud.
U.S. Appl. No. 61/701,823, filed Sep. 17, 2012 Use of a Status Bar Interface Element as a Handle for Revealing Additional Details.
U.S. Appl. No. 13/737,577, filed Jan. 9, 2013 System and Method of a Manipulative Handle in an Interactive Mobile User Interface.
U.S. Appl. No. 61/697,437, filed Sep. 6, 2012 Secure File Portability Between Mobile Applications Using a Server-Based Key Generation Service.
U.S. Appl. No. 13/776,358, filed Feb. 25, 2013 Secure File Portability Between Mobile Applications Using a Server-Based Key Generation Service.
U.S. Appl. No. 61/697,469, filed Sep. 6, 2012 Force Upgrade of a Mobile Application Via Server Side Configuration Files.
U.S. Appl. No. 13/776,467, filed Feb. 25, 2013 Force Upgrade of a Mobile Application Via Server Side Configuration File.
U.S. Appl. No. 61/697,477, filed Sep. 6, 2012 Disabling the Self-Referential Appearance of a Mobile Application in an Intent Via a Background Registration.
U.S. Appl. No. 13/794,401, filed Mar. 11, 2013 Disabling the Self-Referential Appearance of a Mobile Application in an Intent Via A Background Registration.
U.S. Appl. No. 61/697,511, filed Sep. 6, 2012 Channel for Opening and Editing Files From a Cloud Service Provider Based on Intents.
U.S. Appl. No. 13/776,535, filed Feb. 25, 2013 System and Method for Creating a Secure Channel for Inter-Application Communication Based on Intents.
U.S. Appl. No. 61/694,466, filed Aug. 12, 2012 Optimizations for Client and/or Server Feedback Information Enabled Real Time or Near Real Time Enhancement of Upload/Download Performance.
U.S. Appl. No. 61/702,154, filed Sep. 17, 2012 Optimizations for Client and/or Server Feedback Information Enabled Real Time or Near Real Time Enhancement of Upload/Download Performance.
U.S. Appl. No. 61/703,699, filed Sep. 20, 2012 Optimizations for Client and/or Server Feedback Information Enabled Real Time or Near Real Time Enhancement of Upload/Download Performance.
U.S. Appl. No. 13/969,474 (U.S. Pat. No. 8,745,267) filed Aug. 16, 2013 (Jun. 3, 2014) Client-Server Fast Upload and Download Feedback Optimizers.
U.S. Appl. No. 14/293,685, filed Jun. 2, 2014 Enhancement of Upload and/or Download Performance Based on Client and/or Server Feedback Information.
U.S. Appl. No. 61/751,578, filed Jan. 11, 2013 Functionalities, Features, and User Interface of a Synchronization Client to a Cloud-Based Environment.
U.S. Appl. No. 14/153,726, filed Jan. 13, 2014 Functionalities, Features, and User Interface of a Synchronization Client to a Cloud-Based Environment.
U.S. Appl. No. 61/715,208, filed Oct. 17, 2012 Adaptive Architectures for Encryption Key Management in a Cloud-Based Environment.
U.S. Appl. No. 14/056,899, filed Oct. 17, 2013 Remote Key Management in a Cloud-Based Environment.
U.S. Appl. No. 61/709,086, filed Oct. 2, 2012 Visibility, Access Control, Advanced Reporting Api, and Enhanced Data Protection and Security Mechanisms for Administrators in an Enterprise.
U.S. Appl. No. 14/044,261, filed Oct. 2, 2013 System and Method for Enhanced Security and Management Mechanisms for Enterprise Administrators in a Cloud-Based Environment.
U.S. Appl. No. 61/709,653, filed Oct. 4, 2012 Corporate User Discovery and Identification of Recommended Collaborators in a Cloud Platform.
U.S. Appl. No. 14/046,294, filed Oct. 4, 2013 Corporate User Discovery and Identification of Recommended Collaborators in a Cloud Platform.
U.S. Appl. No. 61/709,866, filed Oct. 4, 2012 Enhanced Quick Search Features, Low-Barrier Commenting/Interactive Features in a Collaboration Platform.

(56) References Cited

OTHER PUBLICATIONS

U.S. Appl. No. 14/046,523, filed Oct. 4, 2013 Enhanced Quick Search Features, Low-Barrier Commenting/Interactive Features in a Collaboration Platform.
U.S. Appl. No. 61/709,407, filed Oct. 4, 2012 Seamless Access, Editing, and Creation of Files in a Web Interface or Mobile Interface to a Cloud Platform.
U.S. Appl. No. 14/046,726, filed Oct. 4, 2013 Seamless Access, Editing, and Creation of Files in a Web Interface or Mobile Interface to a Collaborative Cloud Platform.
U.S. Appl. No. 61/710,182, filed Oct. 5, 2012 Embedded Html Folder Widget for Accessing a Cloud Collaboration Platform and Content From Any Site.
U.S. Appl. No. 14/047,223, filed Oct. 7, 2013 System and Method for Generating Embeddable Widgets Which Enable Access to a Cloud-Based Collaboration Platform.
U.S. Appl. No. 61/750,474, filed Jan. 9, 2013 File System Event Monitor and Event Filter Pipeline for a Cloud-Based Platform.
U.S. Appl. No. 61/753,761 Conflict Resolution, Retry Condition Management, and Handling of Problem Files for the Synchronization Client to a Cloud-Based Platform.
U.S. Appl. No. 14/158,626 Conflict Resolution, Retry Condition Management, and Handling of Problem Files for the Synchronization Client to a Cloud-Based Platform.
U.S. Appl. No. 61/739,296, filed Dec. 19, 2012 Synchronization of Read-Only Files/Folders by a Synchronization Client With a Cloud-Based Platform.
U.S. Appl. No. 14/135,311, filed Dec. 19, 2013 Method and Apparatus for Synchronization of Items With Read-Only Permissions in a Cloud-Based Environment.
U.S. Appl. No. 61/748,399, filed Jan. 2, 2013 Handling Action Log Framework Race Conditions for a Synchronization Client to a Cloud-Based Environment.
U.S. Appl. No. 14/146,658, filed Jan. 2, 2014 Race Condition Handling in a System Which Incrementally Updates Clients With Events That Occurred in a Cloud-Based Collaboration Platform.
U.S. Appl. No. 61/822,170, filed May 10, 2013 Identification and Handling of Items to Be Ignored for Synchronization With a Cloud-Based Platform by a Synchronization Client.
U.S. Appl. No. 14/275,890, filed May 13, 2014 Identification and Handling of Items to Be Ignored for Synchronization With a Cloud-Based Platform by a Synchronization Client.
U.S. Appl. No. 61/822,191, filed May 10, 2013 Systems and Methods for Depicting Item Synchronization With a Cloud-Based Platform by a Synchronization Client.
U.S. Appl. No. 14/275,401, filed May 12, 2014 Top Down Delete or Unsynchronization on Delete of and Depiction of Item Synchronization With a Synchronization Client to a Cloud-Based Platform.
U.S. Appl. No. 61/834,756, filed Jun. 13, 2013 Systems and Methods for Event Building, Collapsing, or Monitoring by a Synchronization Client of a Cloud-Based Platform.
U.S. Appl. No. 14/304,038, filed Jun. 13, 2014 Systems and Methods for Synchronization Event Building and/or Collapsing by a Synchronization Component of a Cloud-Based Platform.
U.S. Appl. No. 61/838,176, filed Jun. 21, 2013 Maintaining and Updating File System Shadows on a Local Device by a Synchronization Client of a Cloud-Based Platform.
U.S. Appl. No. 14/312,482, filed Jun. 23, 2014 Maintaining and Updating File System Shadows on a Local Device by a Synchronization Client of a Cloud-Based Platform.
U.S. Appl. No. 61/839,325, filed Jun. 23, 2013 Systems and Methods for Improving Performance of a Cloud-Based Platform.
U.S. Appl. No. 14/314,887, filed Jun. 25, 2014 Systems and Methods for Managing Upgrades, Migration of User Data and Improving Performance of a Cloud-Based Platform.
U.S. Appl. No. 61/839,331, filed Jun. 25, 2013 Systems and Methods for Providing Shell Communication in a Cloud-Based Platform.
U.S. Appl. No. 14/314,677, filed Jun. 25, 2014 Systems and Methods for Providing Shell Communication in a Cloud-Based Platform.
U.S. Appl. No. 13/954,680, filed Jul. 30, 2013 System and Method for Advanced Control Tools for Administrators in a Cloud-Based Service.
U.S. Appl. No. 61/860,050, filed Jul. 30, 2013 Scalability Improvement in a System Which Incrementally Updates Clients With Events That Occurred in a Cloud-Based Collaboration Platform.
U.S. Appl. No. 14/194,091, filed Feb. 28, 2014 Scalability Improvement in a System Which Incrementally Updates Clients With Events That Occurred in a Cloud-Based Collaboration Platform.
U.S. Appl. No. 13/953,668, filed Jul. 29, 2013 System and Method for Advanced Search and Filtering Mechanisms for Enterprise Administrators in a Cloud-Based Environment.
U.S. Appl. No. 14/026,674, filed Sep. 13, 2013 Configurable Event-Based Automation Architecture for Cloud-Based Collaboration Platforms.
U.S. Appl. No. 61/877,917, filed Sep. 13, 2013 Systems and Methods for Configuring Event-Based Automation in Cloud-Based Collaboration Platforms.
U.S. Appl. No. 14/075,849, filed Nov. 8, 2013 Systems and Methods for Configuring Event-Based Automation in Cloud-Based Collaboration Platforms.
U.S. Appl. No. 14/027,149, filed Sep. 13, 2013 Simultaneous Editing/Accessing of Content by Collaborator Invitation Through a Web-Based or Mobile Application to a Cloud-Based Collaboration Platform.
U.S. Appl. No. 14/042,473, filed Sep. 30, 2013 Simultaneous Editing/Accessing of Content by Collaborator Invitation Through a Web-Based or Mobile Application to a Cloud-Based Collaboration Platform.
U.S. Appl. No. 14/026,837, filed Sep. 13, 2013 Mobile Device, Methods and User Interfaces Thereof in a Mobile Device Platform Featuring Multifunctional Access and Engagement in a Collaborative Environment Provided by a Cloud-Based Platform.
U.S. Appl. No. 14/166,414, filed Jan. 28, 2014 System and Method of a Multi-Functional Managing User Interface for Accessing a Cloud-Based Platform Via Mobile Devices.
U.S. Appl. No. 14/027,147, filed Sep. 13, 2013 System and Method for Rendering Document in Web Browser or Mobile Device Regardless of Third-Party Plug-In Software.
U.S. Appl. No. 61/877,938, filed Sep. 13, 2013 High Availability Architecture for a Cloud-Based Concurrent-Access Collaboration Platform.
U.S. Appl. No. 14/474,507, filed Sep. 2, 2014 High Availability Architecture for a Cloud-Based Concurrent-Access Collaboration Platform.
U.S. Appl. No. 61/894,340, filed Oct. 22, 2013 Desktop Application for Accessing a Cloud Collaboration Platform.
U.S. Appl. No. 14/521,134, filed Oct. 22, 2014 Desktop Application for Accessing a Cloud Collaboration Platform.
U.S. Appl. No. 14/472,540, filed Aug. 29, 2014 Enhanced Remote Key Management for an Enterprise in a Cloud-Based Environment.
U.S. Appl. No. 14/474,008, filed Aug. 28, 2014 Configurable Metadata-Based Automation and Content Classification Architecture for Cloud-Based Collaboration Platforms.
Exam Report for GB1316532.9, Applicant: Box, Inc. dated Mar. 27, 2015, 6 pages.
Burney, "How to Move Document from Your Computer to Your iPad and Back Again," May 31, 2011, 3 pages.
Exam Report for GB1413461.3; Applicant: Box, Inc. dated Aug. 21, 2015, 6 pages.
Fu et al., "Efficient and Fine-Grained Sharing of Encrypted Files," Quality of Service (IWQos), 2010 18th International Workshop on year 2010, pp. 1-2.
Exam Report for GB1309209.3, Applicant: Box, Inc. dated Jan. 19, 2015, 6 pages.
"Agilewords—How to Request Approval," YouTube, http://www.youtube.com/watch?v=3-Ov3DYNN3Q, Jan. 31, 2011, 2 pages.
"Agilewords—Features, Powerful Features Yet Simple," Jun. 1, 2011, http://web.archive.org/web/20110601223756/http://agilewords.com/product/features, 3 pages.

(56) References Cited

OTHER PUBLICATIONS

Conner, "Google Apps: The Missing Manual," published by O'Reilly Media, May 27, 2008, 42 pages.
Exam Report for EP 13177108.1, Applicant: Box, Inc. dated Feb. 17, 2015, 6 pages.
Exam Report for GB1312264.3, Applicant: Box, Inc. dated Jan. 30, 2015, 5 pages.
Exam Report for GB1312874.9, Applicant: Box, Inc. dated Feb. 10, 2015, 7 pages.
Exam Report for GB1316685.5, Applicant: Box, Inc. dated Feb. 17, 2015, 5 pages.
Exam Report for EP 13185269.1, Applicant: Box, Inc. dated Feb. 13, 2015, 8 pages.
Exam Report for GB1410569.6 Applicant: Box, Inc. dated Jul. 11, 2014, 9 pages.
Sommerer, "Presentable Document Format: Improved On-demand PDF to HTML Conversion," retrieved from the internet, http://research.microsoft.com, Nov. 2004, 8 pages.
Extended Search Report for EP131832800, Applicant: Box, Inc. dated Aug. 25, 2014, 7 pages.
Extended Search Report for EP141509422, Applicant: Box, Inc. dated Aug. 26, 2014, 12pages.
Search Report for EP 13189144.2 Applicant: Box, Inc. dated Sep. 1, 2014, 9 pages.
Exam Report for GB1312874.9 Applicant: Box, Inc. dated Sep. 26, 2014, 2 pages.
Exam Report for GB1415126.0 Applicant: Box, Inc. dated Oct. 2, 2014, 8 pages.
Exam Report for GB1415314.2 Applicant: Box, Inc. dated Oct. 7, 2014, 6 pages.
Exam Report for GB1309209.3 Applicant: Box, Inc. dated Oct. 7, 2014, 3 pages.
Exam Report for GB1315232.7 Applicant: Box, Inc. dated Oct. 9, 2014, 5 pages.
Exam Report for GB1318789.3 Applicant: Box, Inc. dated Oct. 30, 2014, 6 pages.
Microsoft Windows XP Professional Product Documentation: How Inheritance Affects File and Folder Permissions, Apr. 11, 2014, 2 pages.
"Average Conversion Time for a D60 RAW file?" http://www.dpreview.com, Jul. 22, 2002, 4 pages.
"Revolving sync conflicts; frequently asked questions," Microsoft Tech Support, Jul. 16, 2012, retrieved from the Internet: http://web.archive.org/web, 2 pages.
"Troubleshoot sync problems," Microsoft Tech Support: May 2, 2012, retrieved from the internet, http://web. Archive.org/web, 3 pages.
"Tulsa TechFest 2012—Agenda," retrieved from the website, http://web.archive.org, Oct. 2, 2012, 2 pages.
Burns, "Developing Secure Mobile Applications for Android," Oct. 2008, Version 1.0, 1-28 pages.
Cohen, "Debating the Definition of Cloud Computing Platforms," retrieved from the internet, http://forbes.com, Feb. 3, 2014, 7 pages.
Comes, "MediaXchange User's Manual," Version 1.15.15, Feb. 1, 2009, pp. 1-90.
Delendik, "Evolving with Web Standards—The Story of PDF.JS," retrieved from the internet, http://people.mozilla.org, Oct. 12, 2012, 36 pages.
Delendik, "My PDF.js talk slides from Tulsa TechFest," retrieved from the internet, http://twitter.com, Oct. 12, 2012, 2 pages.
Duffy, "The Best File-Syncing Services," pcmag.com, retrieved from the internet: http://www.pcmag.com, Sep. 28, 2012, 7 pages.

Exam Report for EP13177108.1, Applicant: Box, Inc. dated May 26, 2014, 6 pages.
Exam Report for EP13185269.1, Applicant: Box, Inc. dated Jan. 28, 7 pages.
Exam Report for GB1308842.2, Applicant: Box, Inc. dated Mar. 10, 2014, 4 pages.
Exam Report for GB1312264.3, Applicant: Box, Inc. dated Mar. 24, 2014, 7 pages.
Exam Report for GB1314771.5, Applicant: Box, Inc. dated Feb. 17, 2014, 7 pages.
Exam Report for GB1318792.7, Applicant: Box, Inc. dated May 22, 2014, 2 pages.
International Search Report and Written Opinion for PCT/US2013/034765, Applicant: Box, Inc., dated Jan. 20, 2014, 15 pages.
John et al., "Always Sync Support Forums—View topic—Allway sync funny behavior," Allway Sync Support Forum at http://sync-center.com, Mar. 28, 2011, XP055109680, 2 pages.
Partial Search Report for EP131832800, Applicant: Box, Inc. dated May 8, 2014, 5 pages.
Pyle et al., "How to enable Event logging for Offline Files (Client Side Caching) in Windows Vista," Feb. 18, 2009, retrieved from the internet: http://blogs.technet.com, 3 pages.
Rao, "Box Acquires Crocodoc to Add HTML5 Document Converter and Sleek Content Viewing Experience to Cloud Storage Platform," retrieved from the internet, http://techcrunch.com, May 9, 2013, 8 pages.
Search Report for EP 11729851.3, Applicant: Box, Inc. dated Feb. 7, 2014, 9 pages.
Search Report for EP13187217.8, Applicant: Box, Inc. dated Apr. 15, 2014, 12 pages.
Search Report for EP141509422, Applicant: Box, Inc. dated May 8, 2014, 7 pages.
Search Report for EP14151588.2, Applicant: Box, Inc. dated Apr. 15, 2014, 12 pages.
Search Report for EP14153783.7, Applicant: Box, Inc. dated Mar. 24, 2014, 7 pages.
Sommerer, "Presentable Document Format: Improved On-demand PDF to HTML Conversion," retrieved from the internet, http://research.microsoft.com, 8 pages.
Tulloch et al., "Windows Vista Resource Kit," Apr. 8, 2007, Microsoft Press, XP055113067, 6 pages.
Walker, "PDF.js project meeting notes," retrieved from the internet, http://groups.google.com, May 15, 2014, 1 page.
Exam Report for GB1316532.9; Applicant: Box, Inc., dated Mar. 8, 2016, 3 pages.
Cicnavi, "Offline Files in XP," Nov. 29, 2010, UtilizeWindows, pp. 1-6.
Kretzschmar et al., "Functional Components for a Security Manager within Future Inter-Cloud environments," Copyright 2011 IEEE, 5 pages.
Li et al., "CloudVO: Building a Secure Virtual Organization for Multiple Clouds Collaboration," Copyright 2010 IEEE, 6 pages.
Mont et al., "Risk Assessment and Decision Support for Security Policies and Related Enterprise Operational Processes," Copyright 2011 IEEE, 4 pages.
TaheriMonfared et al., "Monitoring Intrusions and Security Breaches in Highly Distributed Cloud Environments," Copyright 2011 IEEE, 6 pages.
Vimercati et al., "Managing and Accessing Data in the Cloud: Privacy Risks and Approaches," Copyright 2012 CRiSIS, 9 pages.
Wang et al., "Data Leakage Mitigation for Discretionary Access Control in Collaboration Clouds," Copyright 2011 ACM, 10 pages.

* cited by examiner

FILE SYSTEM MONITORING IN A SYSTEM WHICH INCREMENTALLY UPDATES CLIENTS WITH EVENTS THAT OCCURRED IN A CLOUD-BASED COLLABORATION PLATFORM

CROSS-REFERENCE TO RELATED APPLICATIONS AND EFFECTIVE FILING DATE ENTITLEMENT

This application is entitled to the benefit of and/or the right of priority to U.S. Provisional Application No. 61/750,474, entitled "FILE SYSTEM EVENT MONITOR AND EVENT FILTER PIPELINE FOR A CLOUD-BASED PLATFORM", filed Jan. 9, 2013, which is hereby incorporated by reference in its entirety. This application is therefore entitled to an effective filing date of Jan. 9, 2013.

This application is related to U.S. patent application Ser. No. 13/524,501, entitled "RESOURCE EFFECTIVE INCREMENTAL UPDATING OF A REMOTE CLIENT WITH EVENTS WHICH OCCURRED VIA A CLOUD-ENABLED PLATFORM", filed Jun. 15, 2012; and to U.S. patent application Ser. No. 13/526,437, entitled "MANAGING UPDATES AT CLIENTS USED BY A USER TO ACCESS A CLOUD-BASED COLLABORATION SERVICE", filed Jun. 18, 2012; both of which are hereby incorporated by reference in their entireties.

This application is also related to U.S. patent application Ser. No. 14/146,658, entitled "RACE CONDITION HANDLING IN A SYSTEM WHICH INCREMENTALLY UPDATES CLIENTS WITH EVENTS THAT OCCURRED IN A CLOUD-BASED COLLABORATION PLATFORM", filed Jan. 2, 2014, which claims priority to U.S. Provisional Application No. 61/748,399, entitled "HANDLING ACTION LOG FRAMEWORK RACE CONDITIONS FOR A SYNCHRONIZATION CLIENT TO A CLOUD-BASED ENVIRONMENT", filed Jan. 2, 2013; both of which are hereby incorporated by reference in their entireties.

BACKGROUND

The use of electronic and digital content has greatly increased in enterprise settings or other organizations as the preferred mechanism for project, task, and work flow management, as has the need for streamlined collaboration and sharing of digital content and documents. In such an environment, multiple users share, access and otherwise perform actions or tasks on content and files in a shared workspace, where any number of users may have access to a given file or may want to or need to perform an action on the file at any given time.

The cloud-based nature of such an environment enables users/collaborators to access, view, edit content anytime, from any device, or using any number of and/or types of clients, simultaneously while other collaborators in the same group, enterprise, or other types of organizations may also be accessing, viewing, or editing the same file or content or content in the same work group. Among others, the different types of clients and the number of devices which can be used to access a single account or work item or cloud content in the cloud-based environment create problems of maintaining consistency and correct ordering in how changes are reflected at the clients that are used by users/collaborators. Updating a large number of collaborators within a limited amount of time when actions take place in the cloud-based environment further presents extra challenges.

BRIEF DESCRIPTION OF DRAWINGS

The present embodiments are illustrated by way of example and are not intended to be limited by the figures of the accompanying drawings. In the drawings.

The same reference numbers and any acronyms identify elements or acts with the same or similar structure or functionality throughout the drawings and specification for ease of understanding and convenience.

DETAILED DESCRIPTION

Figure 1:
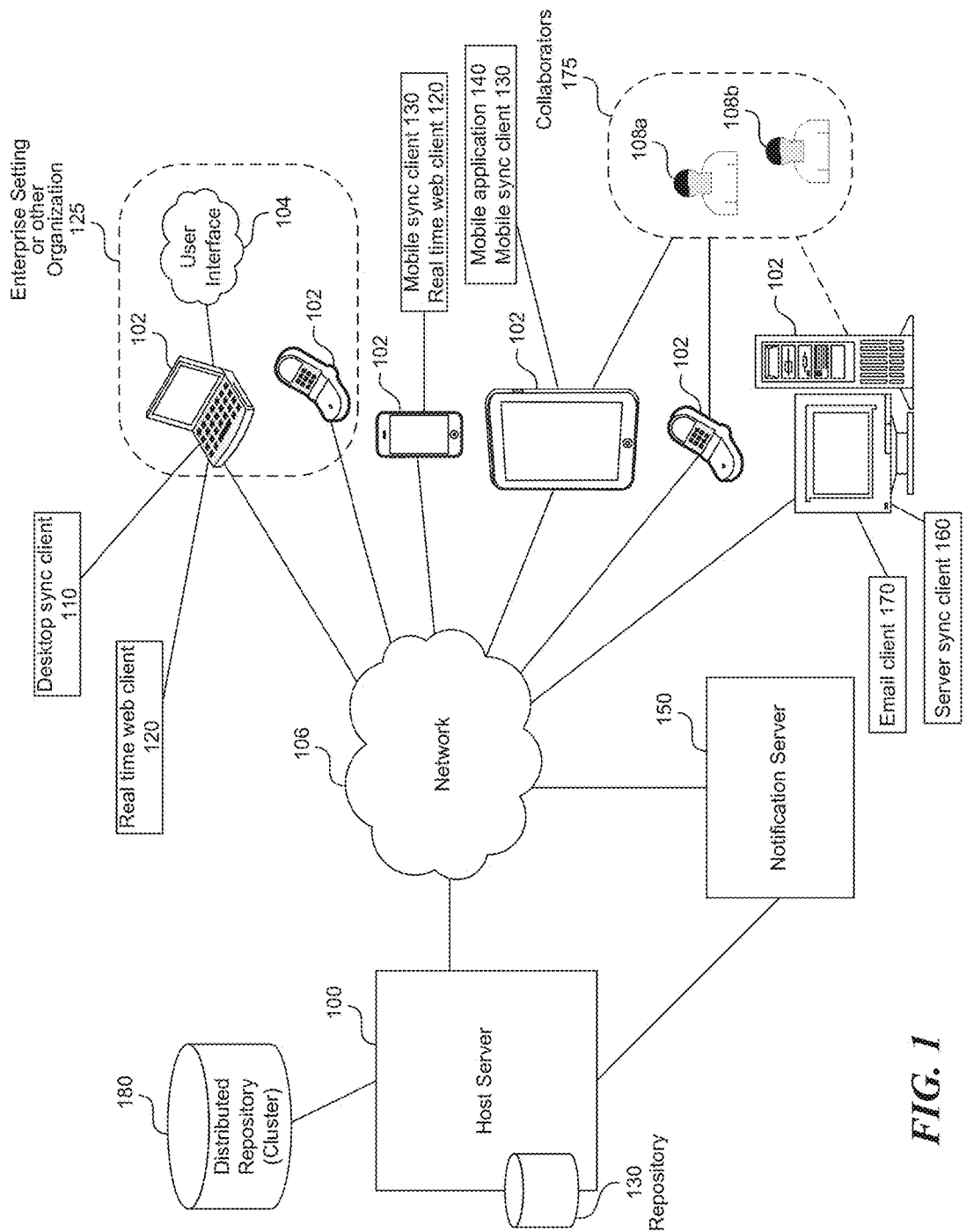
FIG. 1 depicts an example diagram of a system having improved race condition handling in providing a cloud-based service, collaboration and/or cloud storage platform that incrementally updates remote clients at devices with events that occurred via the platform.

Techniques are disclosed for race condition handling in a system which incrementally updates remote clients with events that occurred in a cloud-enabled platform. More specifically, some embodiments disclosed herein provide systems and methods for handling race conditions in a synchronization client, for example, when it receives updates from a cloud-based platform (e.g., via an action log framework (ALF), described further below). In one embodiment, a method comprises, in response to an event received at a synchronization client which indicates a modification to an item, comparing a sequence identifier of the item in the event with a current sequence identifier of the item. The sequence identifier of the item can be numeric and can monotonically increase as a state of the item changes. The method further comprises, if the sequence identifier in the event is larger than the current sequence identifier of the item, determining a difference between the item's state as represented in the event and a current state of the item. Then, based on the difference, at least one synchronization step to update the current state of the item to the item's state as represented in the event can be generated. In some embodiments, if the difference does not exist, the current sequence identifier of the item to the sequence identifier of the item in the event can be updated. In some embodiments, if the sequence identifier in the event is not larger than the current sequence identifier of the item, the event is discarded.

Among other benefits, the disclosed techniques can handle potential race conditions when ALF events are received out-of-order, thereby ensuring the correctness of data resulted from those events delivered to the synchronization client. In particular, some embodiments can operate in a way such that all possible race conditions must be accounted for, and generally no approximations are made. Additionally, some embodiments can be easily tunable for performance of individual components to maximize the responsiveness to the user. Also, the disclosed embodiments can be capable of accommodate throttling in order to ensure that too much processing or other device resources is consumed. Overall, the disclosed techniques can improve correctness, performance, and throttlability of a system which incrementally updates clients with events that occurred in the cloud-based platform.

The following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be, but not necessarily are, references to the same embodiment; and, such references mean at least one of the embodiments.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which can be exhibited by some embodiments and not by others. Similarly, various requirements are described which can be requirements for some embodiments but not other embodiments.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms can be highlighted, for example using italics and/or quotation marks. The use of highlighting has no influence on the scope and meaning of a term; the scope and meaning of a term is the same, in the same context, whether or not it is highlighted. It will be appreciated that same thing can be said in more than one way.

Consequently, alternative language and synonyms can be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any exemplified term. Likewise, the disclosure is not limited to various embodiments given in this specification.

Without intent to limit the scope of the disclosure, examples of instruments, apparatus, methods and their related results according to the embodiments of the present disclosure are given below. Note that titles or subtitles can be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions will control.

FIG. 1 illustrates an example diagram of a system having improved race condition handling in providing a cloud-based service, collaboration and/or cloud storage platform that incrementally updates remote clients at devices with events that occurred via the platform. As shown in FIG. 1, a host server 100 of a cloud-based service, collaboration and/or cloud storage platform can incrementally update remote synchronization clients (e.g., clients 110, 120, 130, 140, 160, 170) at devices 102 with events that occurred via the platform hosted by the server 100.

The client devices 102 can be any system and/or device, and/or any combination of devices/systems that is able to establish a communication or a connection, including wired, wireless, cellular connections with another device, a server and/or other systems such as host server 100 and/or a notification server 150. Client devices 102 typically include a display and/or other output functionalities to present information and data exchanged between among the devices 102, the notification server 150, and/or the host server 100.

For example, the client devices 102 can include mobile, hand held or portable devices or non-portable devices and can be any of, but not limited to, a server desktop, a desktop computer, a computer cluster, or portable devices including, a notebook, a laptop computer, a handheld computer, a palmtop computer, a mobile phone, a cell phone, a PDA, a smart phone (e.g., a BlackBerry device such as BlackBerry Z10/Q10, an iPhone, Nexus 4, etc.), a Treo, a handheld tablet (e.g. an iPad, iPad Mini, a Galaxy Note, Galaxy Note II, Xoom Tablet, Microsoft Surface, Blackberry PlayBook, Nexus 7, 10 etc.), a phablet (e.g., HTC Droid DNA, etc.), a tablet PC, a thin-client, a hand held console, a hand held gaming device or console (e.g., XBOX live, Nintendo DS, Sony PlayStation Portable, etc.), mobile-enabled powered watch (e.g., iOS, Android or other platform based), Google Glass, a Chromebook and/or any other portable, mobile, hand held devices, etc. running on any platform or any operating system (e.g., Mac-based OS (OS X, iOS, etc.), Windows-based OS (Windows Mobile, Windows 7, Windows 8, etc.), Android, Blackberry OS, Embedded Linux platforms, Palm OS, Symbian platform, Google Chrome OS, and the like. In one embodiment, the client devices 102, host server 100, and/or the notification server 150 (e.g., a server hosting application 120) are coupled via a network 106. In some embodiments, the devices 102 and host server 100 and/or notification server 150 may be directly connected to one another.

The input mechanism on client devices 102 can include touch screen keypad (including single touch, multi-touch, gesture sensing in 2D or 3D, etc.), a physical keypad, a mouse, a pointer, a track pad, motion detector (e.g., including 1-axis, 2-axis, 3-axis accelerometer, etc.), a light sensor, capacitance sensor, resistance sensor, temperature sensor, proximity sensor, a piezoelectric device, device orientation detector (e.g., electronic compass, tilt sensor, rotation sensor, gyroscope, accelerometer), or a combination of the above.

Signals received or detected indicating user activity at client devices 102 through one or more of the above input mechanism, or others, can be used by various users or collaborators (e.g., collaborators 108) for accessing, through network 106, a web-based collaboration environment or online collaboration platform (e.g., hosted by the host server 100). The collaboration environment or platform can have one or more collective settings 125 for an enterprise or an organization that the users belong, and can provide an user interface 104 for the users to access such platform under the settings 125.

The collaboration platform or environment hosts workspaces with work items that one or more users can access (e.g., view, edit, update, revise, comment, download, preview, tag, or otherwise manipulate, etc.). A work item can generally include any type of digital or electronic content that can be viewed or accessed via an electronic device (e.g., device 102). The digital content can include .pdf files, .doc, slides (e.g., Powerpoint slides), images, audio files, multimedia content, web pages, blogs, etc. A workspace can generally refer to any grouping of a set of digital content in the collaboration platform. The grouping can be created, identified, or specified by a user or through other means. This user may be a creator user or administrative user, for example.

In general, a workspace can be associated with a set of users or collaborators (e.g., collaborators 108) which have access to the content included therein. The levels of access (e.g., based on permissions or rules) of each user or collaborator to access the content in a given workspace may be the same or may vary among the users. Each user may have their own set of access rights to every piece of content in the workspace, or each user may be different access rights to different pieces of content. Access rights may be specified by a user associated with a workspace and/or a user who created/uploaded a particular piece of content to the workspace, or any other designated user or collaborator.

In general, the collaboration platform allows multiple users or collaborators to access or collaborate efforts on work items such each user can see, remotely, edits, revisions, comments, or annotations being made to specific work items through their own user devices. For example, a user can upload a document to a workspace for other users to access (e.g., for viewing, editing, commenting, signing-off, or otherwise manipulating). The user can login to the online platform and upload the document (or any other type of work item) to an existing workspace or to a new workspace. The document can be shared with existing users or collaborators in a workspace.

In general, network 106, over which the client devices 102 and the host server 100 communicate may be a cellular network, a telephonic network, an open network, such as the Internet, or a private network, such as an intranet and/or the extranet, or any combination or variation thereof. For example, the Internet can provide file transfer, remote log in, email, news, RSS, cloud-based services, instant messaging, visual voicemail, push mail, VoIP, and other services through any known or convenient protocol, such as, but is not limited to the TCP/IP protocol, Open System Interconnections (OSI), FTP, UPnP, iSCSI, NSF, ISDN, PDH, RS-232, SDH, SONET, etc.

The network 106 can be any collection of distinct networks operating wholly or partially in conjunction to provide connectivity to the client devices 102 and the host server 100 and may appear as one or more networks to the serviced systems and devices. In one embodiment, communications to and from the client devices 102 can be achieved by, an open network, such as the Internet, or a private network, such as an intranet and/or the extranet. In one embodiment, communications can be achieved by a secure communications protocol, such as secure sockets layer (SSL), or transport layer security (TLS).

In addition, communications can be achieved via one or more networks, such as, but are not limited to, one or more of WiMax, a Local Area Network (LAN), Wireless Local Area Network (WLAN), a Personal area network (PAN), a Campus area network (CAN), a Metropolitan area network (MAN), a Wide area network (WAN), a Wireless wide area network (WWAN), or any broadband network, and further enabled with technologies such as, by way of example, Global System for Mobile Communications (GSM), Personal Communications Service (PCS), Bluetooth, WiFi, Fixed Wireless Data, 2G, 2.5G, 3G (e.g., WCDMA/UMTS based 3G networks), 4G, IMT-Advanced, pre-4G, LTE Advanced, mobile WiMax, WiMax 2, WirelessMAN-Advanced networks, enhanced data rates for GSM evolution (EDGE), General packet radio service (GPRS), enhanced GPRS, iBurst, UMTS, HSPDA, HSUPA, HSPA, HSPA+, UMTS-TDD, 1xRTT, EV-DO, messaging protocols such as, TCP/IP, SMS, MMS, extensible messaging and presence protocol (XMPP), real time messaging protocol (RTMP), instant messaging and presence protocol (IMPP), instant messaging, USSD, IRC, or any other wireless data networks, broadband networks, or messaging protocols.

Figure 2:
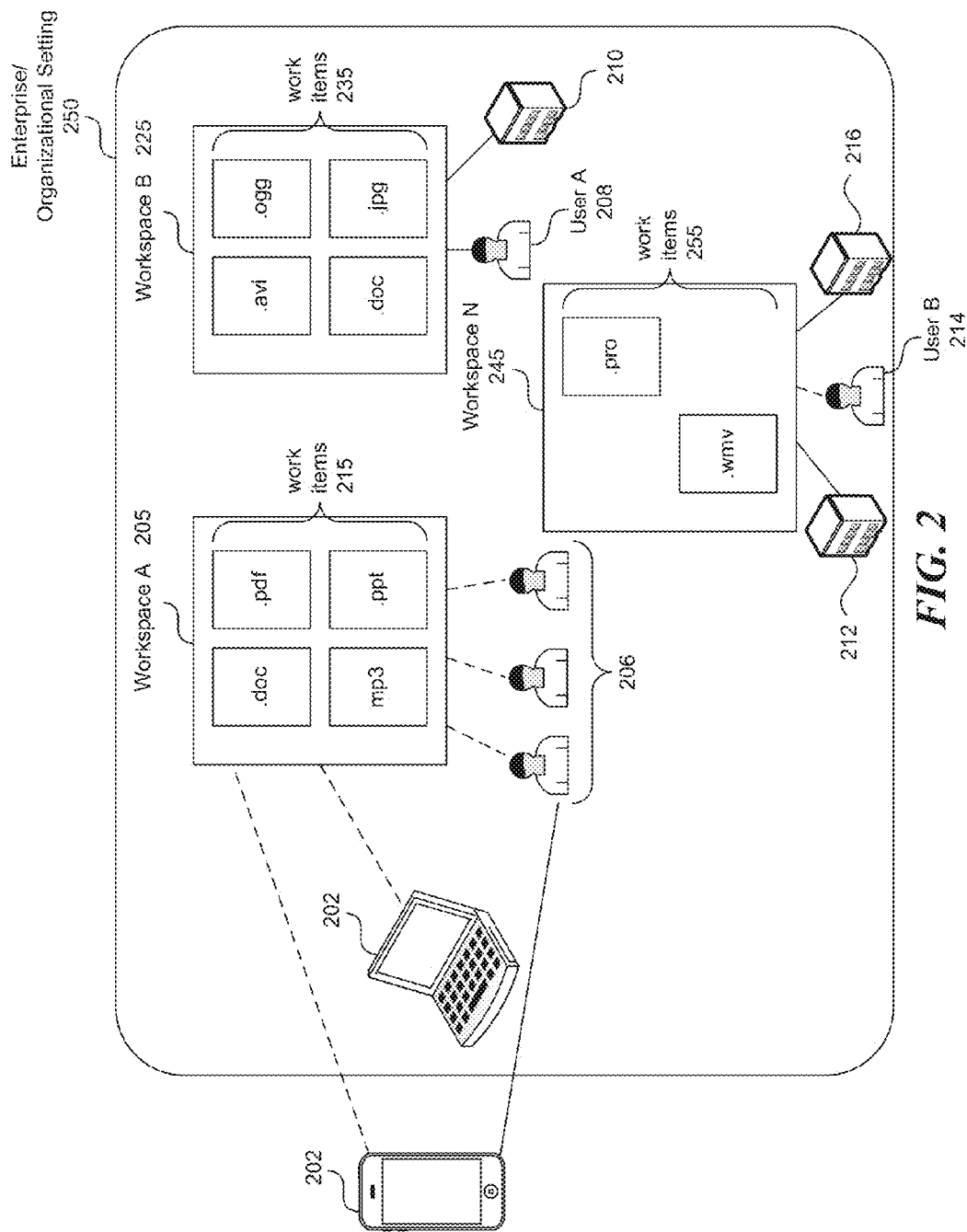
FIG. 2 depicts an example diagram of a web-based or online collaboration platform deployed in an enterprise or other organizational setting for organizing work items and workspaces.

A diagrammatic illustration of the cloud-based environment (e.g., collaboration environment) and the relationships between workspaces and users/collaborators are illustrated with further reference to the example of FIG. 2. A diagrammatic illustration of a workspace having multiple work items with which collaborators can access through multiple devices is illustrated with further reference to the example of FIG. 3A.

Embodiments of the present disclosure provide enhanced ability for race condition handling in a system that updates or informs remote clients 110-170 on user devices 102 based on events, actions, or changes (e.g., from user edits, updates, comments, etc.) that occurred in the cloud environment hosted by the host server 100.

In general, multiple users collaborate in the cloud-based environment hosted by server 100, and the user devices 102 of these users need to be appropriately updated such that the most current versions of data/content are synchronized with the relevant user devices and that notification of events are sent to the relevant devices/users in a timely and orderly fashion. Any given user can utilize any number and types of clients (e.g., synchronization client, real time web client, mobile synchronization client, mobile application, email client, server synchronization client, etc.) at any given time. Thus, the host server 100 and the remote synchronization clients 110-170 described herein together can implement the disclosed techniques in facilitating the orderly synchronizing or updating of the remote clients 110-170 which a given user/collaborator may use to access the cloud platform via any number of user devices 102.

In general, when a user action takes place, the user action is processed (e.g., as described in FIGS. 4A-4B below) to become a plurality of event entries each corresponding to a collaborator 175, and each event entry can be read by a remote client of the collaborator to reflect the user action.

Specifically, it is recognized in the disclosed embodiments that, although current implementations of the host server 100 already employs some mechanisms for solving out-of-order event problems (e.g., the revision ID, explained below, which can make sure the events can be written into the queue from which the client reads in a correct order), errors and/or race conditions can still take place on the client when the events arrive at the client in an out-of-order manner when they are delivered from the queue to the client.

Accordingly, the present embodiments of the synchronization client (e.g., client 110) can ensure the correctness of the synchronized tree and other synchronized items (e.g., folders or files) completely independent from the order in which the client receives events from the action log framework ("ALF") system. In other words, so long as the ALF system correctly delivers all events to the synchronization client, the synchronization client can end up in the correct final state.

More implementation details regarding the synchronization clients 110-170, the host server 100, the repository 130, distributed data cluster 180, and various techniques in implementing race condition handling are discussed below.

FIG. 2 depicts an example diagram of a web-based or online collaboration platform deployed in an enterprise or other organizational setting 250 for organizing work items 215, 235, 255 and workspaces 205, 225, 245.

The web-based platform for collaborating on projects or jointly working on documents can be used by individual users and shared among collaborators. In addition, the collaboration platform can be deployed in an organized setting including but not limited to, a company (e.g., an enterprise setting), a department in a company, an academic institution, a department in an academic institution, a class or course setting, or any other types of organizations or organized setting.

When deployed in an organizational setting, multiple workspaces (e.g., workspace A, B C) can be created to support different projects or a variety of work flows. Each workspace can have its own associate work items. For example, workspace A 205 can be associated with work items 215, workspace B 225 can be associated with work items 235, and workspace N can be associated with work items 255. The work items 215, 235, and 255 can be unique to each workspace but need not be. For example, a particular word document can be associated with only one workspace (e.g., workspace A 205) or it can be associated with multiple workspaces (e.g., Workspace A 205 and workspace B 225, etc.).

In general, each workspace has a set of users or collaborators associated with it. For example, workspace A 205 is associated with multiple users or collaborators 206. In some instances, workspaces deployed in an enterprise can be department specific. For example, workspace B can be associated with department 210 and some users shown as example user A 208 and workspace N 245 can be associated with departments 212 and 216 and users shown as example user B 214.

Each user associated with a workspace can generally access the work items associated with the workspace. The level of access depends on permissions associated with the specific workspace, and/or with a specific work item. Permissions can be set for the workspace or set individually on a per work item basis. For example, the creator of a workspace (e.g., one of user A 208 who creates workspace B) can set one permission setting applicable to all work items 235 for other associated users and/or users associated with the affiliate department 210, for example. Creator user A 208 can also set different permission settings for each work item, which can be the same for different users, or varying for different users.

In each workspace A, B . . . N, when an action is performed on a work item by a given user or any other activity is detected in the workspace, other users in the same workspace can be notified (e.g., in real time or in near real time, or not in real time). Activities which trigger real time notifications can include, by way of example but not limitation, adding, deleting, or modifying collaborators in the workspace, uploading, downloading, adding, deleting a work item in the workspace, creating a discussion topic in the workspace.

In some embodiments, items or content downloaded or edited can cause notifications to be generated. Such notifications can be sent to relevant users to notify them of actions surrounding a download, an edit, a change, a modification, a new file, a conflicting version, an upload of an edited or modified file.

In one embodiment, in a user interface to the web-based collaboration platform where notifications are presented, users can, via the same interface, create action items (e.g., tasks) and delegate the action items to other users including collaborators pertaining to a work item 215, for example. The collaborators 206 can be in the same workspace A 205 or the user can include a newly invited collaborator. Similarly, in the same user interface where discussion topics can be created in a workspace (e.g., workspace A, B or N, etc.), actionable events on work items can be created and/or delegated/assigned to other users such as collaborators of a given workspace 206 or other users. Through the same user interface, task status and updates from multiple users or collaborators can be indicated and reflected. In some instances, the users can perform the tasks (e.g., review or approve or reject, etc.) via the same user interface.

Figure 3A:
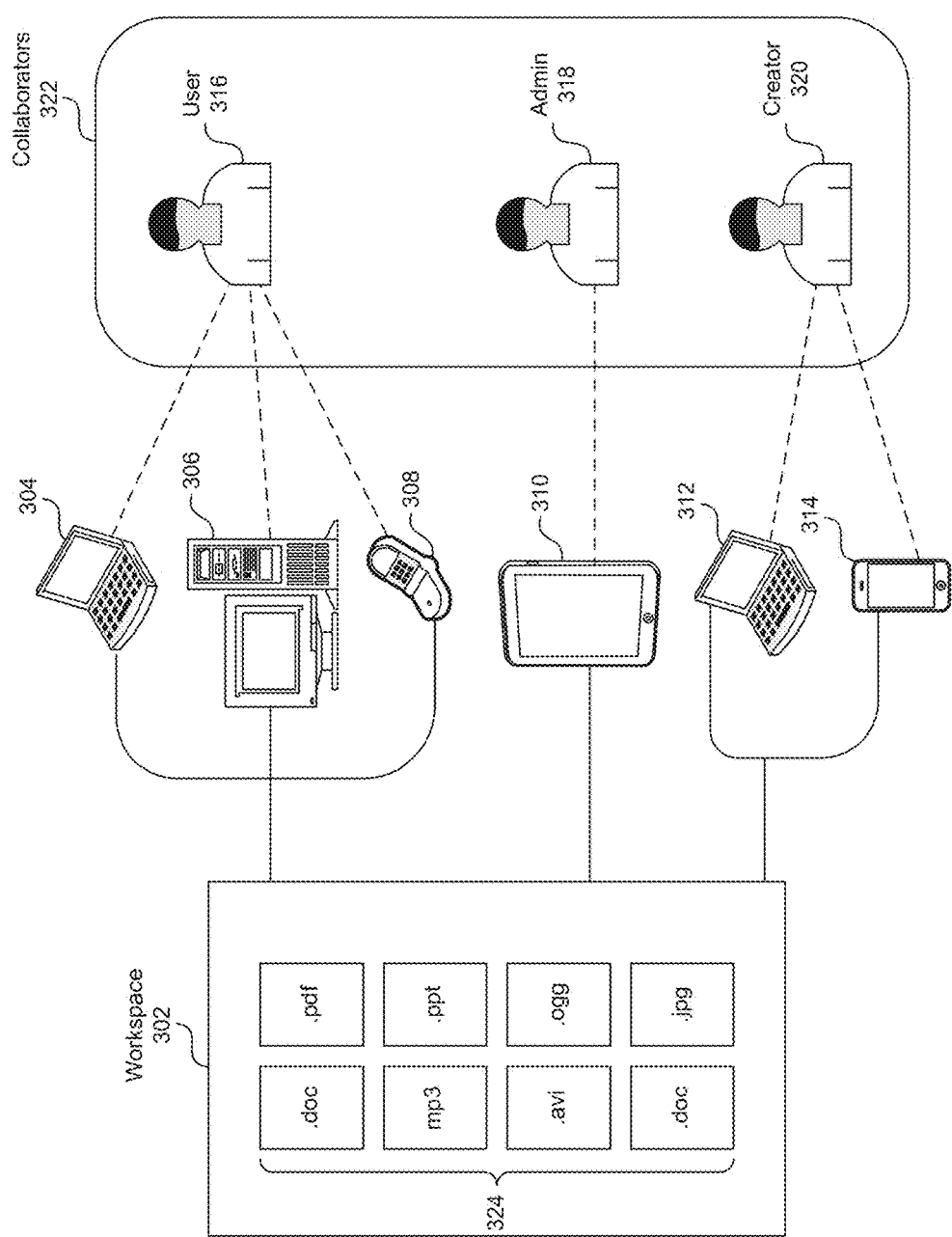
FIG. 3A depicts an example diagram of a workspace in a cloud-based platform such as an online or web-based collaboration environment accessible by multiple collaborators through various devices.

FIG. 3A depicts an example diagram of a workspace 302 in an online or web-based collaboration environment accessible by multiple collaborators 322 through various devices.

Each of users 316, 318, and 320 can individually use multiple different devices to access and/or manipulate work items 324 in the workspace 302 with which they are associated with. For example users 316, 318, 320 can be collaborators on a project to which work items 324 are relevant. Since the work items 324 are hosted by the collaboration environment (e.g., a cloud-based environment), each user can access the work items 324 anytime, and from any physical location using any device (e.g., including devices they own or any shared/public/loaner device).

Work items to be edited or viewed can be accessed from the workspace 302. Users can also be notified of access, edit, modification, and/or upload related-actions performed on work items 324 by other users or any other types of activities detected in the workspace 302. For example, if user 316 modifies a document, one or both of the other collaborators 318 and 320 can be notified of the modification in real time, or near real-time, or not in real time. The notifications can be sent through any of all of the devices associated with a given user, in various formats including, one or more of, email, SMS, or via a pop-up window in a user interface in which the user uses to access the collaboration platform. In the event of multiple notifications, each notification can be depicted preferentially (e.g., ordering in the user interface) based on user preferences and/or relevance to the user (e.g., implicit or explicit).

For example, a notification of a download, access, read, write, edit, or uploaded related activities can be presented in a feed stream among other notifications through a user interface on the user device according to relevancy to the user determined based on current or recent activity of the user in the web-based collaboration environment.

In one embodiment, the notification feed stream further enables users to create or generate actionable events (e.g., as task) which are or can be performed by other users 316 or collaborators 322 (e.g., including admin users or other users not in the same workspace), either in the same workspace 302 or in some other workspace. The actionable events such as tasks can also be assigned or delegated to other users via the same user interface.

For example, a given notification regarding a work item 324 can be associated with user interface features allowing a user 316 to assign a task related to the work item 324 (e.g., to another user 316, admin user 318, creator user 320 or another user). In one embodiment, a commenting user interface or a comment action associated with a notification can be used in conjunction with user interface features to enable task assignment, delegation, and/or management of the relevant work item or work items in the relevant workspaces, in the same user interface.

Figure 3B:
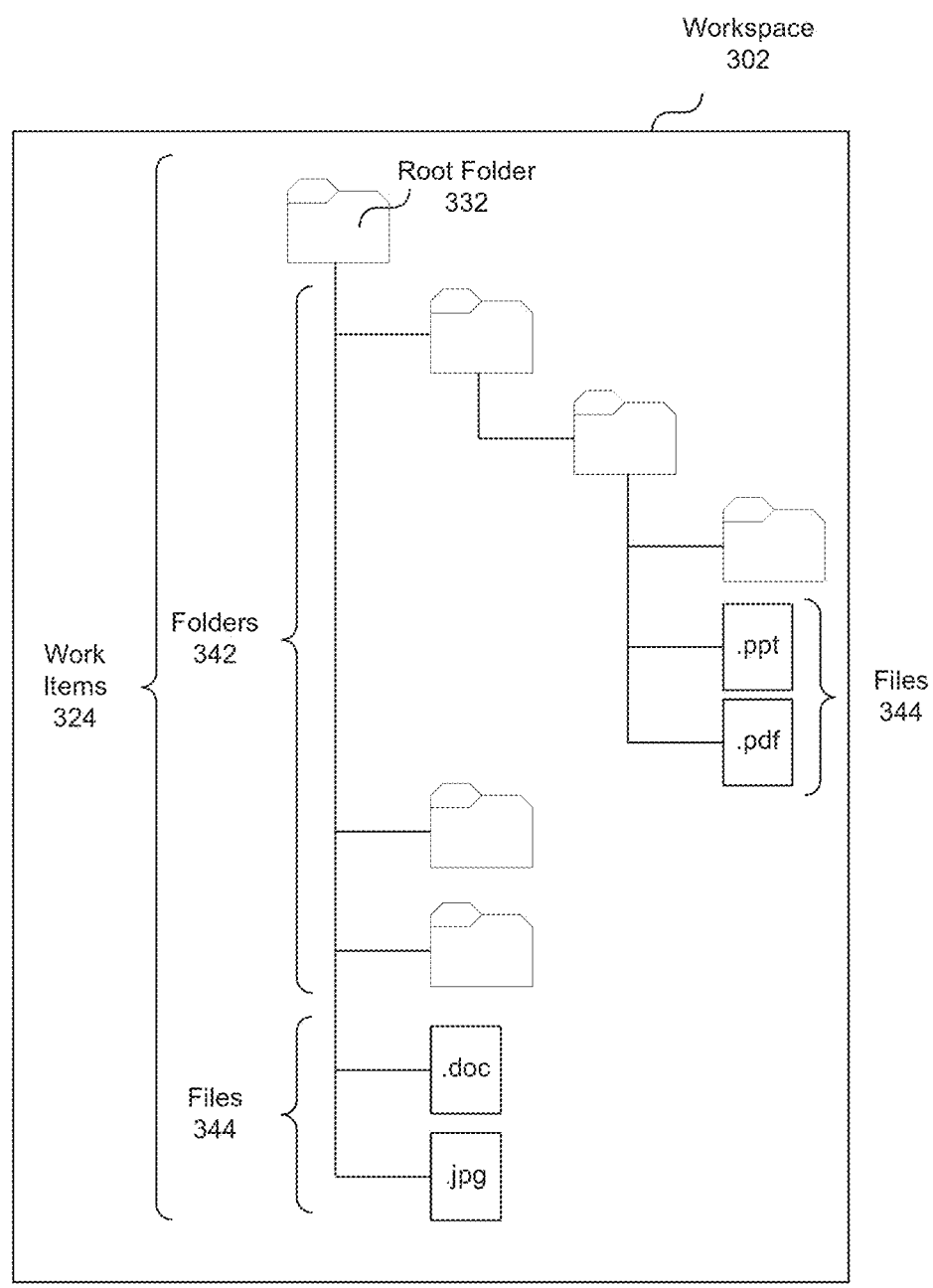
FIG. 3B depicts an abstract diagram illustrating an example data structure of the folders and files in the workspace of FIG. 3A.

FIG. 3B depicts an abstract diagram illustrating an example data structure of the folders and files in the workspace 302 of FIG. 3A. As illustrated in FIG. 3B, work items 324 of FIG. 3A can be further organized into groups using one or more folders 342 within workspace 302. The folders 342 can have more than one levels of hierarchy including, for example, parent/ascendant folder(s), child/descendant folder(s) or subfolder(s), and/or sibling folder(s). A person having ordinary skill in the art will understand that terminologies describing the hierarchy of the folders are used in a relative sense. For example, a parent folder can be a child folder of a grandparent folder, a particular child folder can be a parent folder of a grandchild folder, and so on. It is noted that the illustration of the folders are merely exemplary; depending on the embodiments, there can be more than one level of hierarchy between the illustrated folders.

Further, in some of the present embodiments, the synchronization state of a folder can be: (i) synchronized, (ii) partially synchronized, or (iii) unsynchronized. For purposes of discussion herein, a folder is synchronized when all items (e.g., folders and files) under the folder are synchronized. Likewise, a folder is unsynchronized when all items (e.g., folders and files) under the folder are unsynchronized. A folder is partially synchronized when it is neither synchronized nor unsynchronized.

Figure 4A:
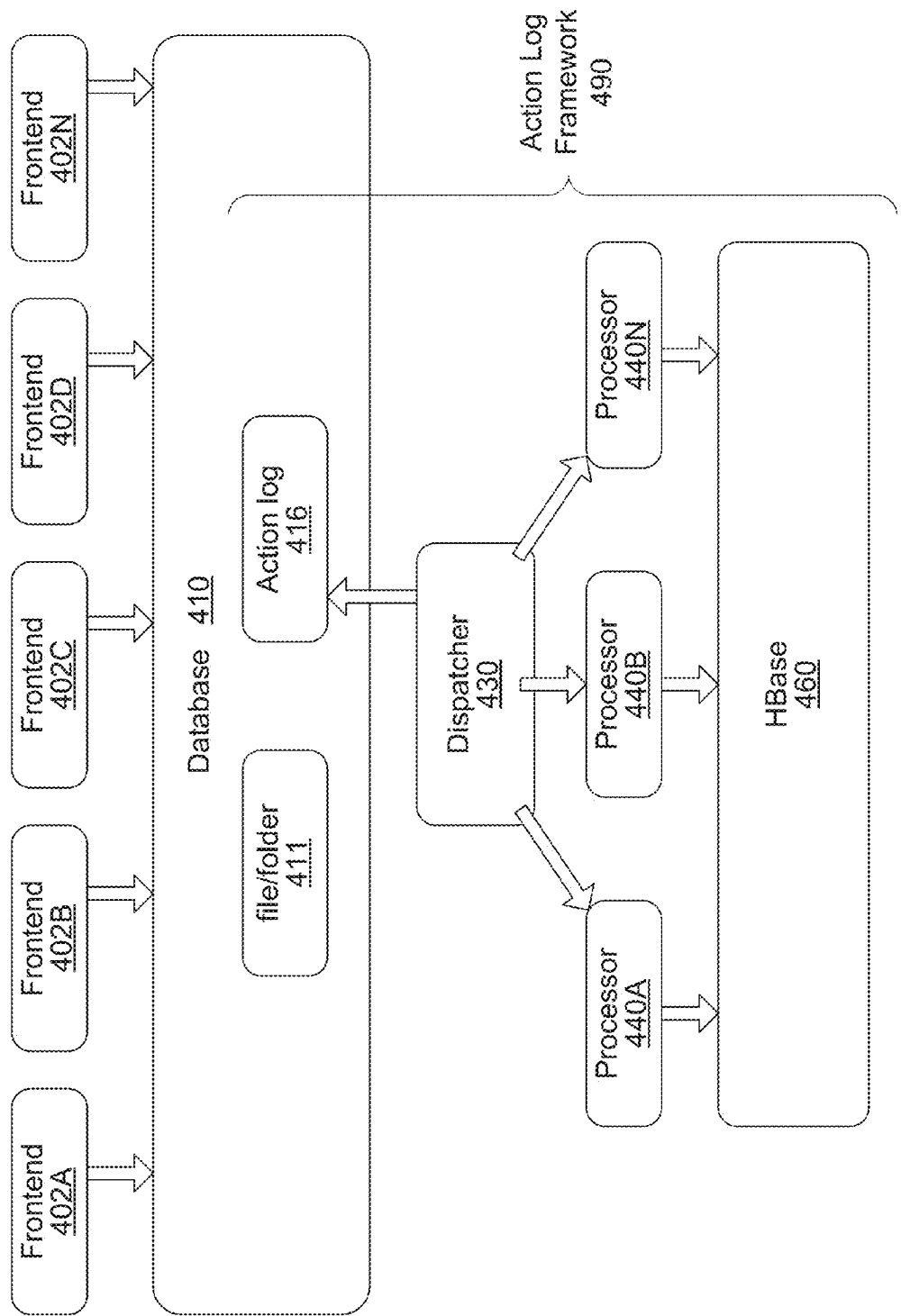
FIG. 4A depicts an example system block diagram showing the interaction between server-side components for incrementally updating a remote client with events or actions that occurred via a cloud-based platform.

FIG. 4A depicts an example system block diagram showing the interaction between server-side components for incrementally updating a remote client with events or actions that occurred via a cloud-based platform.

The server-side includes front end components 402A-N, a database 410, a dispatcher 430, one or more processors 440A-N, and a second database (e.g., HBase 460). The front end components 402A-N can interface with client devices/ end user devices to detect/identify actions or transactions or events. The data or file change that occur as a result of the event is effectuated in the database 410 of the cloud-enabled platform (e.g., the relevant changes are made in the file table 411 of the database).

Depending on the type of action or event, an action log entry can be created and stored in the action log table or action log 416. In general, the front end 402 determines whether an action log entry is created from a given action or transaction. In general, an action log entry can be created for an action or event if certain durability requirements are to be met. The dispatcher 430 reads the action log entries from the action log 416 and sends them to the processors 440A-N where the fan-out, or collaborators to be notified of the event or to receive the file/data change as a result of the event is determined. Based on the computed fan-out or identified collaborators, the processors 440A-N writes the events/ transactions to the relevant queues in the second database 460, from which remote clients can read.

It is noted also that the action log 416, the dispatcher 430, the processors 440A-N, the HBase 460, and one or more real time clients 470A-N (see FIG. 4B) are generally referred to as an "action log framework (ALF) 490." More specifically, HBase 460 is a primary data repository of the ALF 490. User actions initiated (e.g., via the webapp or the API) result in rows (or action log entries) being written to the action log 416 (or action log table 416). Then, in some embodiments, the action log entries are read from action log 416 by the ALF dispatcher 430, de-normalized into separate entries per user that needs to be notified of the action by an ALF processor (e.g., processor 440A), and written to the HBase 460. The HBase 460 is in turn read (e.g., via an API web service call) by real time clients 470A-N to notify a collaborator of the new change.

Figure 4B:
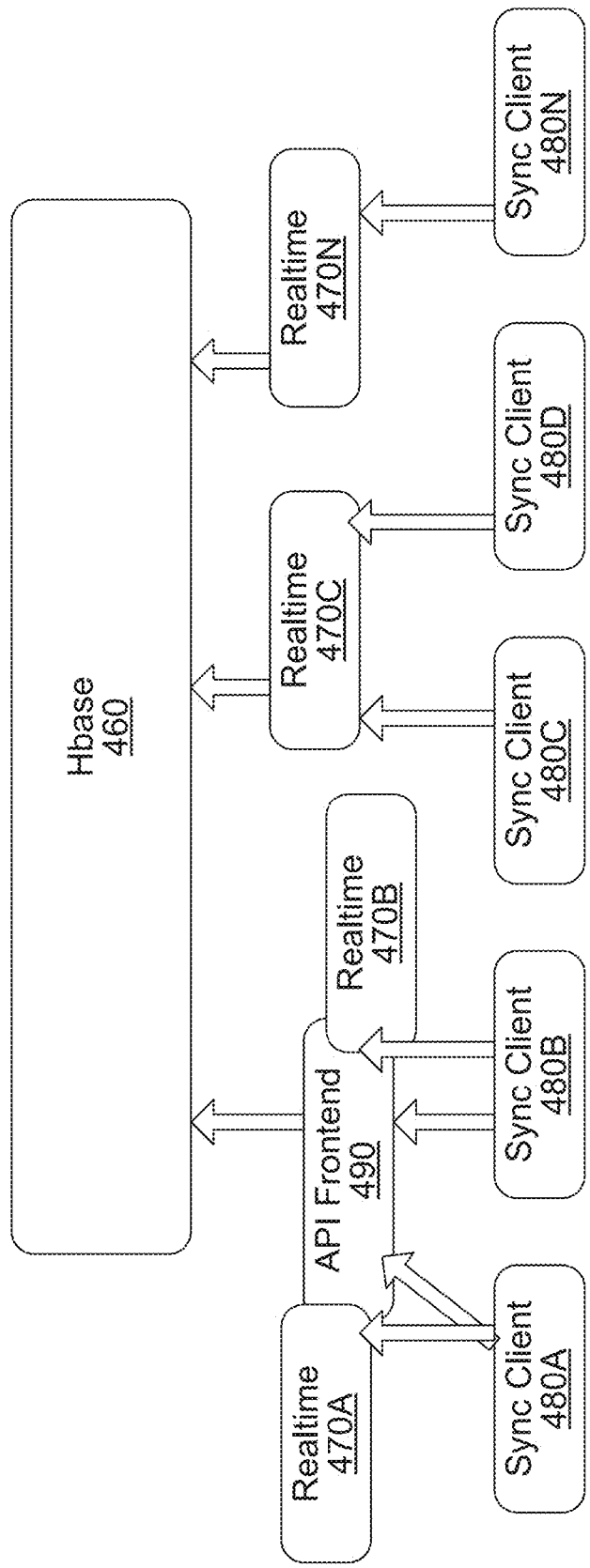
FIG. 4B depicts an example block diagram showing the interaction of remote clients and with a distributed database cluster for incremental updates of events/actions which occurred at a cloud-based environment.

FIG. 4B depicts an example block diagram showing the interaction of remote clients 470A-N and 480A-N with a distributed database cluster 460 for incremental updates of events/actions which occurred at a cloud-based environment. The remote clients can include, for example real time clients 470A-N (e.g., real-time web clients launched via a web browser, mobile application), and synchronization clients 480A-N (e.g., desktop synchronization, mobile synchronization, server synchronization, etc.) that users or collaborators use to interface/access the cloud-based platform including, but not limited to, a collaboration environment. Other types of clients may also read from the database cluster 460.

The queues in the database 460 (e.g., the distributed database cluster) are usually client type specific. For example, each queue is for a given client type for one given user. So, a user 'A' may have a synchronization client queue that all of the synchronization clients that user "A" uses reads from since user "A" may have multiple devices on which synchronization clients are installed. In general, the queues for clients in the database 460 are read only queues such that multiple clients can read from the same queue without making modifications. In this manner, if a user utilizes multiple synchronization clients, each client can still receive and detect the respective updates such that multiple devices can be synchronized. The remote clients also typically individually track the location in the queue from which they last read such that only the most recent events are updated at the client, and that the events read from a queue is specific to a given client, dependent on what has previously been synchronized or read.

In one embodiment, synchronization clients 480 connect to both real-time 470 and API front end 490 machines. The real time machines 470 can notify a synchronization client 480 when there has been an update in a user's account. The synchronization client 480 can then connect to API front end machine 490 to obtain the actual change/content. Alternatively, in some instances, the synchronization clients 480 can also obtain the changes/content/updates from the real time machines 470 simultaneous with the notification, or after being notified.

Figure 5:
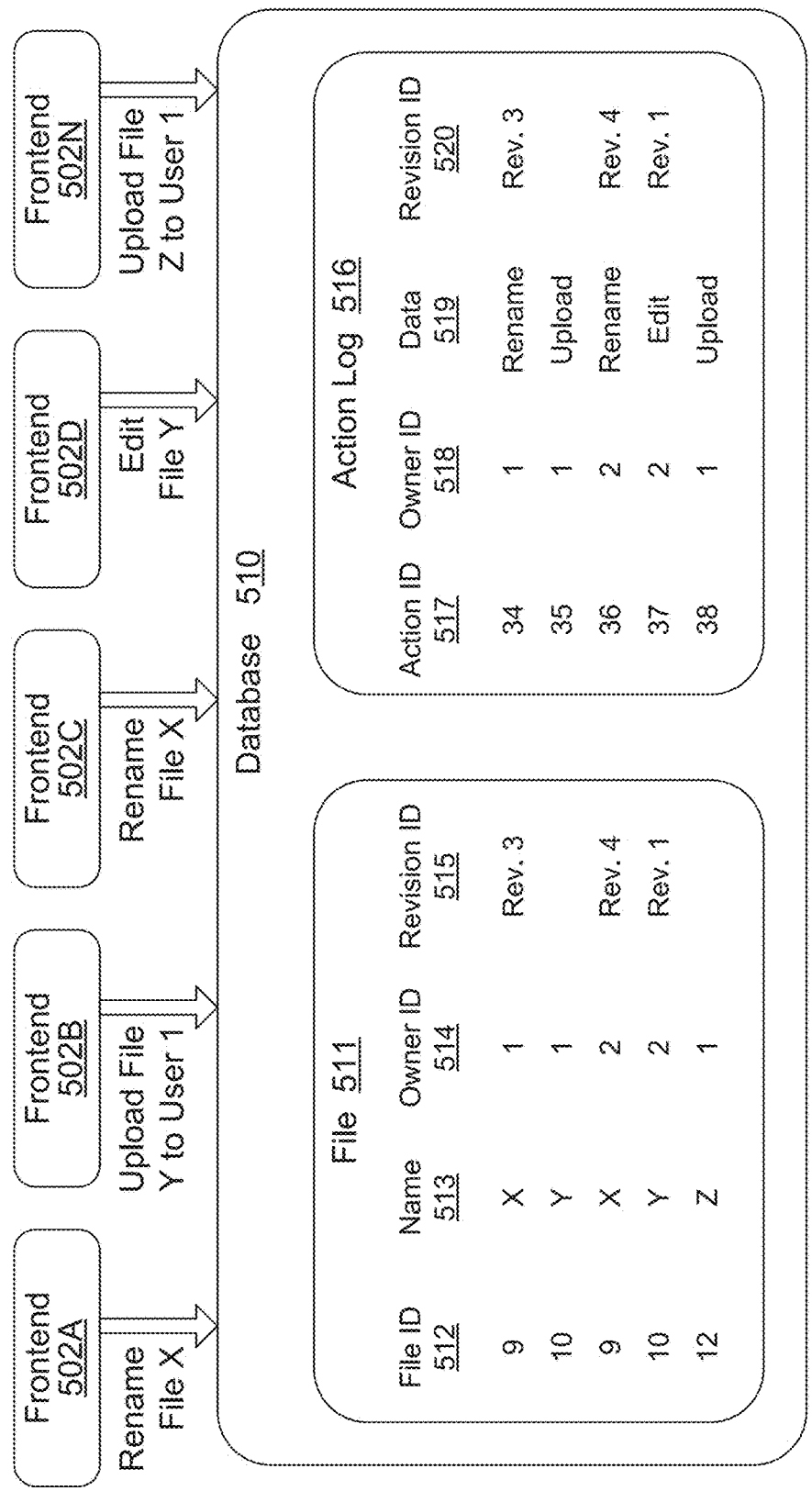
FIG. 5 depicts an example system block diagram showing action log entries recorded from actions/interactions on or with files/content stored in a database of a cloud-based environment.

FIG. 5 depicts an example system block diagram showing action log entries 516 recorded from actions/interactions on or with files/content 511 stored in a database 510 of a cloud-based environment.

The front ends 502A-N detect, identify, or receive the various actions or events on data or content performed by users or collaborators in a cloud-based environment. For example, events/actions can include by way of example but not limitation, file renames, file uploads/downloads, file edits, comments, etc. Based on the type of event, the front end 502 determines whether the action/event is to be created into a log entry to be stored in the action log 516. In creating a log entry, each action/event is recorded as a transaction with the file system change for asynchronous processing. In recording the transaction, the relevant file/folder row in the file 511 of the database 510 is inserted, updated, deleted, or otherwise modified according to the action. In one embodiment, the row is inserted in to the action log table 516 simultaneously with the write to the file 511 and also with the performance of action itself. Note that each entry includes an owner ID 514 in the file 511 and in the action log 516 to represent the owner of the item upon which an action occurred.

In one embodiment, action log entries are created in the same database 510 as the file table 511 such that file/content rollback can be performed if the file/data/content change results in an error or failure. As such, the action log entry creation in the action log table 516 can be created, in part, to meet durability (e.g., longevity) requirements of a given event/transaction (e.g., write events, or other edit events typically have higher durability requirements than a comment event, or a share event, etc.).

Action log entries can be created for select types of events or all events. For example, events/transactions such as file renames, file uploads may have higher durability requirements than a comment event, or a share event, in a sense that the changes from a file rename/file upload need to be maintained and updated at various respective clients for the relevant collaborators and the implication for missing a file rename or file upload is potentially more severe than missing a comment event or a share event, etc.

In general, action log entries are generally created for actions/events with higher durability requirements. Such a determination can be made by the front ends 502 as to whether a given event type is to be writing into the action log table 516. Action log entries may also be created for all events with durability requirements carried out downstream at event queues stored in the second database (e.g., the database 460 of FIG. 4B). Table 516 shows the action log entries created from the events stored in the file table 511.

The action log entries can be identified by the action ID 517. In addition, each action log entry can be associated with a user (e.g., owner) identifier 518, a data entry 519, and/or a revision identifier 520. The user identifier 518 can identify a user who is to a recipient as a result of an event (e.g., upload file to User 1). The owner identifier 518 represents the owner of the item upon which an action (e.g., represented by action ID 517) occurred and in general, each work item has no more than one owner. The data field 519 can identify the type of action/event (e.g., rename, upload, edit, comment, share, send, download, etc.).

The revision identifier 520 can indicate the version of any change made to a given file (e.g., edit, rename, upload, etc.). In one embodiment, the revision identifier 520 is derived from version tracking mechanisms (e.g., via revision ID 515) inherent to the database 510. The revision identifier 520 can used by remote clients to resolve conflicts in view of potentially conflicting events/transactions. For example, if a file is re-named twice and both events are synchronized/updated at a remote client, the client can use the rename event associated with the latest revision ID to make the necessary updates. This can ensure that the client is updated with the most current change regardless of when the events are read from the queue. Thus, even if the two rename events are writing to the queue for the client out of order, the client can still make the 'correct' update using the revision ID in case of conflicting changes.

Figure 6:
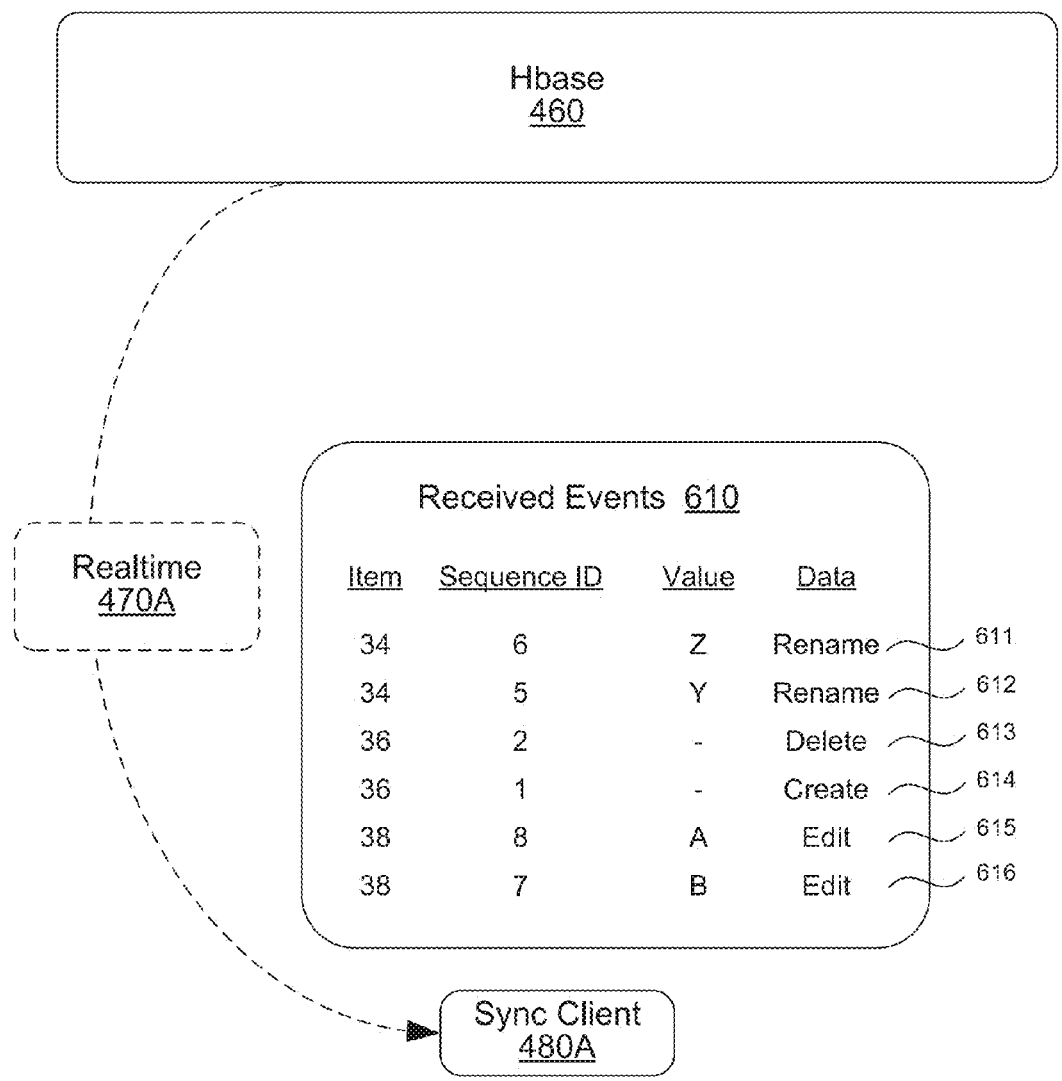
FIG. 6 depicts an abstract example of events as received by synchronization clients illustrating some scenarios in which race condition handling techniques described herein may be applied.

FIG. 6 depicts an abstract example of events as received by synchronization clients (or "synchronization client") illustrating some scenarios in which race condition handling techniques described herein may be applied. The events received by synchronization clients (e.g., synchronization client 480A) from the ALF system (e.g., ALF 490) is depicted as entries 611-616 (in the chronological order which they are received) in a table of received events 610. For simplicity, not all of the following described race condition scenarios are depicted in table 610. It is also noted that, in the following description, implementation of the disclosed techniques may be discussed from either the server 100's or the synchronization client 480A's perspective for simplicity; however, a person having ordinary skill in the art will know that the techniques disclosed herein can be adapted to perform on any suitable component.

As aforementioned, although the host server 100 already employs one or more mechanisms (e.g., the revision ID which can make sure the events can be written into the queue from which the client reads in a correct order) for solving out-of-order event problems, errors and/or race conditions can still take place on the client when the events arrive at the client in an out-of-order manner when they are delivered from the queue to the client.

Accordingly, embodiments of the present disclosure include systems and methods for handling action log framework race conditions which can take place, for example, on a synchronization client when being updated about events from a cloud-based platform. In one embodiment, synchronization client implementing the disclosed techniques can maintain the correctness of synchronized items (e.g., files, folders, folder tree structure, etc.) completely independent from the order in which the client receives events from the action log framework ("ALF") system. That is to say, so long as the ALF system correctly delivers all events to the synchronization client, the synchronization client can reach the correct final state.

More specifically, it is recognized in the present disclosure that the potential race conditions presented by the aforementioned ALF system 490 can fall into one or more of the following example categories: (I) single item race conditions, (II) impossible event sequence race conditions, or (III) folder tree materialization race conditions.

Single Item Race Conditions

The single item race conditions can occur when two events that modify the same field on a given item are received out-of-order. For example, suppose that there is a file X and receive two rename events (e.g., events 611 and 612) for that file, the first (e.g., event 612) indicating that the file should be renamed to Y and the second (e.g., event 611) indicating that the file should be renamed to Z. If the two rename events were received out-of-order and were applied without discretion, then the final name of the file on the synchronization client would be Y, which would be incorrect.

In accordance with the present embodiments, in response to an event received at a synchronization client which indicates a modification to an item, the synchronization client 480A can compare a sequence identifier of the item in the event with a current sequence identifier of the item. Specifically, the synchronization client can resolve the above scenario using a sequence identifier (Sequence_ID) attached to every item (e.g., a file object or a folder object) on the cloud-based platform (e.g., on workspace 302). An item's Sequence_ID field can monotonically increase when an item's core properties change. For example, the Sequence_ID can be incremented every time the file or folder's name, parent folder, or checksum (e.g., as result of content change) is changed on the cloud-based platform. In this way, the Sequence_ID can provide a monotonically increasing version identifier for the item.

Thus, when processing the renames from the above example, the synchronization client 480A can see that the rename to Z (e.g., of event 611) has a higher Sequence_ID than the rename to Y (e.g., of event 612) and thus that the final name of the item should be Z.

Further, it is observed that since the system uses one Sequence_ID for an item (e.g., a folder/file) as a whole rather than separate Sequence_IDs for each individual property or field of the object. If the system attempts to simply pass through events with higher Sequence_IDs and drop those events with lower Sequence_IDs, any out of order events may block all previous events from being executed even if the events are to modify different fields or properties. For example, an out-of-order rename might block a move, which can cause the item's final parent folder to be incorrect.

As such, in some embodiments, the synchronization client 480A can first compare the Sequence_ID for an incoming event to the current Sequence_ID of the item that event changes; if the Sequence_ID of the event is lower, then the event may be dropped, but if the Sequence_ID of the event is higher, the synchronization client 480A then can differentiates the state of the item in the event with a current state of the item, and the synchronization client 480A can generate one or more events that are deemed necessary to bring the two states in synchronization. Specifically, in some embodiments, the synchronization client 480A can determine a difference between the item's state as represented in the event and a current state of the item if the sequence identifier in the event is larger than the current sequence identifier of the item, and then, the synchronization client 480A can generate at least one synchronization step to update the current state of the item to the item's state as represented in the event based on the difference.

Moreover, one case of the single item race condition can occur when a field is changed to a new value and then subsequently changed back to its original value, and these two events are received out-of-order. An example of this is illustrated as event 615 where item 38's value is changed from A to B back to A. Assuming the event is updating item 38 to a state which appears to be the same as the current state of item 38 and the Sequence_ID of event 615 is higher than that of the current Sequence_ID for item 38, when the synchronization client 480A receives the higher Sequence_ID event, it might see that there is no difference between the current state of the item and the state of the item in the event, and thus it may determine that there are no events required to bring the two states in synchronization. Were it to respond by simply dropping the event, when it subsequently received the lower Sequence_ID event (e.g., event 616), it would see this event as having a higher Sequence_ID and generate an event to make the corresponding change (e.g., on the file system), resulting in the item moving into an incorrect state.

Accordingly, some embodiments of the synchronization client 480A can update the current sequence identifier of the item to the sequence identifier of the item in the event if there is no difference resulted from the comparison. For example, the synchronization client 480A can handle this scenario by generating an event (e.g., a "touch event," not shown in FIG. 6 for simplicity) to bump/update the Sequence_ID on an item (e.g., from 6 to 8) when it encounters an ALF event for which no other change is required. Once the touch event has been generated, the synchronization client 480A can properly drop the lower Sequence_ID event (e.g., event 616 with Sequence_ID's value being only 7) as reflecting an earlier state of the item.

Another example case of the single item race condition can occur when a delete event (e.g., event 613) for an item is received out of order with the create event (e.g., event 614) for the item. In this scenario, when the synchronization client 480A receives the delete event, there is no action required (e.g., on the files system of client 480A) but there is also no item on the synchronization client 480A for which to send an aforementioned touch event to bump/update the Sequence_ID. As in the previous example, the synchronization client 480A should not simply drop the delete event 613 because it would then incorrectly create the item when it later receives the create event 614.

Accordingly, in some embodiments, the synchronization client 480A can generate a create event (not shown in FIG. 6 for simplicity) for the deleted item that marks the item as deleted. Specifically, in an additional or alternative embodiment, if the modification is deletion and if the item does not exist, the synchronization client 480A can generate a creation event for the item with a mark which indicates the item as deleted. In this way, the generated creation event is treated as a no-op by the file system on the synchronization client 480A but allows the synchronization client 480A to persist the Sequence_ID of the item at the point when it was deleted. The create event 614 is then filtered out as usual for lower Sequence_ID events.

Impossible Event Sequence Race Conditions

Impossible event sequence race conditions may occur when events are provided by the ALF system 490 to the synchronization client 480A in an order that is impossible for the synchronization client 480A to apply to the file system (e.g., where the synchronization client 480A is located) while still observing some of the standard file system rules. Examples of these rules can include an item cannot be added to a folder that does not exist, no two items in the same folder can have the same name. Another example rule is that a non-empty folder cannot be deleted.

In some embodiments, after the synchronization client 480A has determined that an event represents a future state of the item and has manufactured the corresponding events that need to be applied on the opposite file system (e.g., in ways described above), it passes each event through an event filter pipeline, which can check if the event is consistent with the current state of the file system.

If the event fails any of the required checks, the event can be buffered until more events are received and the aggregate can potentially successfully pass though the filter (e.g., when a subsequent event modifies the same item as or an related item of the buffered event), at which point the buffered event is retried and potentially re-buffered if it still fails the checks. Further, in some implementations, if an event remains buffered in the event filter pipeline for longer than a configurable maximum time limit, the event filter pipeline can drop the event, and some embodiments of the synchronization client 480A may report that a full scan of file/folder status within the synchronization scope is required to resolve the inconsistency.

Tree Materialization Race Conditions

Tree materialization race conditions can occur when an entire tree structure (of the folders) either enters or leaves the synchronization scope of a client without ALF events being generated for each item in the tree. With ALF system 490, scenarios in which this type of race condition may occur include, for example, a folder is synchronized or unsynchronized, copied into a synchronized folder, or moved into or out of a synchronized folder.

Specifically, the present embodiments recognized that, because it is desirable to minimize the amount of scanning (e.g., of tree structure) required for tree materialization or dematerialization, in each of the cases mentioned above, the above-mentioned ALF system 490 only generates one ALF event on the top-level folder of the tree that experienced the change. This can present two distinct problems. First, because events are not received for every item being added to or removed from the synchronization scope, the synchronization client 480A may need to perform at least some amount of scanning to create the correct tree, but there are a variety of race conditions that can occur. As such, in one implementation the synchronization client 480A can respond to all folder moves, copies, synchronization, and unsynchronizations by performing a full scan; however, it is noted that this can create a large amount of data traffic due to the scanning.

Second, current scans to materialize or de-materialize the tree do not return enough information to completely protect the tree from being corrupted by those events which (i) occur in the tree before the materialization or dematerialization and (ii) are only received by the synchronization client 480A after the materialization or dematerialization. Specifically, the scans the current system employ do not return any information about the deleted or unsynchronized items in the scanned tree, and because the out-of-order nature, it is still possible to receive create events for these deleted and unsynchronized items after the scan has been performed. At that point, the synchronization client 480A may not have enough information to prevent it from re-creating the deleted or unsynchronized item, thereby corrupting the tree. An example scenario is as follows:

(1) An item in an unsynchronized tree is created and deleted in workspace 302, and the tree then becomes synchronized.

(2) The create event is somehow delayed so that the first event processed by the ALF system 490 is the delete event, which is not sent to the synchronization client 480A because the tree has not yet been synchronized.

(3) The tree becomes synchronized and the synchronization event is sent to the synchronization client 480A.

(4) The create event is processed by the ALF system 490 and is delivered to the synchronization client 480A since the tree is now synchronized.

(5) The synchronization client 480A receives the synchronization event and performs a scan of the synchronized tree. The scan does not return any information about the deleted item.

(6) The synchronization client 480A receives the create event for the deleted item. At this point, the client 480A has no knowledge that the item is deleted and the create event appears like any other create. The synchronization client 480A thus adds the deleted item to its tree erroneously.

In accordance with some embodiments, if the item is a folder and the modification results in the folder entering or leaving a synchronization scope of the synchronization client 480A, the synchronization client 480A can perform a scan of a tree structure of synchronized folders on the synchronization client 480A. In some examples, the scan can include information regarding all items deleted within a select time period of the scan. In one specific example, for deleted items, all items deleted within some time period X of the scan can be included in the scan result. This information can then be used to filter out any create events for these deleted items so that the create events that are received can become trustworthy if any of the events' appearance in the ALF stream has not been delayed by longer than X.

In additional or alternative examples, the scan can include information regarding all unsynchronized folders which are located inside a synchronized folder. Specifically, for creates that are delayed by longer than X, a scan of tree structure (e.g., the structure as shown in FIG. 3B) on the cloud-based platform (e.g., workspace 302) can be performed to ensure correctness. For unsynchronized items, information regarding all unsynchronized folders that are themselves inside of a synchronized folder is to be included in the scan results. Then, the information can be used to filter out any create event for these folders. Any create event inside their subtrees (or subfolders) can be identified by a file system conflict filter of the synchronization client 480A and/or the host server 100 since their parent folders would not exist, thereby resulting in full scans. Accordingly, the scans in one or more of the above described embodiments can provide more information about deleted and unsynchronized items to the results returned from tree scans.

Additionally or alternatively, all events that occurred before the scan can be dropped. Specifically, some implementation of the synchronization client 480A can identify a timestamp of the scan, and discard all ALF events which occurred on the workspace 302 before the scan. This can prevent the synchronization client 480A from attempting to apply any create events for items that are deleted when the scan occurs, since based on logic those create events must have happened before the scan is performed. However, it is noted that clock skew between servers, event time resolution, and the time performing a scan on the cloud server 100 requires may reduce (sometimes significantly) the reliability of using the timestamp to determine whether an event has occurred in a given scan or not. It is also noted that this technique might not scale well with partial scans. When full scans are performed, the system only needs to keep track of the timestamp of the last full scan and can compare all event times against this timestamp. Once partial scans are performed, track timestamps for every sub-tree that has been partially scanned becomes necessary, and determining what sub-tree an event is in when it occurs for every event can be difficult.

Additional Examples of Optimization

The handling of folder move, copy, synchronization, and unsynchronization events can also be optimized so that the synchronization client 480A need not perform a full scan every time it receives one of these events. The following are some example techniques which the synchronization client 480A can employ.

A. Partial scans are performed instead of full scans.

It is recognized in the present disclosure that switching to partial scans of the affected sub-tree from full scans can cut down the cost of each scan.

However, several potential issues may need to be addressed in order to implement partial scans. For example, there may exist a race condition where, if a subfolder is synchronized and then moved to a new folder tree, and the synchronization client 480A performs the scan of the synchronized subfolder after the move has occurred, then the synchronization client 480A can end up with an incomplete synchronization tree. In this particular scenario, when the subfolder is initially synchronized, all the folder's descendants may become synchronized while all its ancestors may become partially synchronized, meaning that the folders files become synchronized but not other folders they contain.

Upon moving the synchronized folder to the new tree, the folder's new ancestors become partially synchronized while the folders old ancestors remain partially synchronized. Thus, the correct end result for the synchronization client is to have both the synchronized subfolder's old and new ancestors in its synchronization tree. However, if the synchronization client 480A does not perform the partial scan on the synchronized subfolder until after the subfolder has moved, the scan may only return information about the subfolder's current ancestors, leaving the synchronization client 480A with no information about the subfolder's old ancestors and thus rendering them unsynchronized.

In accordance with some embodiments, the synchronization client 480A can generate a synchronization event for a lowest partially synchronized folder in a given path when the last fully synchronized folder, which is a descendant folder in the path, is moved out from the path to a new path. It is recognized in the present disclosure that this may be the earliest instance for the synchronization client 480A to miss the partially synchronized path in its other scans, and the server 100 is already marking this folder in the database at this point to preserve its partially synchronized status.

Additionally, it is recognized that partial scans can also cause problems for synchronized trees with nested collaborations when the top-level collaboration is removed. Assuming the subfolder synchronized is below the lower level collaboration, the correct behavior in this scenario is for the partially synchronized folders above the lower level collaboration folder to disappear and the lower level collaboration folder to become the new root-level folder for the tree. However, just performing a scan on the former top-level folder can cause the entire tree to be deleted since the scan can return an empty tree; moreover, just performing a scan on the new top-level folder can result in that folder being moved to the root-level since it's impossible to infer ancestor deletes from a partial scan of a folder.

It is recognized in the present disclosure that the aforementioned transformation may require partial scans to be performed on both the former top-level collaborated folder as well as the current top-level collaborated folder. In accordance with some embodiments, the synchronization client 480A can initiate partial scans on both a former top-level collaborated folder and a current top-level collaborated folder if there exists nested collaborations and if the modification results in removal of a top-level collaboration.

It is noted, however, that introducing two events comes with a potential performance penalty since if the client 480A receives the unsynchronization event for the old top-level collaboration folder before receiving the synchronization event for the new top-level collaboration folder, the client 480A may delete the whole tree before re-downloading the portion it should keep.

B. Scans are performed only once per event.

In some embodiments, filtering can be used to detect duplicate folder move, copy, synchronization, and unsynchronization events so that scans only need to be performed on the first event received by the synchronization client 480A.

In some instances, Sequence_ID filtering can be used to detect duplicate events (e.g., folder move, copy, synchronization, or unsynchronization events), and the synchronization client 480A only perform scans only on a first event received. However, it is noted that because these events can affect entire sub-trees, the scan still needs to be performed even if the folder which the event occurred on has already reached a higher Sequence_ID state on the synchronization client. An example scenario explains this problem:

(1) A folder is created, a file is uploaded into that folder, the folder is synchronized, and then the folder is renamed.

(2) The upload event is processed first, before the folder has been synchronized, and is therefore not delivered to the synchronization client.

(3) The folder create and rename events are processed next, after the folder has been synchronized but before the synchronization event has been processed.

(4) The synchronization client would thus receive the create and rename events first and, if it performed filtering based on the Sequence_ID for the synchronization event, would drop them, resulting in the synchronization client missing the file uploaded into the folder.

As such, in one embodiment, the synchronization client 480A can employ a separate event de-duplication filter which can be based on Event_ID rather than Sequence_ID to resolve de-duplicating scan triggering events. For example, the filter can be a small cache of Event_IDs for recently seen events (or in some embodiments, recently seen scan triggering events in applications where more targeted de-duplication is preferred), allowing the synchronization client 480A to drop the events if it detects them being duplicative. It is also noted that restricting Sequence_IDs to never have gaps can mitigate the above described problem. As such, in one embodiment, the Sequence_ID logic as implemented in the synchronization client 480 can apply events once all previous events have been applied (e.g., by start incrementing the Sequence_ID for synchronization/ unsynchronization events) instead of dropping old events as previously discussed.

C. Scans are not performed for moves of folders that the synchronization client already has locally.

In some embodiments, a scan is not be necessary for a folder move where the folder does not move into or out of synchronization scope. In these cases, the synchronization client 480A can receive events for all changes inside the tree and can, for example, move the current tree to its new destination if the tree already exists locally, or create the folder in its current location if it does not.

However, because events can arrive at the synchronization client 480A out of order, it may become difficult or sometimes event impossible to guarantee that, when a move occurs, the tree being moved has never been outside the synchronization scope. An example scenario explains this problem:

(1) A folder is unsynchronized and a file is then uploaded into that folder.

(2) The upload event is processed and is not delivered to the synchronization client because the folder is no longer synchronized. The unsynchronization event is delayed.

(3) The folder is moved into another synchronized folder. This move event is processed by the ALF system and received by the synchronization client while it still has both the old and new parents locally. This appears like a move within synchronization scope to the client and so the client would simply move the folder locally.

(4) The unsynchronization event is finally processed and sent to the synchronization client. The synchronization client unsynchronizes the old parent folder, but it is too late at this point for the synchronization client to realize that the previous move was actually a move into synchronization scope and required a scan. The file that was uploaded into the moved folder is thus never downloaded.

Accordingly, in some embodiments, the workspace 302 can log folder moves recursively instead of only on the top-level folder moved. This technique may remove the need for scans on moves in general, and the synchronization client 480A can use its state differentiating logic (as mentioned above) to determine whether any change is actually required in response to a move event. It is noted that, in these embodiments, move events are logged for recently deleted items as well, so that the move results exactly mimic the results of a scan. Also, in at least some of these embodiments, the de-duplicating logic is implemented on the server 110 (e.g., as compared to the synchronization client 480A). In addition, control over what constitutes recently deleted can be implemented on the server 100 (e.g., instead of the client 480A) since, in these embodiments, the server 100 decides for all clients (e.g., client 480A-480N) which events get logged and which do not.

In another implementation, scans for folder copy events can be reduced or removed completely through the aforementioned recursive logging technique since a brand new folder tree is created, and therefore there are no recently deleted items that need events logged.

D. Scans are not performed for unsynchronization events.

In some embodiments, upon receiving an unsynchronization event, the synchronization client 480A is implemented to respond by deleting the unsynchronized folder tree locally.

However, it is recognized in the present disclosure that the synchronization state of the tree depends on the precise order in which synchronization and unsynchronization events are executed on the tree, and that this ordering dependency stretches across different items in the tree. An example scenario explains this problem:

(1) The folder tree /A/B, /A/C is synchronized.

(2) Folder A is unsynchronized and Folder B is synchronized. The synchronized tree should become /A/B/

(3) If the synchronization client receives the unsynchronization event on A and then the synchronization event on B, it would delete the tree and then re-create it with its scan of B. However, if it received the unsynchronization event on A second, it would end up simply deleting the whole tree.

(4) If however, the unsynchronization event on A were actually executed second on the server, the final empty tree state would be the correct one.

E. Echoback moves do not result in any scans.

Similarly, in some embodiments, scans are not performed on echoback move events, since these events can only have been performed on the synchronization client 480A if both folders involved in the move had been synchronized on the client 480A when the move occurred. For purposes of discussion herein, "echoback events" are event representing the same modification to the item originates from the sync client, to the workspace, and comes back to the same sync client again.

However, similar to what is mentioned previously, simply because the two folders are synchronized on the synchronization client 480A when the move occurred does not necessarily result that they are synchronized on the cloud server 100 when the move occurred. That is to say, it is possible that the move is a move into synchronization scope, rather than a move within synchronization scope. Consequently, that event may have been missed on the moved tree while it was outside of synchronization scope, necessitating a scan.

In this way, the disclosed techniques can handle file system modification events (e.g., Creates, Edits, Moves, Renames, and Deletes) and thus can reduce or avoid race condition when updating the collaborators (e.g., of their synchronization clients).

Table I includes a list of example race conditions which can be used, for example, for verifying functionalities in implementing the race condition handling techniques disclosed herein.

TABLE 1

Example Race Conditions

| Initial State in the Cloud | Events took place on Cloud | Events Received by Client |
|---|---|---|
| A. Single Item Race Conditions | | |
| A/x | Rename A/x -> A/y | Rename A/x -> A/z |
|  | Rename A/y -> A/z | Rename A/z -> A/y |
| A/x | Rename A/x -> A/y | Rename A/x -> A/x |
|  | Rename A/y -> A/x | Rename A/x -> A/y |
| A/ | Create A/x | Delete A/x |
|  | Delete A/x | Create A/x |
| A/ | Create A/x | Delete A/y |
|  | Rename A/x -> A/y | Create A/x |
|  | Delete A/y | Rename A/x -> A/y |
| B. Name Conflicts | | |
| A/x, A/y | Move A/x -> B/ | Rename A/x -> A/y |
| B/ | Rename B/x -> B/y | Move A/y -> B/y |
| A/x, A/y | Move A/y -> B/ | Rename A/x -> A/y |
| B/ | Rename A/x -> A/y | Move A/y -> B/ |
| A/x, A/y | Delete A/y | Rename A/x -> A/y |
|  | Rename A/x -> A/y | Delete A/y |
| A/x, A/y | Rename A/y -> A/z | Rename A/x -> A/y |
|  | Rename A/x -> A/y | Rename A/y -> A/z |
| C. Parentless Items | | |
| A/ | Create A/B/ | Create A/B/x |
|  | Create A/B/x | Create A/B/ |
| A/x | Create B/ | Move A/x -> B/x |
|  | Move A/x -> B/x | Create B/ |
| A/ | Restore B/ | Restore B/x |
|  |  | Restore B/ |
| D. Deletion of a Non-Empty Folder | | |
| A/x | Delete A/x | Delete A/ |
|  | Delete A/ | Delete A/x |
| A/x | Delete A/ | Delete A/ |
|  |  | Delete A/x |

TABLE 1-continued

Example Race Conditions

| Initial State in the Cloud | Events took place on Cloud | Events Received by Client |
|---|---|---|
| E. Synchronization/Unsynchronization | | |
| A/ | Synchronization A/ Unsynchronization A/ | Unsynchronization A/ Synchronization A/ |
| A/ | Unsynchronization A/ Synchronization A/ | Synchronization A/ Unsynchronization A/ |
| A/ | Create A/x Delete A/x Synchronization A | Synchronization A Create A/x (delete never sent) |
| A/B/ | Synchronization A Unsynchronization B | Unsynchronization B Synchronization A |
| A/B/ | Synchronization B Unsynchronization A | Unsynchronization A Synchronization B |
| A/B/ | Unsynchronization A Synchronization B | Synchronization B Unsynchronization A |
| A/B/, A/C | Unsynchronization A Synchronization B | Synchronization B Unsynchronization A |
| A/B/ | Unsynchronization B Synchronization A | Synchronization A Unsynchronization B |
| A/ | Create A/x Unsynchronization A | Unsynchronization A Create A/x |
| / | Create A/ Synchronization A/ Unsynchronization A/ | Synchronization A/ Unsynchronization A/ Create A/ |
| A/ | Create A/B/ Unsynchronization A/B/ | Unsynchronization A/B/ Create B/ |
| A/ | Create A/B/ Rename A/B/ -> A/C/ Unsynchronization A/C/ | Create A/B/ Unsynchronization A/B/ Rename A/B -> A/C |
| A/B/ | Move C/ -> A/B/ | Unsynchronization C |
| C/ | Unsynchronization C | Move C/ -> A/B/ |
| A/B/ | Unsynchronization C | Move C/ -> A/B/ |
| C/ | Move C/ -> A/B/ | Unsynchronization C |
| A/B/ | Unsynchronization A | Move A/B/ -> C |
| C/ | Create A/B/x Move A/B/ -> C/ | Unsynchronization A (create never sent) |
| F. Full Scan Timing | | |
| A/ | Create A/x Delete A/x Full Scan | Full Scan Create A/x (delete never received) |
| A/ | Create A/B/ Unsynchronization A/B/ Full Scan | Full Scan Create A/B/ (unsynchronization never received) |
| G. Partial Scan Timing | | |
| A/B/ C/ | Synchronization B/ Move A/B/ -> C/ Partial Scan | Synchronization B/ Partial Scan Move A/B/ -> C/ |

Figure 7:
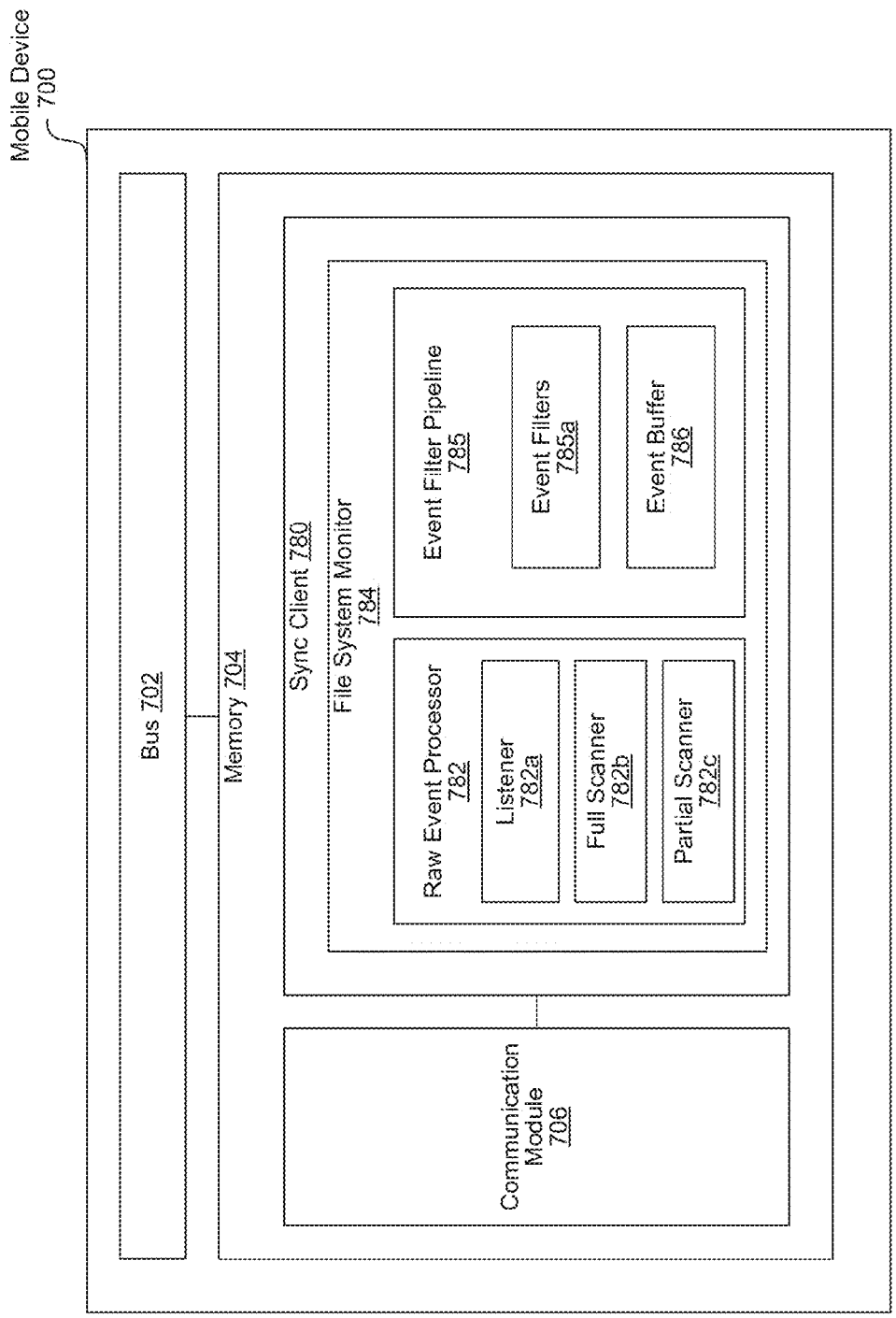
FIG. 7 depicts a block diagram illustrating an example system showing select components described in relation to FIG. 6 on the client side of the cloud-based platform for incrementally updating a remote client with occurred events or actions.

FIG. 7 depicts a block diagram illustrating an example system 700 showing select components described in relation to FIG. 6 on the client side (e.g., devices 102, FIG. 1) of the cloud-based platform for incrementally updating a remote client (e.g., client 110, FIG. 1; client 480A, FIGS. 4B and 5) with occurred events or actions, such as one hosted by the host server 100. With additional reference to FIGS. 1-3B, the race condition handling techniques which can employed by, for example, the synchronization client 480A are described.

The mobile device 700 can include, for example, a bus 702, and a memory 704 among other components. The memory 704 may include, among others, a synchronization client 780, which can include a raw event processor 782, a file system monitor 784, an event filter pipeline 785 with one or more event filters 785a, and an event buffer 786. The memory 704 can also include a communication module 706 that facilitates communication among the mobile device 700, the host server 100, and other components discussed herein (e.g., the ALF system 490) using any of the communication protocols that are supported. The memory 704 may also include other device modules (not shown in FIG. 7 for simplicity) such as a GPS module for determining and providing location information, text input module for accepting and processing inputs provided using different input mechanisms of the mobile device, and the like for handling various functions of the mobile device 700. It is noted that the aforementioned modules are intended for purposes of enabling the present embodiments, rather than limiting. As such, a person of ordinary skill in the art will understand that the present disclosure covers apparent alternatives, modifications, and equivalents (e.g., combining or separating the modules) made to the techniques described herein. Additional or less components/modules/engines can be included in the mobile device 700 and each illustrated component.

As used herein, a "module," "a manager," an "interface," or an "engine" includes a general purpose, dedicated or shared processor and, typically, firmware or software modules that are executed by the processor. Depending upon implementation-specific or other considerations, the module, manager, interface, or engine can be centralized or its functionality distributed. The module, manager, interface, or engine can include general or special purpose hardware, firmware, or software embodied in a computer-readable (storage) medium for execution by the processor. As used herein, a computer-readable medium or computer-readable storage medium is intended to include all media that are statutory (e.g., in the United States, under 35 U.S.C. § 101), and to specifically exclude all media that are non-statutory in nature to the extent that the exclusion is necessary for a claim that includes the computer-readable (storage) medium to be valid. Known statutory computer-readable mediums include hardware (e.g., registers, random access memory (RAM), non-volatile (NV) storage, to name a few), but may or may not be limited to hardware.

The bus 702 is a subsystem for transferring data between the components of the mobile device 700. For example, the bus 702 facilitates the transfer of data between the memory 704 and other components of the mobile device such as the processor and/or the input/output components that utilize the data.

As previously mentioned, over all, the present embodiments can provide race condition handling capabilities to the synchronization client 780.

In one embodiment of the present disclosure, during normal operations, the synchronization client 780 can operate in one or both of two modes. When in a listening mode, a listener module 782a (e.g., as a thread running in the operating system of device 700) can receive new events reported from the host server 100 (e.g., via the ALF system) as these events occur, and the raw event processor 782 can process these events in manners described herein. During a startup phase of the synchronization client 780, or when there is an inconsistency (e.g., resulted from a potential violation of local file system rules), the synchronization client 780 may switch into a full scan mode, in which the full scanner 782b can request that all existing files and folders, for example, be retrieved from the workspace 302 (e.g., in host server 100) and turned into events.

According to some embodiments, the raw event processor 782 can receives events from the ALF system 490 which represents that a modification to an item (e.g., a file or a folder) has taken place on the workspace 302, and can function together with other components to process the received raw events, such as the generating of the aforementioned synchronization steps which can bring the state of the item as indicated in the received event and the current state of the item in synchronization (e.g., by selectively updating the current state) after deemed appropriate (e.g., by the file system monitor 784).

In a particular embodiment, the file system monitor 784 can cause the sync client 780 to receive (e.g., using the listener 782a) or to retrieve (e.g., using the full scanner 782b) events from the workspace 302 and to normalize those events (e.g., using aforementioned Sequence_ID or other techniques described herein) so that the events can be executed correctly. The file system monitor 784 can operate multiple processes to, for example, receive raw events with the listener 782a, retrieve events with the full scanner 782b, generate synchronization steps with the event processor 782, normalize events with the event filter pipeline 785, and control the operating status of the file system monitor 784 itself by responding to start, stop, pause, and resume, as well as transitioning between the aforementioned listen and full scan mode.

According to some embodiments, after an event indicating a modification to an item is received from the host server 100 (e.g., via the ALF system 490), the file system monitor 784 can initiate the event's processing by requesting the raw event processor 782 (e.g., the full scanner 782b or the listener 782a) to send that event through the event filter pipeline 785. Then, the event filter pipeline 785 can utilize one or more filters in the event filters 785a to identify whether execution of the event can cause violation of any local file system rule. Examples of these local file system rules can include: (1) an item cannot be added to a folder that does not exist; (2) no two items in the same folder can have the same name; and/or (3) a non-empty folder cannot be deleted. If the execution of the event can cause violation of any rule, the event filter pipeline can buffer the event in the event buffer 786 until a subsequent event arrives. The event filter pipeline 785 can then identify whether execution of an aggregate of the events is to violate any local file system rule. If the execution of the aggregate of the events is to violate any rule, the event filter pipeline 785 can continue to buffer the subsequent event until another subsequent event arrives. Additionally, in some implementations, if an event remains buffered in the event filter pipeline 785 for longer than a configurable maximum time limit, the event filter pipeline 785 can drop the event, and some embodiments of the synchronization client 780 may report (e.g., via the full scanner 782b) that a full scan of file/folder status within the synchronization scope is required to resolve the inconsistency.

Further, the result of this processing can be used to update the raw event processor 782 according to a set of transition rules. An example pseudocode describes this functionality is provided as follows:

```
def execute( ):
    # Setup the intial generator
    transition_generator(START)
    while not should_stop:
        # Grab the next event
        current_event = current_generator.next_event( )
        if current_event:
            # We have an event, so run it through the normalization
            pipeline
            result = normalize_event(current_event)
            # If there was an inconsistency, transition the current generator
            # Otherwise, continue with this generator
            if result is INCONSISTENCY:
                transition_generator(INCONSISTENCY)
```

-continued

```
        else:
            # The current generator is finished, so transition
            transition_generator(FINISHED)
```

It is noted that the current generator in the example psuedocode can be, in some examples, one or more threads that are operated by (e.g., the raw event processor 782 of) the file system monitor 784 in implementing the techniques described herein. Similarly, the transition generator in the example psuedocode can be, in some examples, one or more threads that are operated by (e.g., the event filter pipeline 785 of) the file system monitor 784 in implementing the techniques described herein.

Continuing with the psuedocode example, the current generator can be, for example, maintained using a finite state machine. One example of a default transition in such finite state machine can be as follows:

```
transition_rules = {
    # Always start with the full scanner
    START: FULL_SCANNER,
    # On inconsistency, both the full scanner and listener can restart the
    full scan
    INCONSISTENCY: {
        LISTENER: FULL_SCANNER,
        FULL_SCANNER: FULL_SCANNER,
    },
    # On finished, the full scanner can transition to listener, and the
    # listener can continue listening
    FINISHED: {
        LISTENER: LISTENER,
        FULL_SCANNER, LISTENER,
    },
}
```

And, an example of the state transition of the current generator, can be as follows:

```
def transition_generator(transition):
    new_generator = transition_rules[transition][current_generator]
    if new_generator != current_generator:
        # Tell the current generator to reset
        current_generator.reset( )
        # Update the current generator
        current_generator = new_generator
```

It is noted that, in the example psuedocode, a call is placed to reset the current generator before it is replaced rather than deleting it. This implementation may be important in some example situations.

In one example, some generators may generate inconsistencies when they are in a "background" mode. For example, if the local listener 782a receives an event while the local full scanner 782b is running, then this can generate an inconsistency at handoff time so that the full scan can be repeated. As such, in one embodiment, the local listener 782a can return an inconsistency if it receives any events between the call to reset( ) and the first call to next_event( ). In another example, if the full scanner 782b encounters an inconsistency, another full scan can be performed. The reset call can, therefore, allow the full scanner 782b to reset its state between scans.

In some embodiments, the full scanner 782b and listener 782a can be implemented to inherit from a FSRawEventGenerator class which exposes next_event( ) in the class's public interface. In some implementations, a Python 'yield' keyword can be used which can hide the implementation details of how the events are produced from the file system monitor 784. For example, the local listener 782a can spawn a new watchdog thread which fills a queue (not shown for simplicity) with new events. The function call, next_event( ) can then return an event from the queue.

On the other hand, the full scanner 782b can make a get_account_tree (GAT) command to the ALF system 490, and then parse the response for a number of events. In one or more embodiments, the full scanner 782b can return events are soon as they are parsed while maintaining the state of the parsing.

Depending on the embodiment, calls made to next_event( ) may or may not be blocking. For example, if the full scanner 782b has no reason to block (e.g., because it has parsed the entire GAT response), then the full scanner 782b can immediately return "None" to indicate that the full scanner 782b has no further events, and therefore the monitor 784 should enter the listening mode. On the other hand, the local listener 782a may need to block for a new event in order to prevent the file system monitor 784 from busy waiting. Notably, in implementation, in order to accommodate blocking next_event( ) calls and still be able to terminate quickly when STOP is called, the FSRawEventGenerator class can, for example, include a public method "release_control( )." In non-blocking generators, this call can be a no-op; however, in blocking generators, this call can immediately return "None," thereby allowing the monitor 784 to shutdown gracefully.

It is further recognized in the present disclosure that the events that come out of the raw event processor 782 often need to be normalized. For example, as is discussed below, a move event can be received as a delete event and a create event, and the events can be reordered when they arrive from the ALF 490. Also, operations performed on an item by a synchronization client 780 to the cloud-based platform (e.g., workspace 302) can generate echo-back copies of the event (e.g., event representing the same modification to the item originates from the sync client, to the workspace, and comes back to the same sync client again), which need normalization/processing as well.

The event filter pipeline 785 in the file system monitor 784 can be responsible for normalizing raw events received from the cloud-based platform (e.g., workspace 302 through ALF 490) into synchronization event (or synchronization steps) that are safe to apply on the local file system where the synchronization client 780 operates. As mentioned before, because the cloud-based platform (e.g., workspace 302) does not provide any ordering guarantees around the delivery of events, the event filter pipeline 785 can perform the guaranteeing that, for example, a given raw event received which represents a future state of the associated item (e.g., by its Sequence_ID or other suitable indications) is not applied until the item can be moved into that state without violating any local file system rules.

Some embodiments of the event filter pipeline 785 can treat each raw event in the cloud-based platform (e.g., each ALF event from the ALF system 490) as a state update notification for a specific item (e.g., a file or a folder). Each raw event (which is to pass through the event filter pipeline 785 can include, in some examples, the full state of the item affected by the event.

In some embodiments, the event filter pipeline 785 then can compare the state of the item as indicated by the event against the current state of that item as stored on the local mobile device 700. The comparison can be used to determine whether the received event represents a newer version of the item, whether the newer state in the event is currently valid, and/or which synchronization steps need to be generated to move the item from its current state on the mobile device 700 to its newer state in the event.

In addition, the event filter pipeline 785 can include one or more of the following example filter components in the event filters 785a in order to carry out the functionalities of the event filter pipeline 785 described herein:

A. Raw Retrieve Shadow Item Filter

The raw retrieve shadow item filter can retrieve the current state of the item affected by the event from (e.g., a local storage of) the local mobile device 700. This current item state can be used, for example, by later stages in the pipeline 785 to determine whether the event represents a newer state for the item and what synchronization steps need to be generated for the item to move it from its shadow state to the event state.

B. Drop Duplicate Raw Events Filter

The drop duplicate raw events filter can compare the Sequence_ID in the event item state with the Sequence_ID in the current item state to determine if the event item state is newer. In some embodiments, the drop duplicate raw events filter can drop the event if the event represents an older state of the item. In one or more embodiments, however, this check can be skipped for events originating from either the full scanner 782b or a partial scanner 782c since (a) events from the scanners are typically guaranteed to represent the current state of the item; and (b) the scanners detect item deletions through the absence of the item in the scan result, and therefore the scanners typically do not have access to an updated Sequence_ID for deletion events.

C. Folder Sync and Unsync Filter

The folder synchronization and unsynchronization filter can determine whether the received event represents a folder synchronization/unsynchronization. If the event does represent so, the event filters 785a indicates to the file system monitor 784 that a partial scan is required for the specified folder.

D. File System Conflict Filter

The local file system conflict filter can check if the event item state is consistent with the current state(s) of the rest of the local items based on local file system rules. Examples of these local file system rules can include: (1) an item cannot be added to a folder that does not exist; (2) no two items in the same folder can have the same name; and/or (3) a non-empty folder cannot be deleted. So, if the event item state indicates that the item is not deleted, the local file system conflict filter can check that the item's parent folder exists and that there is no other item with the same name in that folder. If the event item state indicates that the item is deleted and the item is a folder, the local file system conflict filter can check that the folder is empty. If any of these checks fails, the item event is buffered until the checks can pass (e.g., upon receiving further events).

E. Raw Event to Sync Event Filter

The raw event to synchronization event (or synchronization step) filter can generate the synchronization steps or synchronization events necessary to transform the item from the shadow item state to the event item state based on the differences between the shadow item state and the event item state. In some embodiments, this filter can also update the current state of the item with the new state of the item.

The event filter pipeline 785 can also include an event buffer 786 to buffer events. For example, in some particular implementations, a move event can be recorded by the local listener 782a as a delete event followed quickly by a create event. The event buffer 786 can buffer the delete event for a small amount of time and attempts to resolve it with a create event. Events can be held in the buffer until either the event resolves (e.g., when the filter pipeline 785 receives another event process operation) or until a buffer time expires (e.g., at which point the filter pipeline 785 can execute a flush buffer operation).

Continuing with the above pseudocode example, in some instances, this may present a problem with blocking calls to next_event( ). For example, if a delete event is received, the delete event may be buffered until another event happens on the local file system, which could be not for a some time. To remedy this, according to some embodiments, when an event process operation or a flush buffer operation is called on the filter pipeline 785, the pipeline 785 can return a next time at which the buffer 786 is to be flushed. Then, the next call to next_event( ) can specify the maximum time for which the call may block to the generator.

In this way, the disclosed techniques of the sync client 780 can handle race conditions of events in the cloud-based platform. In addition, the sync client 780 can bring the benefit of resilience to out of order events so as to minimize unnecessary full scans and to provide support for lock/unlock and collaboration/uncollaboration events in the cloud-based platform.

Among other benefits, the disclosed embodiments can bring the benefit of extensibility, maintainability, and testability. For extensibility, the disclosed embodiments can be extensible to handle any additional modes of generating new events, more complicated methods of normalizing events, and more complicated transitions and inconsistency handling. For maintainability, the disclosed embodiments can be easily maintained because modularization. Additionally, minor changes to execution logic do not require substantial changes to the design. For testability, each component can be tested individually, as well as the control mechanisms, in a single threaded manner. Further, multithreaded integration tests can be easily performed and designed as well.

Figure 8:
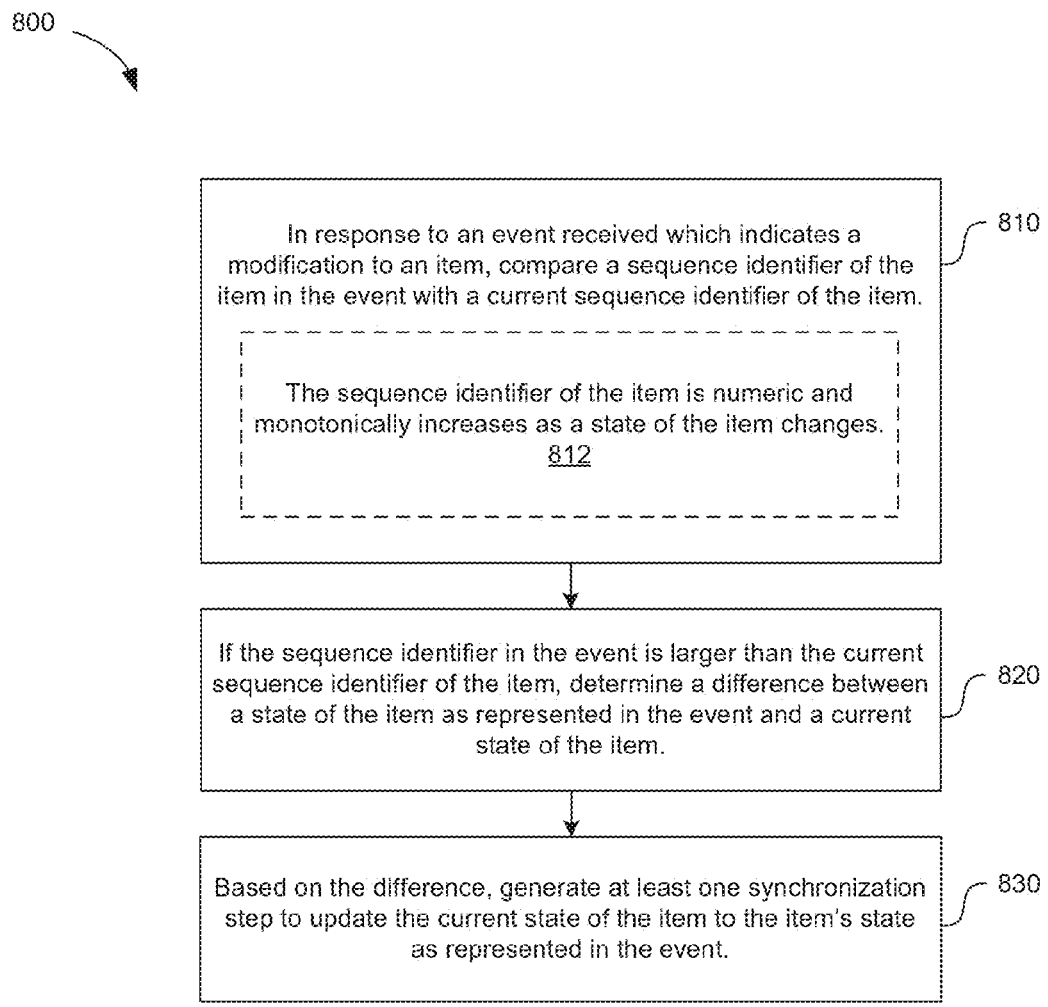
FIG. 8 depicts a flowchart illustrating an example process for race condition handling in a system that incrementally updates remote clients at devices with events that occurred via the platform.

FIG. 8 depicts a flowchart illustrating an example process 800 for a system that incrementally updates remote clients at devices with events that occurred via the platform to implement the disclosed techniques for race condition handling. The process 800 can be implemented in, for example, a sync client (e.g., client 480A, FIG. 6; client 780, FIG. 7). With reference to FIGS. 1, and 6-7, the process 800 is explained hereafter.

First, in accordance with some embodiments, in response to an event received at a synchronization client which indicates a modification to an item, the synchronization client 480A can compare (810) a sequence identifier of the item in the event with a current sequence identifier of the item. Specifically, the synchronization client can resolve the above scenario using a sequence identifier (Sequence_ID) attached to every item (e.g., a file object or a folder object) on the cloud-based platform (e.g., on workspace 302). An item's Sequence_ID field can monotonically increase (812) when an item's core properties change. For example, the Sequence_ID can be incremented every time the file or folder's name, parent folder, or checksum (e.g., as result of content change) is changed on the cloud-based platform. In this way, the Sequence_ID can provide a monotonically increasing version identifier for the item.

Then, in some embodiments, the synchronization client 480A can first compare the Sequence_ID for an incoming event to the current Sequence_ID of the item that event changes; if the Sequence_ID of the event is lower, then the event may be dropped (925), but if the Sequence_ID of the event is higher, the synchronization client 480A then can differentiates (820) the state of the item in the event with a current state of the item, and the synchronization client 480A can generate one or more events that are deemed necessary to bring the two states in synchronization. Specifically, in some embodiments, the synchronization client 480A can determine (820) a difference between the item's state as represented in the event and a current state of the item if the sequence identifier in the event is larger than the current sequence identifier of the item, and then, the synchronization client 480A can generate (830) at least one synchronization step to update the current state of the item to the item's state as represented in the event based on the difference.

Figure 9:
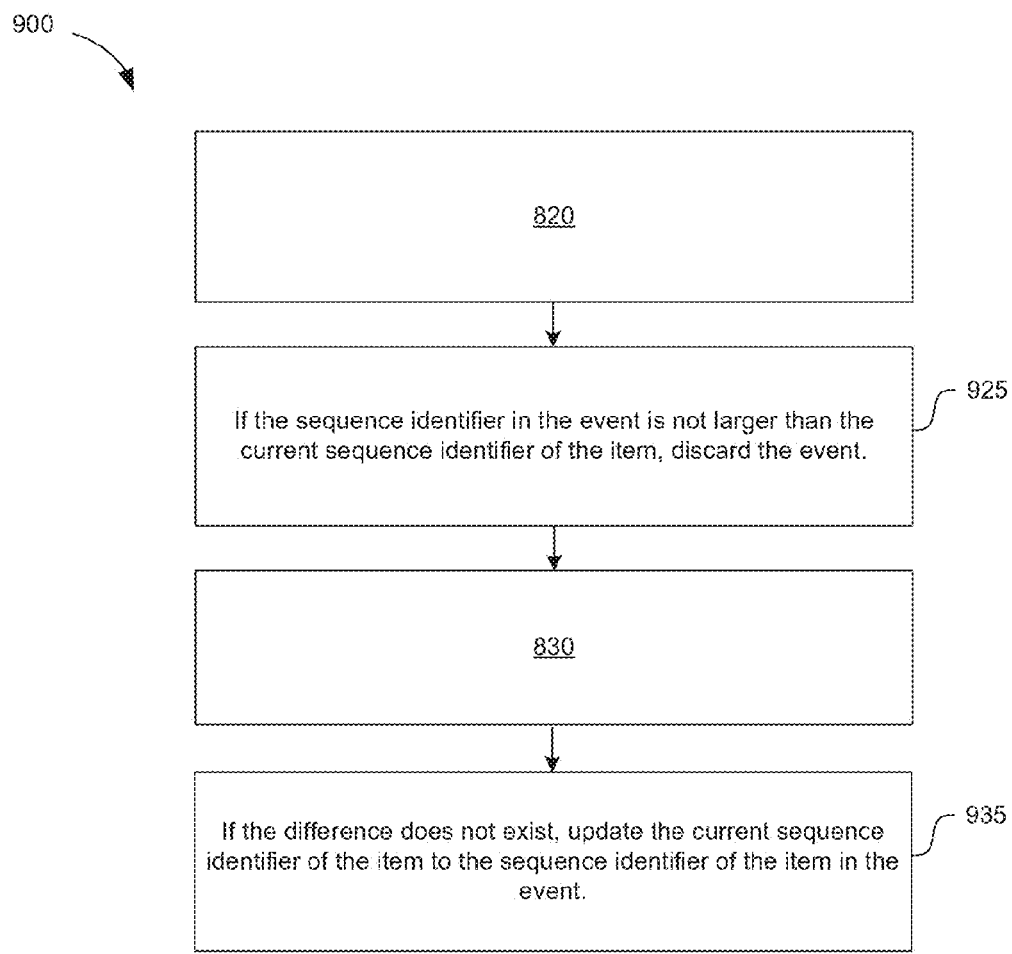
FIG. 9 depicts a flowchart illustrating further example details of the process of FIG. 8.

FIG. 9 depicts a flowchart 900 illustrating further example details of the process 800 of FIG. 8. As said, after step 820, if the sequence identifier in the event is not larger than the current sequence identifier of the item, the sync client 480A can discard (925) the event in accordance with some embodiments.

Further, after step 830, some embodiments of the synchronization client 480A can update (935) the current sequence identifier of the item to the sequence identifier of the item in the event if there is no difference resulted from the comparison. For example, the synchronization client 480A can handle this scenario by generating an event (e.g., a "touch event") to bump/update the Sequence_ID on an item (e.g., from 6 to 8, using the examples of FIG. 6) when it encounters an ALF event for which no other change is required. Once the touch event has been generated, the synchronization client 480A can properly drop the lower Sequence_ID event (e.g., event 616 with Sequence_ID's value being only 7) as reflecting an earlier state of the item.

Figure 10:
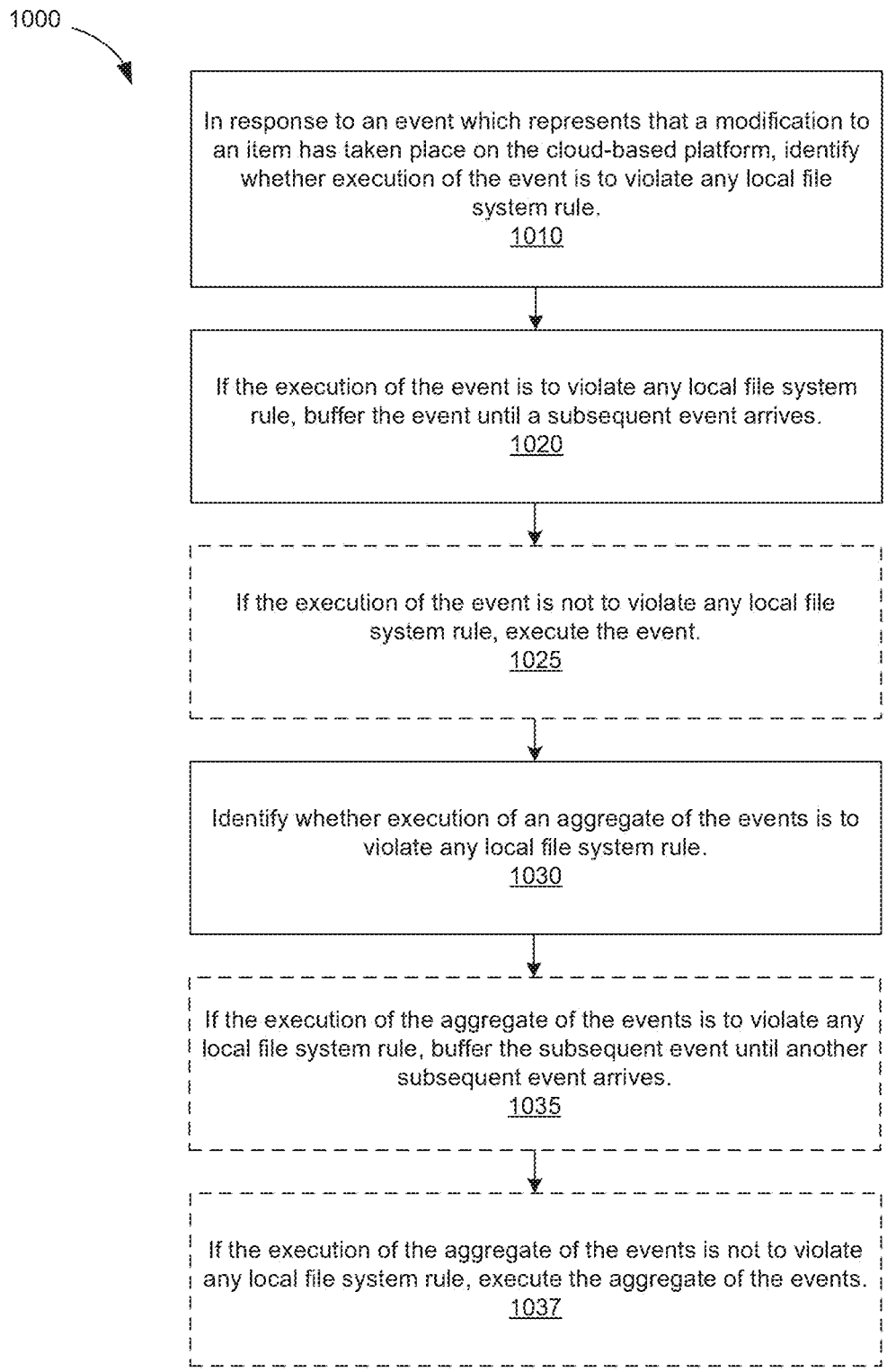
FIG. 10 depicts a flowchart illustrating another example process for race condition handling in a system that incrementally updates remote clients at devices with events that occurred via the platform.

FIG. 10 depicts a flowchart illustrating another example process 1000 for race condition handling in a system that incrementally updates remote clients at devices with events that occurred via the platform. The process 1000 can be implemented in, for example, a sync client (e.g., client 480A, FIG. 6; client 780, FIG. 7). With reference to FIGS. 1, and 6-7, the process 1000 is explained hereafter.

According to some embodiments, after an event indicating a modification to an item is received from the host server 100 (e.g., via the ALF system 490), the file system monitor 784 can initiate the event's processing by requesting the raw event processor 782 (e.g., the full scanner 782b or the listener 782a) to send that event through the event filter pipeline 785. Then, the event filter pipeline 785 can utilize one or more filters in the event filters 785a to identify (1010) whether execution of the event can cause violation of any local file system rule. Examples of these local file system rules can include: (1) an item cannot be added to a folder that does not exist; (2) no two items in the same folder can have the same name; and/or (3) a non-empty folder cannot be deleted.

If the execution of the event can cause (1020) violation of any rule, the event filter pipeline can buffer (1020) the event in the event buffer 786 until a subsequent event arrives. If the execution of the event is not to violate any local file system rule, the sync client 780 can execute (1025) the event.

Then, upon the arrival of the subsequent event, the event filter pipeline 785 can identify (1030) whether execution of an aggregate of the events is to violate any local file system rule. If the execution of the aggregate of the events is to violate any rule, the event filter pipeline 785 can continue to buffer (1035) the subsequent event until another subsequent event arrives. If the execution of the aggregate of the events is not to violate any local file system rule, the sync client 780 can execute (1037) the aggregate of the events.

Figure 11:
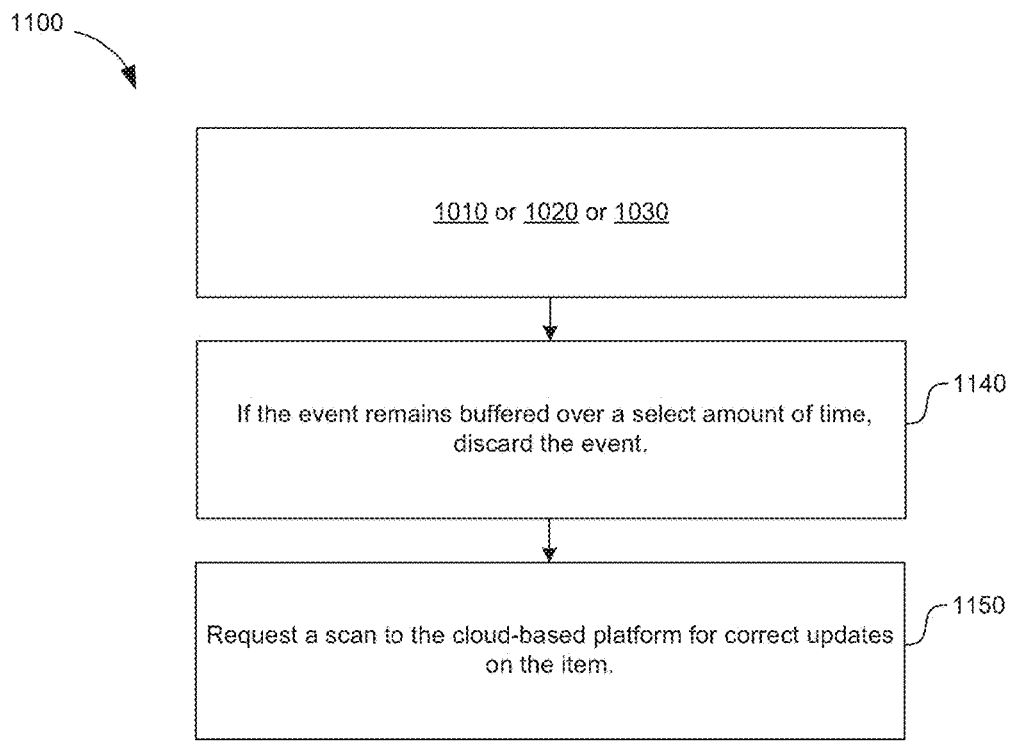
FIG. 11 depicts a flowchart illustrating further example details of the process of FIG. 10.

FIG. 11 depicts a flowchart 1100 illustrating further example details of the process 1000 of FIG. 10.

Continuing with the example process 1000, in some implementations, if an event remains buffered in the event filter pipeline 785 for longer than a configurable maximum time limit, the event filter pipeline 785 can drop (1140) the event, and some embodiments of the synchronization client 780 may report (1150) (e.g., via the full scanner 782b) that a full scan of file/folder status within the synchronization scope is required to resolve the inconsistency.

In this way, among other advantages, the present embodiments can ensure the correctness of the synchronized tree and other synchronized items (e.g., folders or files) completely independent from the order in which the client receives events from the action log framework ("ALF") system. In other words, so long as the ALF system correctly delivers all events to the synchronization client, the synchronization client can end up in the correct final state.

Figure 12:
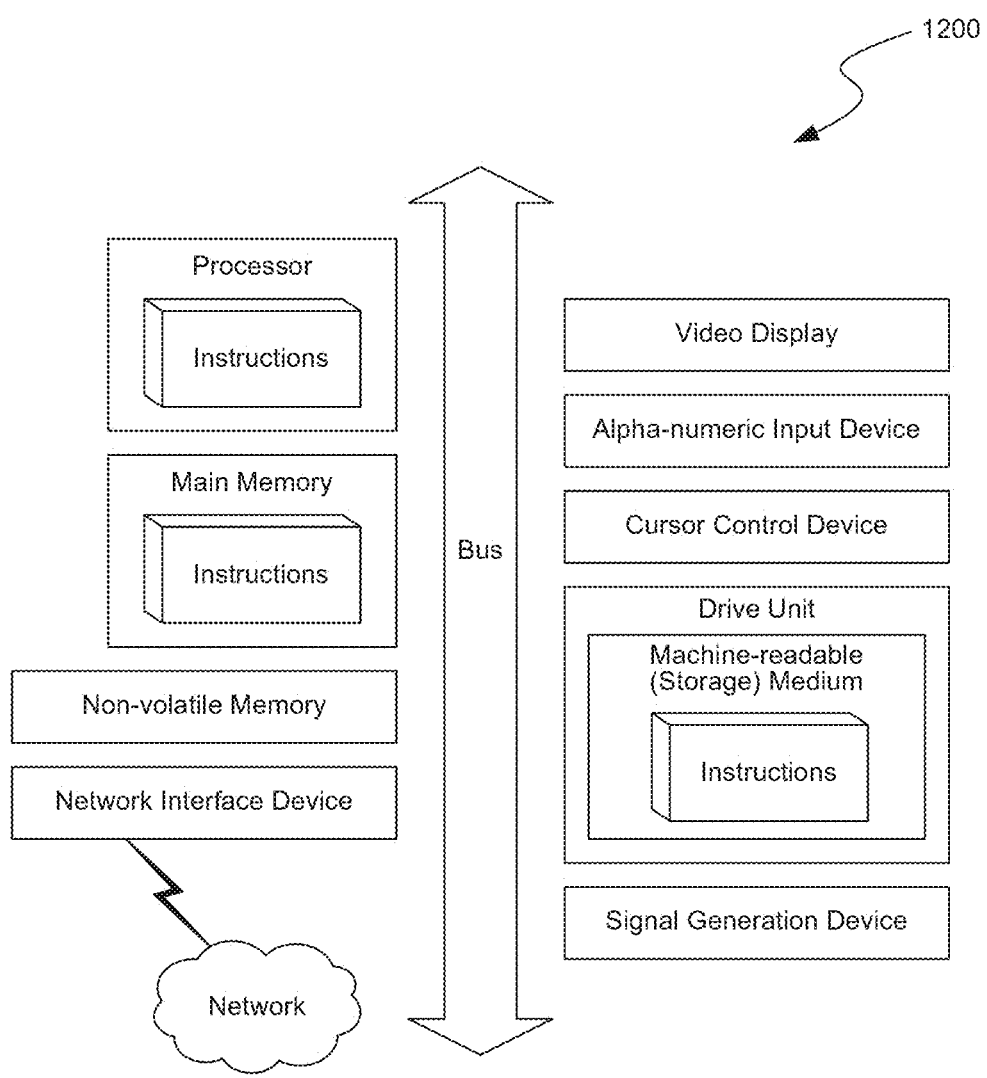
FIG. 12 depicts a diagrammatic representation of a machine in the example form of a computer system within which a set of instructions, for causing the machine to perform any one or more of the methodologies discussed herein, can be executed.

FIG. 12 shows a diagrammatic representation 1200 of a machine in the example form of a computer system within which a set of instructions, for causing the machine to perform any one or more of the methodologies discussed herein, can be executed.

In alternative embodiments, the machine operates as a standalone device or can be connected (e.g., networked) to other machines. In a networked deployment, the machine can operate in the capacity of a server or a client machine in a client-server network environment, or as a peer machine in a peer-to-peer (or distributed) network environment.

The machine can be a server computer, a client computer, a personal computer (PC), a user device, a tablet, a phablet, a laptop computer, a set-top box (STB), a personal digital assistant (PDA), a thin-client device, a cellular telephone, an iPhone, an iPad, a Blackberry, a processor, a telephone, a web appliance, a network router, switch or bridge, a console, a hand-held console, a (hand-held) gaming device, a music player, any portable, mobile, hand-held device, or any machine capable of executing a set of instructions (sequential or otherwise) that specify actions to be taken by that machine.

While the machine-readable medium or machine-readable storage medium is shown in an exemplary embodiment to be a single medium, the term "machine-readable medium" and "machine-readable storage medium" should be taken to include a single medium or multiple media (e.g., a centralized or distributed database, and/or associated caches and servers) that store the one or more sets of instructions. The term "machine-readable medium" and "machine-readable storage medium" shall also be taken to include any medium that is capable of storing, encoding or carrying a set of instructions for execution by the machine and that cause the machine to perform any one or more of the methodologies of the presently disclosed technique and innovation.

In general, the routines executed to implement the embodiments of the disclosure, can be implemented as part of an operating system or a specific application, component, program, object, module or sequence of instructions referred to as "computer programs." The computer programs typically comprise one or more instructions set at various times in various memory and storage devices in a computer, and that, when read and executed by one or more processing units or processors in a computer, cause the computer to perform operations to execute elements involving the various aspects of the disclosure.

Moreover, while embodiments have been described in the context of fully functioning computers and computer systems, those skilled in the art will appreciate that the various embodiments are capable of being distributed as a program product in a variety of forms, and that the disclosure applies equally regardless of the particular type of machine or computer-readable media used to actually effect the distribution.

Further examples of machine-readable storage media, machine-readable media, or computer-readable (storage) media include, but are not limited to, recordable type media such as volatile and non-volatile memory devices, floppy and other removable disks, hard disk drives, optical disks (e.g., Compact Disk Read-Only Memory (CD ROMS), Digital Versatile Disks, (DVDs), etc.), among others, and transmission type media such as digital and analog communication links.

The network interface device enables the machine 2800 to mediate data in a network with an entity that is external to the host server, through any known and/or convenient communications protocol supported by the host and the external entity. The network interface device can include one or more of a network adaptor card, a wireless network interface card, a router, an access point, a wireless router, a switch, a multilayer switch, a protocol converter, a gateway, a bridge, bridge router, a hub, a digital media receiver, and/or a repeater.

The network interface device can include a firewall which can, in some embodiments, govern and/or manage permission to access/proxy data in a computer network, and track varying levels of trust between different machines and/or applications. The firewall can be any number of modules having any combination of hardware and/or software components able to enforce a predetermined set of access rights between a particular set of machines and applications, machines and machines, and/or applications and applications, for example, to regulate the flow of traffic and resource sharing between these varying entities. The firewall can additionally manage and/or have access to an access control list which details permissions including for example, the access and operation rights of an object by an individual, a machine, and/or an application, and the circumstances under which the permission rights stand.

Other network security functions can be performed or included in the functions of the firewall, can be, for example, but are not limited to, intrusion-prevention, intrusion detection, next-generation firewall, personal firewall, etc. without deviating from the novel art of this disclosure.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof, means any connection or coupling, either direct or indirect, between two or more elements; the coupling of connection between the elements can be physical, logical, or a combination thereof. Additionally, the words "herein," "above," "below," and words of similar import, when used in this application, shall refer to this application as a whole and not to any particular portions of this application. Where the context permits, words in the above Detailed Description using the singular or plural number can also include the plural or singular number respectively. The word "or," in reference to a list of two or more items, covers all of the following interpretations of the word: any of the items in the list, all of the items in the list, and any combination of the items in the list.

The above detailed description of embodiments of the disclosure is not intended to be exhaustive or to limit the teachings to the precise form disclosed above. While specific embodiments of, and examples for, the disclosure are described above for illustrative purposes, various equivalent modifications are possible within the scope of the disclosure, as those skilled in the relevant art will recognize. For example, while processes or blocks are presented in a given order, alternative embodiments can perform routines having steps, or employ systems having blocks, in a different order, and some processes or blocks can be deleted, moved, added, subdivided, combined, and/or modified to provide alternative or subcombinations. Each of these processes or blocks can be implemented in a variety of different ways. Also, while processes or blocks are at times shown as being performed in series, these processes or blocks can instead be performed in parallel, or can be performed at different times. Further, any specific numbers noted herein are only examples: alternative implementations can employ differing values or ranges.

The teachings of the disclosure provided herein can be applied to other systems, not necessarily the system described above. The elements and acts of the various embodiments described above can be combined to provide further embodiments.

Any patents and applications and other references noted above, including any that can be listed in accompanying filing papers, are incorporated herein by reference. Aspects of the disclosure can be modified, if necessary, to employ the systems, functions, and concepts of the various references described above to provide yet further embodiments of the disclosure.

These and other changes can be made to the disclosure in light of the above Detailed Description. While the above description describes certain embodiments of the disclosure, and describes the best mode contemplated, no matter how detailed the above appears in text, the teachings can be practiced in many ways. Details of the system can vary considerably in its implementation details, while still being encompassed by the subject matter disclosed herein. As noted above, particular terminology used when describing certain features or aspects of the disclosure should not be taken to imply that the terminology is being redefined herein to be restricted to any specific characteristics, features, or aspects of the disclosure with which that terminology is associated. In general, the terms used in the following claims should not be construed to limit the disclosure to the specific embodiments disclosed in the specification, unless the above Detailed Description section explicitly defines such terms. Accordingly, the actual scope of the disclosure encompasses not only the disclosed embodiments, but also all equivalent ways of practicing or implementing the disclosure under the claims.

While certain aspects of the disclosure are presented below in certain claim forms, the inventors contemplate the various aspects of the disclosure in any number of claim forms. For example, while only one aspect of the disclosure is recited as a means-plus-function claim under 35 U.S.C. § 112, ¶6, other aspects can likewise be embodied as a means-plus-function claim, or in other forms, such as being embodied in a computer-readable medium. (Any claim intended to be treated under 35 U.S.C. § 112, ¶6 begins with the words "means for".) Accordingly, the applicant reserves the right to add additional claims after filing the application to pursue such additional claim forms for other aspects of the disclosure.

What is claimed is:

1. A method for resolving race conditions when updating synchronization clients with what occurred in a cloud-based platform, the method comprising:
   in response to receiving, at a synchronization client, an event which represents that a modification to an item has taken place on the cloud-based platform, identifying whether execution of the event is to violate any local file system rule;
   if the execution of the event is not to violate any local file system rule, executing the event, wherein executing the event includes:
      comparing a sequence identifier (ID) of the event with a current sequence ID of the item in the synchronization client,
      dropping the event in case the sequence ID of the event is lower than the current sequence ID of the item in the synchronization client,
      executing the event in case the sequence ID of the event is higher than the current sequence ID of the item in the synchronization client, wherein the executing further includes generating one or more events at the synchronization client to make a state of the item at the synchronization client the same as the state of the item indicated by the event; and
   if the execution of the event is to violate any local file system rule at the synchronization client, buffering the event at the synchronization client until a subsequent event arrives, wherein buffering the event further includes:
      discarding the event if the event remains buffered over a select amount of time,
      determining that the item is associated with a specified folder of a folder tree structure in the cloud-based platform, the folder-tree structure including multiple folders that are organized into multiple levels of hierarchy, and
      requesting a partial scan of the folder-tree structure in the cloud-based platform when a specified folder is moved from a first path to a second path in the folder-tree structure, instead of a full scan, the partial scan generating a synchronization event for a lowest partially synchronized folder in:
         the first path that had the specified folder before the move, and
         the second path that has the specified folder after the move.

2. The method of claim 1, further comprising:
   identifying whether execution of an aggregate of the events is to violate any local file system rule; and
   if the execution of the aggregate of the events is to violate any local file system rule, buffering the subsequent event until another subsequent event arrives.

3. The method of claim 2, further comprising:
   if the execution of the aggregate of the events is not to violate any local file system rule, executing the aggregate of the events.

4. The method of claim 1, wherein buffering the event further includes:
   requesting the full scan to the cloud-based platform for correct updates on the item.

5. The method of claim 1, wherein local file system rules include that the item cannot be added to a folder that does not exist.

6. The method of claim 1, wherein local file system rules include that a name of the item cannot be the same as another item in a same folder.

7. The method of claim 1, wherein local file system rules include that a non-empty folder cannot be deleted.

8. The method of claim 1, further comprising:
determining a difference between a state of the item as represented in the event and a current state of the item, wherein the identifications are based on the difference.

9. The method of claim 8, wherein the state of the item includes one or more of: a name, a parent folder, or a checksum of the item.

10. The method of claim 1, wherein the item is a file or a folder.

11. The method of claim 1, wherein the platform is a collaboration environment shared among a user and collaborators of the user.

12. A system for resolving race conditions when incrementally updating remote clients with what occurred in a cloud-based platform, the system comprising:
a processor;
a memory having stored thereon instructions which, when executed by the processor, cause the processor to:
in response to receiving, at a synchronization client, an event which represents that a modification to an item has taken place on a cloud-based platform, identify whether execution of the event is to violate any local file system rule;
if the execution of the event is not to violate any local file system rule, executing the event, wherein executing the event includes:
comparing a sequence identifier (ID) of the event with a current sequence ID of the item in a synchronization client,
dropping the event in case the sequence ID of the event is lower than the current sequence ID of the item in the synchronization client,
executing the event in case the sequence ID of the event is higher than the current sequence ID of the item in the synchronization client, wherein the executing further includes generating one or more events at the synchronization client to make a state of the item at the synchronization client the same as the state of the item indicated by the event, and
if the execution of the event is to violate any local file system rule at the synchronization client, buffer the event at the synchronization client until a subsequent event arrives, wherein buffering the event further includes:
discarding the event if the event remains buffered over a select amount of time,
determining that the item is associated with a specified folder of a folder tree structure in the cloud-based platform, the folder-tree structure including multiple folders that are organized into multiple levels of hierarchy, and
requesting a partial scan of the folder-tree structure in the cloud-based platform when a specified folder is moved from a first path to a second path in the folder-tree structure, instead of a full scan, the partial scan generating a synchronization event for a lowest partially synchronized folder in:
the first path that had the specified folder before the move, and
the second path that has the specified folder after the move.

13. The system of claim 12, wherein the processor is further caused to:
identify whether execution of an aggregate of the events is to violate any local file system rule;
if the execution of the aggregate of the events is to violate any local file system rule, buffer the subsequent event until another subsequent event arrives.

14. The system of claim 13, wherein the processor is further caused to:
if the execution of the aggregate of the events is not to violate any local file system rule, execute the aggregate of the events.

15. The system of claim 12, wherein the processor is further caused to:
request the full scan to the cloud-based platform for correct updates on the item.

16. The system of claim 12, wherein local file system rules include that the item cannot be added to a folder that does not exist.

17. The system of claim 12, wherein local file system rules include that a name of the item cannot be the same as another item in a same folder.

18. The system of claim 12, wherein local file system rules include that a non-empty folder cannot be deleted.

19. The system of claim 12, wherein the processor is further caused to:
determine a difference between a state of the item as represented in the event and a current state of the item, wherein the identifications are based on the difference.

20. The system of claim 19, wherein the state of the item includes one or more of: a name, a parent folder, or a checksum of the item.

21. The system of claim 12, wherein the item is a file or a folder.

22. The system of claim 12, wherein the platform is a collaboration environment shared among a user and collaborators of the user.

23. A system, comprising:
means for, in response to receiving, at a synchronization client, an event which represents that a modification to an item has taken place on a cloud-based platform, identifying whether execution of the event is to violate any local file system rule;
means for, if the execution of the event is not to violate any local file system rule, executing the event, wherein executing the event includes:
comparing a sequence identifier (ID) of the event with a current sequence ID of the item in the synchronization client,
dropping the event in case the sequence ID of the event is lower than the current sequence ID of the item in the synchronization client, and
executing the event in case the sequence ID of the event is higher than the current sequence ID of the item in the synchronization client, wherein the executing further includes generating one or more events at the synchronization client to make a state of the item at the synchronization client the same as the state of the item indicated by the event, and
means for, if the execution of the event is to violate any local file system rule at the synchronization client, buffering the event at the synchronization client until a subsequent event arrives, wherein buffering the event further includes:
discarding the event if the event remains buffered over a select amount of time,
determining that the item is associated with a specified folder of a folder tree structure in the cloud-based platform, the folder-tree structure including multiple folders that are organized into multiple levels of hierarchy, and requesting a partial scan of the folder-tree structure in the cloud-based platform when a specified folder is moved from a first path to a second path in the folder-tree structure, instead of a full scan, the partial scan generating a synchronization event for a lowest partially synchronized folder:

the first path that had the specified folder before the move, and the second path that has the specified folder after the move.

* * * * *